United States Patent
Tabata et al.

(10) Patent No.: US 7,935,015 B2
(45) Date of Patent: May 3, 2011

(54) CONTROL DEVICE FOR VEHICLE DRIVE APPARATUS

(75) Inventors: Atsushi Tabata, Okazaki (JP); Yutaka Taga, Aichi-ken (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 500 days.

(21) Appl. No.: 11/915,888

(22) PCT Filed: May 30, 2006

(86) PCT No.: PCT/JP2006/311178
§ 371 (c)(1),
(2), (4) Date: Nov. 29, 2007

(87) PCT Pub. No.: WO2006/129841
PCT Pub. Date: Dec. 7, 2006

(65) Prior Publication Data
US 2009/0318261 A1    Dec. 24, 2009

(30) Foreign Application Priority Data

May 30, 2005   (JP) .................................. 2005-158079
Jun. 24, 2005   (JP) .................................. 2005-185793

(51) Int. Cl.
*F16H 3/72*   (2006.01)
(52) U.S. Cl. .......................................................... 475/5
(58) Field of Classification Search ................. 475/5, 84, 475/150; 477/3
See application file for complete search history.

(56) References Cited

U.S. PATENT DOCUMENTS

| 7,128,675 | B2 * | 10/2006 | Klemen et al. ................... 475/5 |
| 7,252,619 | B2 * | 8/2007 | Tabata et al. ...................... 477/3 |
| 7,322,902 | B2 * | 1/2008 | Tabata et al. ...................... 477/4 |
| 7,445,578 | B2 * | 11/2008 | Tabata et al. ...................... 477/3 |
| 7,474,012 | B2 * | 1/2009 | Tabata et al. ................. 290/40 C |
| 2008/0076623 | A1 | 3/2008 | Tabata et al. |

FOREIGN PATENT DOCUMENTS

| JP | 7 336810 | 12/1995 |
| JP | 8 135762 | 5/1996 |
| JP | 10-951 | 1/1998 |
| JP | 11 217025 | 8/1999 |
| JP | 2000 2327 | 1/2000 |
| JP | 2000 346187 | 12/2000 |
| JP | 2001 339805 | 12/2001 |
| JP | 2003 301731 | 10/2003 |
| JP | 2004-254468 | 9/2004 |
| JP | 2004 343838 | 12/2004 |

* cited by examiner

*Primary Examiner* — Ha D. Ho
(74) *Attorney, Agent, or Firm* — Oblon, Spivak, McClelland, Maier & Neustadt, L.L.P.

(57) ABSTRACT

In a vehicle driving apparatus including a differential mechanism capable of executing a differential action, a control device can make the driving apparatus small-size, improve fuel consumption, and increase output torque. A transmission mechanism can be switched to a continuously variable shifting state and a step variable shifting state, by a switching clutch or a switching brake. Also, with a switch control bringing the switching clutch into a half-engaged state, during an engine startup/running, while the differential portion is allowed to operate as the electrically controlled continuously variable transmission, a reaction force against an engine torque is generated by the half-engaged switching clutch. Thus, the engine torque not less than the torque bearable by a first electric motor can be inputted into the differential portion, thereby increasing the output torque.

34 Claims, 18 Drawing Sheets

|  | C0 | C1 | C2 | B0 | B1 | B2 | B3 | SHIFTING RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL 4.76 |
| R |  |  | ○ |  |  |  | ○ | 3.209 | |
| N |  | ○ |  |  |  |  |  |  | |

○ ENGAGED
◎ ENGAGED IN STEP-VARIABLE, DISENGAGED IN CONTINUOUSLY-VARIABLE

| | C0 | C1 | C2 | B0 | B1 | B2 | SHIFTING RATIO | STEPPING RATIO |
|---|---|---|---|---|---|---|---|---|
| 1st | ◎ | ○ | | | | ○ | 2.804 | 1.54 |
| 2nd | ◎ | ○ | | | ○ | | 1.531 | 1.53 |
| 3rd | ◎ | ○ | ○ | | | | 1.000 | 1.42 |
| 4th | | ○ | ○ | ◎ | | | 0.705 | TOTAL 3.977 |
| R | | | ○ | | | ○ | 2.393 | |
| N | ○ | | | | | | | |

○ ENGAGED
◎ ENGAGED IN STEP-VARIABLE, DISENGAGED IN CONTINUOUSLY-VARIABLE

CONTROL DEVICE FOR VEHICLE DRIVE APPARATUS

TECHNICAL FIELD

The present invention relates to a vehicle driving apparatus that includes a differential mechanism capable of performing a differential action and an electric motor, and in particular to a technology that reduces the size of an electric motor and the like.

BACKGROUND ART

There has heretofore been known a drive apparatus of a vehicle including a differential device through which an output of a drive power source, such as an engine or the like, is distributed to a first electric motor and an output member, and a second electric motor disposed between the output member and drive wheels. Such drive apparatus for a hybrid vehicle is disclosed for example in a Patent Document 1 and a Patent Document 2. It includes a differential mechanism being comprised of a planetary gear unit and performing a differential action for mechanically transmitting a major part of power outputted from the engine to drive wheels. A remaining part of power from the engine is electrically transmitted from the first electric motor to the second electric motor using an electrical path.

Thus, the drive apparatus operates a transmission of which shifting ratio is electrically changed, for example as an electrically controlled continuously variable automatic transmission. The drive apparatus is controlled by the control device so that the vehicle runs with the optimum operation state of the engine, thus improving fuel consumption, i.e., mileage.

Patent Document 1: JP 2001-339805A
Patent Document 2: JP 2003-301731A

Meanwhile, the hybrid vehicle driving apparatus disclosed in the aforementioned Patent Document 1 generates reaction torque in the first electric motor in accordance with the engine torque that is necessary to serve as an electrically operated continuously variable transmission. This reaction torque that is generated against the engine torque by the first electric motor is limited by the rated output and the amount of heat (temperature) generated by the first electric motor. Accordingly, from the viewpoint of preventing an increase in the size of the first electric motor, it may be necessary to limit the engine torque in order not to exceed the reaction torque that can be generated by the first electric motor. Alternatively, the original output of the engine that is installed in the vehicle may be limited.

In addition to this, generally, continuously variable transmissions are known as apparatuses that improve the fuel efficiency of vehicles, while, step variable transmissions such as gear shifting transmissions are known as apparatuses that provide high transmitting efficiency. Unfortunately, a power transmission mechanism that has both these advantages has not yet been developed. For example, the hybrid vehicle driving apparatus as disclosed in the aforementioned Patent Document 1 or 2 includes an electrical path for the electrical energy to transmit from the first electric motor to the second electric motor, i.e., a transmission path that transmits a part of the drive force in the form of electrical energy. For this reason, the first electric motor is likely to increase in size in accordance with the increase of engine output, and the second electric motor that is driven by the electrical energy provided from the first electric motor is also likely to increase in size. As a result, there is a problem in that the size of the driving apparatus increases.

Also, since a part of the engine output is converted into electrical energy and then transmitted to the drive wheels, fuel efficiency may actually decrease under some vehicle operating conditions, such as operating at high speed. Furthermore, in the case where the aforementioned power distributing mechanism is used as a transmission that electrically changes a shifting ratio, e.g., a continuously variable transmission called an electric CVT, a similar problem exists.

In the conventional vehicle driving apparatus disclosed in the aforementioned Patent Document 1, the differential mechanism or the first electric motor has a torque capacity limit that is derived from its configuration. Accordingly, the differential mechanism or the first electric motor is likely to increase in size in accordance with the increase of engine output, which in turn causes a disadvantage in a vehicle. For example, in a type of conventional vehicle driving apparatus that distributes engine output to the first electric motor and a transmitting member, since the first electric motor controls a transmission that electrically changes a shifting ratio, the first electric motor bears the reaction torque against the engine output torque (hereinafter, referred to as "engine torque"). Accordingly, the reaction torque capacity borne by the first electric motor is required at a level that is in accordance with the engine torque provided. For example, the reaction torque capacity borne by the first electric motor increases in accordance with the increase of the engine torque required to provide a desired acceleration performance, and the like. Consequently, as the output of an engine increases, the first electric motor also increases in size.

Hence, it is conceivable that, in order to protect the differential mechanism or the first electric motor without increasing the size thereof, the engine torque must be temporarily limited to fall within the maximum engine torque range that can be supported by the maximum reaction torque capacity that the first electric motor can bear. However, in this case, this limitation reduces the torque that is transmitted to the drive wheels, which in turn affects acceleration performance. As a result, the desired acceleration performance required may not be provided, particularly while starting the vehicle or undertaking passing maneuvers.

The present invention has been developed in consideration of the above situations, and has an object to provide a control device that is used for a vehicle driving apparatus that includes a differential mechanism performing a differential action, and is capable of reducing the size of the driving apparatus, or of improving the fuel efficiency and increasing the output torque.

A second object of the present invention is to provide a control device that is used for a vehicle driving apparatus that includes a differential mechanism for distributing engine output to a first electric motor and a transmitting member, and an electric motor that is operatively connected to the wheels, and is capable of ensuring the acceleration performance of a vehicle.

DISCLOSURE OF INVENTION

In the first aspect of the present invention, in a control device for controlling a vehicle driving apparatus, the vehicle driving apparatus includes a continuously variable transmission portion that has a differential mechanism for distributing engine output to a first electric motor and a transmitting member, and a second electric motor arranged on a power transmitting path from the transmitting member to drive wheels, and can operate as an electrically operated continuously variable transmission.

The control device is comprised of (a) a differential action limiting device that is disposed in the differential mechanism and limits the differential action of the differential mechanism in order to limit the operation of the continuously variable transmission portion as an electrically operated continuously variable transmission, and (b) differential action limiting means that, during engine running using an engine as a drive source, changes the half-transmitting capacity state of the differential action limiting device when limiting the operation of the continuously variable transmission portion as an electrically operated continuously variable transmission.

According to this aspect of the present invention, the continuously variable transmission portion in the vehicle driving apparatus is brought into a continuously variable shifting state to perform electrically continuously variable shifting action, when the differential mechanism is not limited its differential action by the differential action limiting device and is brought into a differential state to perform a differential action. Also, the continuously variable transmission portion is limited the operation as the electrical continuously variable transmission by being limited the differential action of the differential mechanism by the differential action limiting device. For example, the continuously variable transmission is brought into non-continuously variable shifting state e.g., a step variable shifting state not to perform electrical continuously variable shifting action, by the differential mechanism being brought to the non-differential state e.g., a lock state not to perform a differential action. Thus, a driving apparatus that has both the advantages of an improvement in fuel efficiency effected by a transmission electrically changing a shifting ratio, and high transmitting efficiency effected by a gear shifting transmission mechanically transmitting power, can be provided.

For example, in the case where the continuously variable transmission portion is brought into the continuously variable shifting state during a normal engine power range corresponding to the vehicle low/medium speed running and the low/medium output running, the fuel consumption performance of a vehicle is maintained. In the case where the continuously variable transmission portion is brought into the non-continuously variable shifting state during high speed operation, engine output is exclusively transmitted to the drive wheels via a mechanical power transmitting path. In this case, suppression of the conversion loss improves the fuel efficiency, which conversion loss is generated between power and electrical energy that is generated when the continuously variable transmission portion operates as a transmission that electrically changes a shifting ratio means that fuel efficiency is improved.

In addition to this, in the case where the continuously variable transmission portion is brought into the non-continuously variable shifting state during the high output operation, it operates as a transmission that electrically changes a shifting ratio during vehicle low/medium speed running and low/medium output running. Accordingly, the maximum value of the electrical energy that should be generated by the electric motor, in other words, the maximum value of the electrical energy that is transmitted by the electric motor can be reduced. Therefore, the size of an electric motor or a vehicle driving apparatus including it can be reduced.

In the vehicle driving apparatus that includes the continuously variable transmission portion of which operation as an electrically operated continuously variable transmission is limited, during vehicle engine running using the engine of as a drive source, the operation of the continuously variable transmission portion as the electrically operated continuously variable transmission may be limited. In this case, the differential action limiting means changes the half-transmitting capacity state of the differential action limiting device. Accordingly, while the continuously variable transmission portion can operate as an electrically operated continuously variable transmission, the differential action limiting device generates reaction torque against the engine output torque or engine torque.

That is, in order to allow the continuously variable transmission portion to operate as an electrically operated continuously variable transmission, besides the first electric motor bears the reaction torque against the engine torque, the differential action limiting device can also bear the reaction torque against the engine torque. In other word, the reaction torque against the engine torque is born by both the first electric motor and the differential action limiting device. Accordingly, for example, engine torque that is not less than the engine torque that can be borne by the torque capacity of the first electric motor can be input into the continuously variable transmission portion. Therefore, the output from the continuously variable transmission portion can be increased without increasing the torque capacity, i.e., the size, of the first electric motor.

In the second aspect of the present invention, the differential action limiting device is an engaging device. The differential action limiting means brings the differential action limiting device into a half-engagement state in order to change the ratio between the output electrically transmitted from the first electric motor to the second electric motor in the continuously variable transmission portion, and the output mechanically transmitted to the transmitting member in the continuously variable transmission portion.

According to this aspect of the present invention, the engaging device can easily limit the operation of the continuously variable transmission portion as an electrically operated continuously variable transmission. Accordingly, while the continuously variable transmission portion being allowed to operate as an electrically operated continuously variable transmission, reaction torque against the engine torque is generated. In addition to this, in contrast to the case where the engaging device is disengaged or released, the first electric motor does not necessarily bear the reaction torque against the entire engine torque that is inputted into the continuously variable transmission portion. Accordingly, in the case of the same magnitude engine torque being input into the continuously variable transmission portion, the ratio of engine torque that should be borne by the first electric motor can be reduced. Therefore, the first electric motor is improved in its durability and reduced in its size. Additionally, owing to the reduced electrical energy from the first electric motor to the second electric motor, the durability of the second electric motor is also improved.

In the third aspect of the present invention, in a control device for controlling a vehicle driving apparatus, the vehicle driving apparatus includes a differential portion that includes a differential mechanism for distributing engine output to a first electric motor and a transmitting member, and a second electric motor arranged on a power transmitting path from the transmitting member to drive wheels, and can operate as an electrically operated differential device.

The control device is comprised of (a) a differential action limiting device that is disposed in the differential mechanism and limits the differential action of the differential mechanism in order to limit the operation of the differential portion as an electrically operated differential device, and (b) differential action limiting means that, during vehicle engine running using the engine as a drive source, changes the half-transmitting capacity state of the differential action limiting device when limiting the operation of the differential portion as an electrically operated differential device.

According to this aspect of the present invention, the differential portion in the vehicle driving apparatus is brought into a differential state to perform a differential action, and the differential mechanism is not limited its differential action by the differential action limiting device and is brought into a differential state to perform the differential action. Also, the differential portion is limited the operation as the electrical continuously variable transmission by being limited the differential action of the differential mechanism by the differential action limiting device. For example, the differential portion is brought into non-continuously variable shifting state e.g., a step variable shifting state not to perform electrical continuously variable shifting action, by the differential mechanism being brought to the non-differential state e.g., a lock state not to perform a differential action. Thus, a driving apparatus can be provided, that has both the advantages of an improvement in fuel efficiency effected by a transmission electrically changing a shifting ratio, and high transmitting efficiency effected by a gear shifting transmission mechanically transmitting power.

For example, in the case where the differential portion is brought into the differential state during a normal engine power range corresponding to the vehicle low/medium speed running and the low/medium output running, the fuel consumption performance of a vehicle is maintained. In the case where the differential portion is brought into the non-differential state during the high-speed running, engine output is exclusively transmitted to the drive wheels via a mechanical power transmitting path. In this case, suppression of the conversion loss, between power and electrical energy that is generated when the differential portion operates as a transmission that electrically changes a shifting ratio means that fuel efficiency, is improved.

In the case where the differential portion is brought into the non-differential state during the high output running, the differential portion operates as a transmission that electrically changes a shifting ratio in the vehicle low/medium speed running and low/medium output running. Accordingly, the maximum value of the electrical energy that should be generated by the electric motor, in other words, the maximum value of the electrical energy that is transmitted by the electric motor can be reduced. Therefore, the size of the electric motor or a vehicle driving apparatus including it can be reduced.

In the vehicle driving apparatus that includes the differential portion of which operation as an electrically operated differential device is limited, during vehicle engine running using the engine as a drive source, the operation of the differential portion as an electrically operated differential device may be limited. In this case, the differential action limiting means changes the half-transmitting capacity state of the differential action limiting device. Accordingly, while the differential portion can operate as an electrically operated differential device, the differential action limiting device generates the reaction torque against the engine torque.

That is, in order to allow the differential portion to operate as an electrically operated differential device, besides the first electric motor bears the reaction torque against the engine torque, the differential action limiting device can also bear the reaction torque against the engine torque. Accordingly, engine torque that is not less than the engine torque that can be borne by the torque capacity of the first electric motor can be input into the differential portion. Therefore, the output from the differential portion can be increased without increase of the torque capacity, i.e., the size, of the first electric motor.

In the fourth aspect of the present invention, the differential action limiting device is an engaging device. The differential action limiting means brings the differential action limiting device into a half-engagement state in order to change the ratio between the output electrically transmitted from the first electric motor to the second electric motor in the differential portion, and the output mechanically transmitted to the transmitting member in the differential portion.

According to this aspect of the present invention, the engaging device can easily limit the operation of the differential portion as an electrically operated differential device. Accordingly, the differential portion being allowed to operate as an electrically operated differential device, reaction torque against the engine torque is generated. In addition to this, in contrast to the case where the engaging device is released, the first electric motor does not necessarily bear the reaction torque against the entire engine torque input into the differential portion. Accordingly, in the case of the same magnitude engine torque being input into the differential portion, the ratio of engine torque that should be borne by the first electric motor is reduced, resulting in that the first electric motor can be reduced in its size, and is improved in its durability. Moreover, owing to the reduction of electrical energy from the first electric motor to the second electric motor, the durability of the second electric motor is also improved.

In the fifth aspect of the present invention, in a control device for controlling a vehicle driving apparatus, the vehicle driving apparatus includes a differential portion that includes an electric motor and a differential mechanism, and the electric motor generates reaction torque corresponding to engine output torque that is inputted into the differential mechanism to operate as an electrically operated differential device.

The control device is comprised of (a) an engaging device that is disposed in the differential mechanism and limits the differential action of the differential mechanism in order to limit the operation of the differential portion as an electrically operated differential device, and (b) differential action limiting means or a differential action limiting portion that, when limiting operation of the differential portion as the electrical differential device during vehicle engine running using an engine as a drive source, brings the engaging device into a half-engaged state, and generates reaction torque corresponding to engine output torque with the total torque generated by the electric motor and the half-engaged torque of the engaging device.

According to this aspect of the present invention, the differential portion in the vehicle driving apparatus is brought into a differential state, the differential mechanism is not limited in its differential action by the engaging device and is brought into a differential state to perform a differential action. Also, the differential portion is limited the operation as the electrical continuously variable transmission by being limited the differential action of the differential mechanism by the engaging device. For example, the differential portion is brought into non-continuously variable shifting state e.g., a step variable shifting state not to perform electrical continuously variable shifting action, by the differential mechanism being brought to the non-differential state e.g., a lock state not to perform a differential action. Thus, a driving apparatus that has both the advantages of an improvement in fuel efficiency effected by a transmission electrically changing a shifting ratio, and high transmitting efficiency effected by a gear shifting transmission mechanically transmitting power, can be provided.

For example, in the case where the differential portion is brought into the differential state in a normal engine power range corresponding to the low/medium speed running and the low/medium output running, the fuel consumption performance of a vehicle is maintained. In addition to this, in the case where the differential portion is brought into the non-differential state during the high speed running, engine output is exclusively transmitted to the drive wheels via a mechanical power transmitting path. In this case, suppression of the conversion loss, between power and electrical energy generated when the continuously variable transmission portion operates as a transmission that electrically changes a shifting ratio, improves fuel efficiency.

Additionally, in the case where the differential portion is brought into the non-differential state during the high output operation, the differential portion operates as a transmission that electrically changes a shifting ratio in the vehicle low/medium speed running and low/medium output running. Accordingly, the maximum value of the electrical energy that should be generated by the electric motor, in other words, the maximum value of the electrical energy transmitted by the electric motor is reduced. Therefore, the size of the electric motor or a vehicle driving apparatus including it can be reduced.

In the vehicle driving apparatus that includes the differential portion of which operation as an electrically operated differential device is limited, during vehicle engine running using the engine of the vehicle as a drive source, the operation of the differential portion as an electrically operated differential device may be limited. In this case, the differential action limiting means brings the engaging device into the half-engaged state, and generates reaction torque corresponding to engine output torque with the total torque that is generated by the electric motor and the half-engaged torque of the engaging device. Accordingly, while the differential portion can operate as an electrically operated differential device, the differential action limiting device generates reaction torque against the engine torque. That is, in order to allow the differential portion to operate as an electrically operated differential device, besides the electric motor bears the reaction torque against the engine torque, the engaging device can also bear the reaction torque against the engine torque.

Accordingly, for example, engine torque that is not less than the engine torque that can be borne i.e., bearable engine torque by the torque capacity of the electric motor can be input into the differential portion. Therefore, the output from the differential portion can be increased without increase of the torque capacity, i.e., the size, of the electric motor. In addition to this, in contrast to the case where the engaging device is released, the electric motor does not necessarily bear the reaction torque against the entire engine torque that is inputted into the differential portion. Accordingly, in the case of the same magnitude engine torque being input into the differential portion, the engine torque that should be borne by the electric motor can be reduced, so that the electric motor can be reduced in the size and is improved in the durability.

In the sixth aspect of the present invention, the differential action limiting means limits the operation of the differential portion as an electric differential device, when the differential mechanism receives engine output torque that is not less than the reaction torque that can be generated by the electric motor alone. According to the present invention, the differential portion can operate as an electric differential device. In addition, a reaction force against the engine torque is preferentially generated as much as possible by the electric motor, so that regeneration energy increases as much as possible. From another point of view, the energy loss is minimized down to an unavoidable level.

In the seventh aspect of the present invention, the differential action limiting means limits the operation of the differential portion as an electric differential device during vehicle engine startup using the engine of the vehicle as a drive source. According to the present invention, even during vehicle startup that requires large engine torque, while the differential portion can operate as an electric differential device, a reaction force against the engine torque is preferentially generated as much as possible by the electric motor, so that regeneration energy increases much as possible. From another point of view, the energy loss down is minimized to an unavoidable level.

In the eighth aspect of the present invention, the control device further includes engine torque restriction means which limits engine output torque based on the reaction torque i.e., reaction force torque generated by the electric motor and the engaging device set in the half-engaged state thereof. According to the present invention, the differential portion is prevented from receiving the engine torque exceeding the total torque of the maximum torque capacity comprised of the electric motor and the half-engaged torque of the engaging device. Thus, the durability of the electric motor is improved.

In the ninth aspect of the present invention, in a control device for controlling a vehicle driving apparatus, the vehicle driving apparatus includes a differential mechanism for distributing engine output to a first electric motor and a transmitting member, and a second electric motor operatively connected to drive wheels.

The control device is comprised of (a) an engaging device that is disposed in the differential mechanism, and selectively switches the differential mechanism between a differential state and a non-differential state, (b) reaction force controlling means that, in the differential state of the differential mechanism, executes a reaction force control against the engine output by an output control that controls the output of the first electric motor, and a slip control that brings the engaging device into a slip engaged state, for causing the transmitting member to generate output, and (c) share ratio changing means that changes a share ratio between a share part of the reaction torque controlled by the output of the first electric motor, and a share part of the reaction torque controlled by the slip control of the engaging device.

According to the present invention, in the differential state of the differential mechanism, the reaction force controlling means executes the reaction force control against the engine output by executing the output control controlling the output of the first electric motor and the slip control bringing the engaging device into the slip engaged state. In addition to this, the share ratio changing means changes the share ratio between the share part of the reaction torque controlled by the output of the first electric motor, and the share part of the reaction torque controlled by the slip control of the engaging device. Therefore, an acceleration performance that is favorable during startup of a vehicle and the like can be rendered.

In the tenth aspect of the present invention, the share ratio changing means changes the share ratio by controlling the slip amount of the engaging device. According to the present invention, since the share ratio changing means changes the share ratio by controlling the slip amount of the engaging device, a reaction force provided by the slip of the engaging device is added to a reaction force against the output of the first electric motor. Thus, acceleration performance is improved.

In the eleventh aspect of the present invention, a torque assist control means is included which, when the output generated in the transmitting member by the reaction torque caused by the output of the first electric motor, and the reaction torque caused by the slip control of the engaging device are short of the drive force required of the vehicle, controls the output of the second electric motor to compensate for the shortage. According to the present invention, when the output generated in the transmitting member by the reaction force controlling means is short of the drive force required of the vehicle, the torque assist control means controls the output of the second electric motor to compensate for the shortage. As a result, acceleration performance of the vehicle is sufficiently maintained during startup and the like.

In the twelfth aspect of the present invention, an engine output suppressing means is included which, when the reaction force capacity that can be generated by the reaction force control of the reaction force controlling means is short of engine output, suppresses the engine output. According to the present invention, when the reaction force by the reaction control of the reaction force controlling means is short of engine output, the engine output suppressing means suppresses the engine output. Accordingly, the first electric motor and the engaging device are prevented from being used beyond their torque capacities, being suitably protected and improved in their durability.

In the thirteenth aspect of the present invention, the reaction force controlling means executes reaction force control during startup of a vehicle. According to this invention, owing to reaction force control executed by the reaction force controlling means during startup of the vehicle, acceleration performance during operation is sufficiently maintained during startup of the vehicle.

In the fourteenth aspect of the present invention, in a control device for controlling a vehicle driving apparatus, the vehicle driving apparatus includes a differential mechanism for distributing engine output to a first electric motor and a transmitting member, and a second electric motor operatively connected to drive wheels.

The control device is comprised of (a) an engaging device that is disposed in the differential mechanism, and selectively switches the differential mechanism between a differential state and a non-differential state, (b) required drive force setting means that sets a required drive force required for a vehicle in accordance with an accelerator opened magnitude, (c) reaction force controlling means that, in the differential state of the differential mechanism, executes a reaction force control against the engine output by an output control controlling the output of the first electric motor, and a slip control bringing the engaging device into a slip engaged state for causing the transmitting member to generate output, and (d) output controlling means that controls the output generated in the transmitting member by the reaction force controlling means and the output of the second electric motor to generate the required drive force set by the required drive force setting means.

According to the present invention, the control device includes (a) the engaging device that is disposed in the differential mechanism, and selectively switches the differential mechanism between a differential state and a non-differential state, (b) the required drive force setting means that sets a required drive force required for a vehicle in accordance with an accelerator opened magnitude, (c) the reaction force controlling means that, in the differential state of the differential mechanism, executes the reaction force control against the engine output by executing the output control controlling the output of the first electric motor, and the slip control bringing the engaging device into a slip engaged state for causing the transmitting member to generate output, and (d) the output controlling means that controls the output that is generated in the transmitting member by the reaction force controlling means and the output of the second electric motor to generate the required drive force set by the required drive force setting means.

Accordingly, an engine reaction force can be borne by both the output control of the first electric motor and by the slip control of the engaging device to generate output for the drive wheels, and in addition to this, output for the drive wheels is also generated from the second electric motor. Control of both these types of output can generate drive force that is required by a driver based on accelerator operation, maintaining vehicle acceleration performance.

In the fifteenth aspect of the present invention, the output controlling means executes output control during startup of the vehicle. According to the present invention, owing to output control executed by the output controlling means during startup of the vehicle, acceleration performance is sufficiently maintained during startup operating of the vehicle.

In the sixteenth aspect of the present invention, the reaction force controlling means starts the slip control that brings the engaging device into the slip engaged state, when the engine output torque exceeds a switching determination value of the reaction torque that can be borne i.e., bearable reaction force by the first electric motor. According to this invention, the reaction force controlling means starts the slip control that brings the engaging device into the slip engaged state, when the engine output torque exceeds a switching determination value that can be borne by the first electric motor. Accordingly, a large reaction force can be generated, that exceeds the switching determination value of a reaction torque that can be borne by the first electric motor. Thus, the size of the first electric motor can be reduced.

In the seventeenth aspect of the present invention, the reaction force controlling means reduces a slip amount of the engaging device as a reaction force shortage amount of the first electric motor M1 increases. According to the present invention, the reaction force controlling means reduces the slip amount of the engaging device as the reaction force shortage amount of the first electric motor M1 increases. Consequently, besides the reaction torque against the engine torque is borne by the first electric motor M1, the reaction force that is mechanically borne by the engaging device can be continuously increased.

In the eighteenth aspect of the present invention, the reaction force controlling means reduces a slip amount of the engaging device as the engine torque increases. According to the present invention, the reaction force controlling means reduces the slip amount of the engaging device as the engine torque increases. Consequently, besides the reaction torque against the engine torque is borne by the first electric motor M1, the reaction torque mechanically borne by the engaging device can be continuously increased.

In the nineteenth aspect of the present invention, the reaction force controlling means brings the engaging device into a completely engaged state, when the engine output torque exceeds the total reaction torque which is sum of the reaction force borne by the first electric motor and the reaction force borne by the engaging device. According to the present invention, the engaging device is brought into the completely engaged state by the reaction force controlling means, when engine output torque exceeds the total reaction torque which is sum of the reaction force borne by the first electric motor and the reaction force borne by the engaging device. Thus, the engaging device is improved in its durability.

Suitably, the differential action limiting means changes the half-transmitting capacity state of the differential action limiting device, when limiting the operation of the continuously variable transmission portion as an electrically operated continuously variable transmission, if the differential mechanism cannot be brought into the non-differential action state not to perform the differential action. In this case, even if failure or an operation response delay due to functionality degradation occurs, besides the first electric motor bears the reaction torque against the engine torque, the differential action limiting device can also bear the reaction torque against the engine torque.

Suitably, the differential action limiting means changes the half-transmitting capacity state of the differential action limiting device, when limiting the operation of the differential portion as the electrically operated differential device, if the differential mechanism cannot be brought into the non-differential state not to perform a differential action. In this case, even if failure or an operation response delay due to functionality degradation occurs, besides the first electric motor bears the reaction torque against the engine torque, the differential action limiting device can also bear the reaction torque against the engine torque.

Suitably, the differential action limiting means brings the engaging device into the half-engaged state and generates reaction torque by using the torque generated by the electric motor and the half-engaged torque of the engaging device, in case of limiting the operation of the differential portion as the electrically operated differential device, if the differential mechanism is not brought into the non-differential state not to perform the differential action. In this case, even if failure of a friction member of the engaging device, a functionality degradation or failure of an actuator, or operation response delay due to functionality degradation of an actuator occurs, besides the first electric motor bears the reaction torque against the engine torque, the engaging device can also bear the reaction torque against the engine torque.

Suitably, the differential mechanism includes a first element connected to the engine, a second element connected to the first electric motor, and a third element connected to the transmitting member. The differential action limiting device or the engaging device allows at least the second element and third element to rotate at speeds that are different from each other to bring the differential mechanism into the differential state. It allows the first to third elements to rotate together with respect to each other or brings the second element into a non-rotatable state to bring the differential mechanism into the non-differential state, e.g., in a locked state. In this case, the differential mechanism can be switched between the differential state and the non-differential state.

Preferably, the differential action limiting device or the engaging device is provided with the clutch and/or the brake. The clutch mutually connects two of the first to third elements to cause the first to third elements to integrally rotate as one unit, while the brake connects the second element to the non-rotatable member to place it in the non-rotatable state. With such structure, the differential mechanism can be easily switched between the differential position and the non-differential position.

Preferably, the differential mechanism is placed, by release of the clutch and the brake, in the differential state in which at least the second element and the third element are rotatable at different speed to operate as the electric differential device. The differential mechanism operates as the transmission having the gear ratio of 1 by engagement of the clutch, and operates as the speed-increasing transmission having the gear ratio smaller than 1 by engagement of the brake. With such structure, the differential mechanism is switched to the differential state and the non-differential state, and can operate as the transmission having the fixed gear ratio of the single stage or the multiple stages.

Preferably, the differential mechanism is comprised of the planetary gear unit, of which the carrier corresponds to the first rotary element, of which the sun gear corresponds to the second rotary element, and of which the ring gear corresponds to the first rotary element. With such structure, the differential mechanism can be short in the axial dimension, and can be easily constructed by one planetary gear unit. Preferably, the planetary gear unit is comprised of the single pinion type one. With such structure, the differential mechanism can be short in the axial dimension, and can be easily constructed by one single pinion type planetary gear unit.

Preferably, the vehicle driving apparatus further includes the transmission portion i.e., shifting portion disposed in the power transmitting path between the transmitting member and the driving wheel. With such structure, the total gear ratio of the driving apparatus is determined based on the gear ratio of the continuously variable transmission portion or the differential portion and the gear ratio of the transmission portion, which renders the following advantages. That is, the driving force is widely obtained using the gear ratio of the shifting portion, and efficiency of the continuously variable shifting control is further increased. In addition, structure that the second electric motor is connected to the transmitting member, and the transmission portion is placed in the speed-decreasing transmission having the gear ratio larger than 1 is preferable. With such structure, the second electric motor sufficiently outputs the small or low output torque to the output shaft of the transmission portion, being compactified in size.

The transmission portion or the shifting portion is preferably a step variable automatic transmission. According to the step variable automatic transmission, in the continuously variable shifting state of the continuously variable transmission portion, the continuously variable transmission portion and the shifting portion construct the continuously variable transmission. In the non-continuously variable shifting state, the continuously variable transmission portion constructs, together with the shifting portion, the step variable transmission.

Suitably, the first electric motor, the differential mechanism and the second electric motor construct the electric continuously variable transmission capable of changing the gear ratio continuously and allowing the continuously variable shifting running of the vehicle. The differential mechanism is preferably provided with the engaging device for selectively switching the differential mechanism between the differential state and the non-differential state, to realize the unlocked state capable of performing the differential action and the locked state limiting the differential mechanism.

Suitably, the engaging device provides a first locked state that selectively brings any two of the rotary elements of the differential mechanism into engagement with each other to rotate them together, and a second locked state that brings any of the rotary elements of the differential mechanism into engagement with a non-rotatable member to allow the differential mechanism to operate as a speed increasing gear. In this case, since the differential mechanism serves as a two-step sub transmission, the number of shifting positions i.e., steps is increased without increase in the axial dimension.

Suitably, the differential action limiting means brings the differential action limiting device into the half-transmitting capacity state and changes the half-transmitting capacity state of the differential action limiting device, in the case of limiting the operation of the continuously variable transmission portion as an electrically operated continuously variable transmission, if the differential mechanism is not brought into the non-differential action state not to perform the differential action. In this case, even if a failure or an operation response delay due to functionality degradation occurs, besides the first electric motor bears the reaction torque against the engine torque, the differential action limiting device can also bear the reaction torque against the engine torque. Suitably, the differential mechanism may be constructed by two sets of planetary gear unit. In addition to this, the first electric motor or second electric motor can be arranged in the differential mechanism on the power transmitting path via a speed reducer.

EXPLANATION OF REFERENCES

Figures 1, 2:
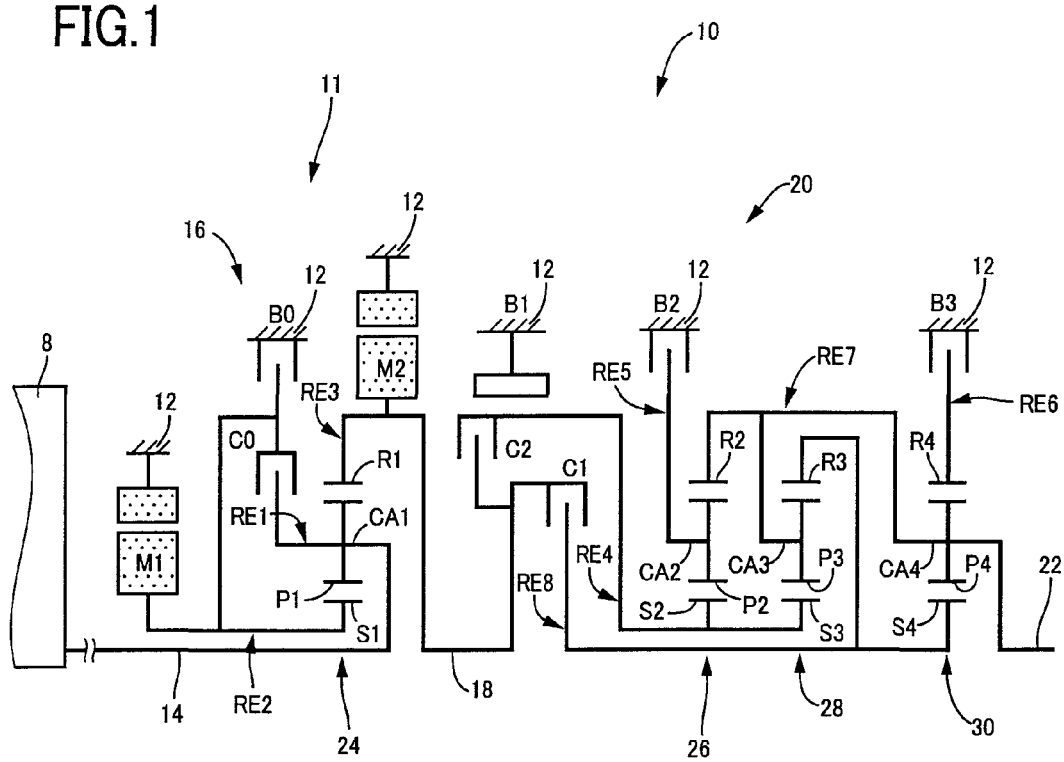
FIG. 1 is a skeleton view explaining a structure of a drive apparatus of hybrid vehicle which is one embodiment according to the present invention.
FIG. 2 is an operation Table explaining a relation between a shifting operation of the drive apparatus of the hybrid vehicle of the embodiment shown in FIG. 1 operable in a continuously variable shifting state or a step variable shifting state, and operation combinations of hydraulic-type frictionally engaging devices used therefor.

8: engine
10, 70: shifting mechanism (drive apparatus)
11: differential portion (continuously variable transmission portion)
16: power distribution mechanism differential mechanism)
18: transmitting member
38: driving wheel
40: electronic control device (control device)

50: switch control means (differential action limiting means)
52: hybrid control means (output control means)
88: input torque limiting means (engine torque limiting means)
M1: first electric motor
M2: second electric motor
C0: switching clutch (difference action limiting device, engaging device)
B0: switching brake (difference action limiting device, engaging device)
176: required drive force setting means
178: reaction force control means
188: input torque limiting means (engine output suppression means)
192: torque assisting control means

PREFERRED EMBODIMENT OF THE INVENTION

Hereinafter, embodiments of the present invention will be explained with reference to attaching drawings.

Embodiment 1

FIG. 1 is a skeleton view explaining a shifting mechanism 10 constructing a part of a drive apparatus of a hybrid vehicle according to one embodiment of the present invention. The shifting mechanism 10 includes an input shaft 14, a differential portion 11, an automatic transmission portion i.e., shifting portion 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 is connected to the input shaft 14 directly or indirectly via a pulsation absorbing damper (vibration damping device) not shown. The automatic transmission portion 20 functioning as a step-variable type transmission is disposed between the differential mechanism 11 and the output shaft 22 to be connected thereto in series. The output shaft 22 as an output rotation member is connected to the automatic transmission portion 20.

This shifting mechanism 10 of this embodiment is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles.

In the shifting mechanism 10 of this embodiment, the engine 8 and the differential portion 11 is directly connected. Here, "the direct connection" includes, in addition to a connection without using any fluid-type transmitting device such as a torque converter or fluid engaging, a connection with using vibration damping device. Noted that a lower half of the shifting mechanism 10, constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism for distributing an output of the engine 8 inputted to the input shaft 14 to the first electric motor M1 and the transmitting member 18, as the differential mechanism. The second electric motor M2, being rotatable integral with the transmitting member 18, may be disposed at any portion of a power transmitting path extending between the transmitting member 18 and the drive wheel 38.

In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B1. The first planetary gear unit 24 of single pinion type has a gear ratio ρ1 of about 0.418, for example. It has, as rotary elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Assuming the numbers of teeth of the first sun gear S1 and the first ring gear R1 by ZS1 and ZR1, respectively, the above gear ratio ρ1 is represented by ZS1/ZR1.

In the power distributing mechanism 16, the first carrier CA1 is connected to the input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential action.

Thus, the output of the engine 8 is distributed to the first electric motor M1 and the transmitting member 18, and a part of the output distributed to the first electric motor M1 is used to generate and store power thereat or to drive the second electric motor M2. Accordingly, the differential portion 11 (power distributing mechanism 16) functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11 placed in the continuously variable state by the differential state of the power distributing mechanism 16 functions as the electrically controlled continuously variable transmission in which gear ratio γ0 (rotating speed of the driving device input shaft 14/rotating speed of the transmitting member 18) electrically changes from a minimum value γ0 min to a maximum value γ0 max.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged integrally by engagement of the switching clutch C0, the rotary elements of the first planetary gear unit 24 including the first sun gear S1, first carrier CA1 and first ring gear R1 are placed in a locked state or a non-differential state to be rotatable as a unit. With this, also the differential portion 11 is placed to the non-differential state. Thus, the rotating speeds of the engine 8 and the power transmitting member 18 coincides with each other, so that the differential portion 11

(power distributing mechanism 16) is placed in a fixed shifting state, that is a step-variable shifting state functioning as the transmission having a fixed gear ratio γ0 equal to 1.

Then, when the switching brake B0 is engaged instead of the switching clutch C0 to connect the first sun gear S1 with the case 12, the power distributing mechanism 16 is placed in a locked state or non-differential state impossible to perform the differential operation with the non-rotating state of the first sun gear S1. With this, also the differential portion 11 is placed in the non-differential state. Due to the higher rotating speed of the first ring gear R1 than that of the first carrier CA1, the power distributing mechanism 16 functions as a speed-increasing mechanism. The differential portion 11 (power distributing mechanism 16) is placed in the fixed shifting state, i.e., the step-variable shifting state functioning as the speed-increasing mechanism of which a gear ratio γ0 is fixed in a value smaller than 1, for example, about 0.7.

In the present embodiment, the switching clutch C0 and switching brake B0 selectively place the differential portion 11 (power distributing mechanism 16) to the differential state i.e., non-locked state, and in the non-differential state i.e., the locked state. In detail, in the differential state, the differential portion 11 (power distributing mechanism 16) is operable as the electrically controlled differential device. For example, in the continuously variable shifting state, it is operable as the continuously variable transmission of which shifting ratio is continuously variable.

The switching clutch C0 and switching brake B0 also place the differential portion 11 (power distributing mechanism 16) in the shifting state not operable as the electrically controlled differential device. For example, in the locked state with the shifting ratio being locked in the fixed value, the differential portion 11 (power distributing mechanism 16) is not operable as the continuously variable transmission, with the continuously variable shifting operation being inoperative. In other words, in the locked state, the differential portion 11 (power distributing mechanism 16) operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 (power distributing mechanism 16) operates as the single-stage or multi-stage transmission having one or not less than two shifting ratio(s).

From another point of view, the switching clutch C0 and the switching brake B0 bring the power distributing mechanism 16 into the non-differential state to limit the differential action of the power distributing mechanism 16 thereby bringing the differential portion 11 into the non-continuously variable shifting state to limit the operation of the differential portion 11 as the electrically operated differential device. In other words, the switching clutch C0 and the switching brake B0 serve as a differential action limiting device that limits the operation of the differential portion 11 as an electrically operated continuously variable transmission.

The automatic transmission portion 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio ρ2 of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio ρ3 of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio ρ4 of about 0.421.

Assuming the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios ρ2, ρ3 and ρ4 are represented by ZS2/ZR2, ZS3/ZR3, and ZS4/ZR4, respectively.

In the automatic transmission portion 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic transmission portion 20 and the transmitting member 18 are selectively connected to each other through the first clutch C1 or the second clutch C2 used for establishing the gear shift position in the automatic transmission portion 20. In other words, the first clutch C1 and the second clutch C2 function as the engaging device between the transmitting member 18 and the automatic transmission portion 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition.

The switching clutch C0, the first clutch C1, the second clutch C2, the switching brake B0, the first brake B1, the second brake B2 and the third brake B3 are hydraulic-type frictionally engaging devices used in a conventional vehicular automatic transmission. The frictionally engaging device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the shifting mechanism 10 of this embodiment, by engagement of any of the switching clutch C0 and switching brake B0 provided in the power distributing mechanism 16, the differential portion 11 can construct, in addition to the continuously variable shifting state operable as the continuously variable transmission, the non-continuously variable shifting state (fixed shifting state) operable as the transmission of the fixed shifting ratio. Accordingly, in the shifting mechanism 10, the differential portion 11 placed in the fixed shifting state by engagement of any of the switching clutch C0 and switching brake B0 and the automatic transmission portion 20, construct the step variable shifting state operable as the step-variable transmission. The differential portion 11 placed in the continuously variable shifting state by non-engagement of both the switching clutch C0 and switching brake B0 and the automatic transmission portion 20, construct the continuously variable shifting state operable as the continuously variable transmission. In other words, the shifting mechanism 10 is switched to the step-variable shifting state by engagement of any of the switching clutch C0 and switching brake B0, and is switched to the continuously variable shifting state by non-engagement of both the switching clutch C0 and switching brake B0. The differential portion 11 is the transmission also switched to the step-variable shifting state and the continuously variable shifting state.

Concretely, when the shifting mechanism 10 functions as the step variable transmission with the differential portion 11 placed in the non-continuously variable shifting state, any one of the switching clutch C0 and the switching brake B0 is engaged, and the first clutch C1, the second clutch C2, the first brake B1, the second brake B2 and the third brake B3 are selectively engaged. With this engagement, the hydraulic type frictional engaging device i.e., engagement device at a release side, and the hydraulic type frictional engage device at an engage side, both related to the shifting, are automatically switched the gear ratio. For this switching, one of a first-gear position (first-speed position) through a fifth-gear position (fifth-speed position), a reverse-gear position (rear-drive position) and a neural position is selectively established.

A total gear ratio $\gamma T$ (input shaft rotation speed $N_{IN}$/output shaft rotation speed $N_{OUT}$) changing as geometric series can be obtained for every gear positions. This total gear ratio $\gamma T$ of the shifting mechanism 10 is the total or overall gear ratio of the entire shifting mechanism 10 formed based on a gear ratio $\gamma 0$ of the differential portion 11, and a gear ratio $\gamma$ of the automatic transmission portion 20.

For example, when the shifting mechanism 10 functions as the step-variable transmission, for example, as shown in the operation Table in FIG. 2, engagement of the switching clutch C0, the first clutch C1 and the third brake B3 establish the first-gear position having the highest gear ratio $\gamma 1$ of about 3.357, for example, and engagement of the switching clutch C0, the first clutch C1 and the second brake B2 establish the second-gear position having the gear ratio $\gamma 2$ of about 2.180, for example, which is lower than the gear ratio $\gamma 1$. Further, engagement of the switching clutch C0, first clutch C1 and first brake B1 establish the third-gear position having the gear ratio $\gamma 3$ of about 1.424, for example, which is lower than the gear ratio $\gamma 2$, and engagement of the switching clutch C0, first clutch C1 and second clutch C2 establish the fourth-gear position having the gear ratio $\gamma 4$ of about 1.000, for example, which is lower than the gear ratio $\gamma 3$.

Engagement of the first clutch C1, second clutch C2 and switching brake B0 establish the fifth-gear position having the gear ratio $\gamma 5$ of about 0.705, for example, which is smaller than the gear ratio $\gamma 4$. Further, engagement of the second clutch C2 and the third brake B3 establish the reverse-gear position having the gear ratio $\gamma R$ of about 3.209, for example, which positions between the gear ratios $\gamma 1$ and $\gamma 2$. The neutral position N is established by engaging only the switching clutch C0.

However, when the shifting mechanism 10 functions as the continuously variable transmission, with the differential portion 11 placed in the continuously variable shifting state, the switching clutch C0 and the switching brake B0 are both released i.e., disengaged. With this, the differential portion 11 functions as the continuously variable transmission, and the automatic transmission portion 20 connected in series thereto functions as the step-variable transmission. The rotating speed to be input to the automatic transmission portion 20 placed in one of the gear positions M, that is the rotating speed of the transmitting member 18 is continuously changed so that the continuously variable gear ratio width can be obtained for each of the gear positions. Accordingly, the total gear ratio $\gamma T$ of the shifting mechanism 10 is steplessly obtained.

For example, the case where the shifting mechanism 10 functions as the continuously variable transmission will be explained with reference to the operation Table in FIG. 2. In the state the switching clutch C0 and the switching brake B0 both released, the rotation speed input into the automatic transmission portion 20 for each of the gear positions such as the first gear position, the second gear position, the third gear position, the fourth gear position of the automatic transmission portion 20, that is the rotation speed of the transmitting member 18 is steplessly changed (engagement of the automatic transmission portion 20 in the fifth gear position is equivalent to that of the fourth gear position). Thus, between the adjacent gear positions, the gear ratio changes steplessly and continuously, which leads to the stepless total gear ratio $\gamma T$ for the entire shifting mechanism 10.

Figure 3:
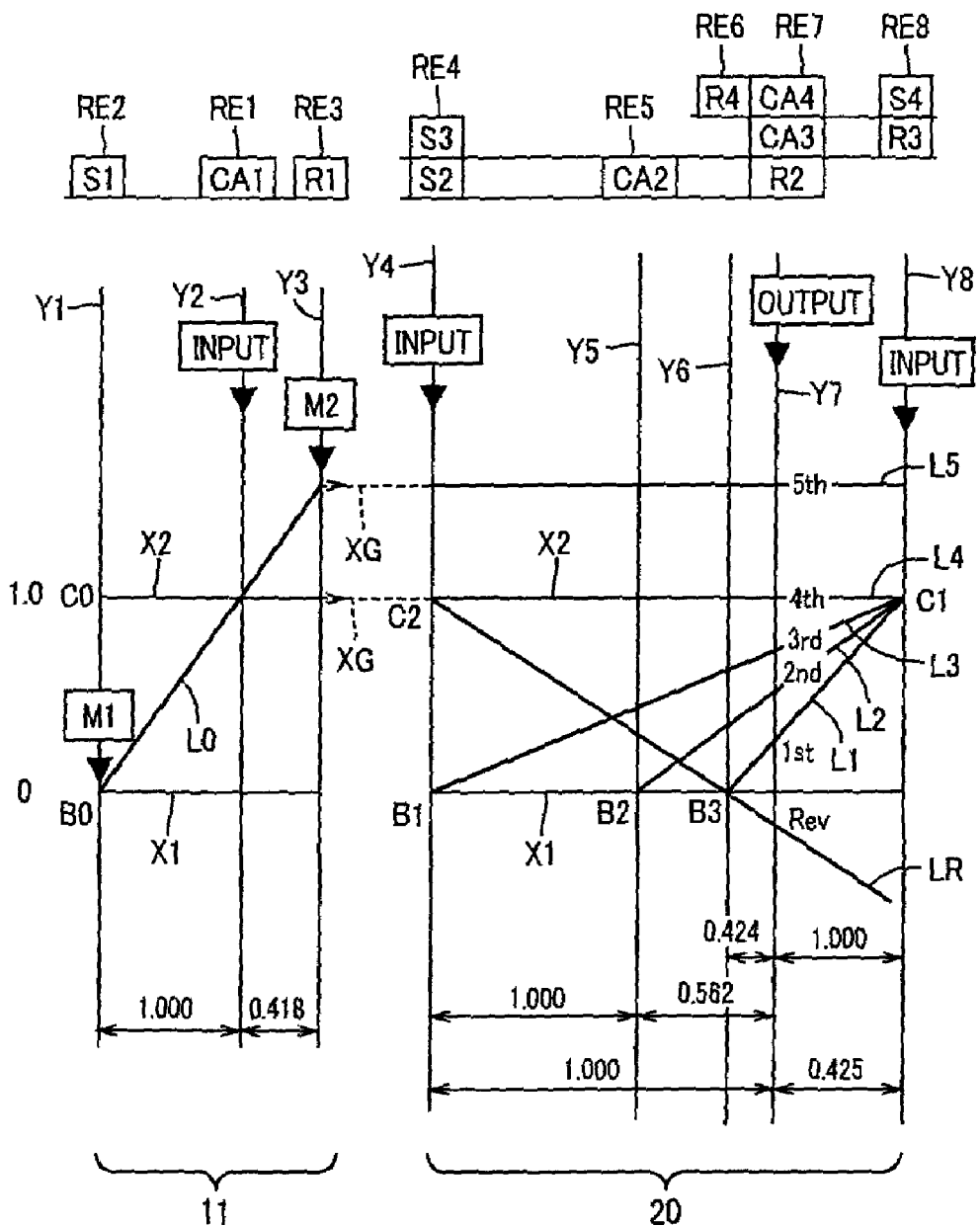
FIG. 3 is a collinear chart explaining relative rotating speeds of rotary elements in each of gear positions when the drive apparatus of the hybrid vehicle of the embodiment shown in FIG. 1 is operated in the step variable shifting mode.

FIG. 3 shows a collinear chart representing by straight lines a relation among the rotating speeds of the rotary elements different in each of the gear positions of the shifting mechanism 10. The shifting mechanism 10 is constituted by the differential portion 11 functioning as the continuously variable shifting portion or first shifting portion, and the automatic transmission portion 20 functioning as the step-variable shifting portion or second shifting portion. The collinear chart of FIG. 3 is a rectangular two-dimensional coordinate system in which the gear ratios $\rho$ of the planetary gear units 24, 26, 28 and 30 are taken along the horizontal axis, while the relative rotating speeds of the rotary elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio $\rho 1$ of the first planetary gear unit 24.

Further, five vertical lines Y4, Y5, Y6, Y7 and Y8 corresponding to the automatic transmission portion 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other. The distances between the adjacent pair of the vertical lines Y4 to Y8 are determined by the gear ratios ρ2, ρ3 and ρ4 of the second, third and fourth planetary gear units 26, 28 and 30.

In the relation between the vertical lines of the collinear chart, when distance between the sun gear and the carrier corresponds to "1", distance between the carrier and the ring gear corresponds to "ρ" of the planetary gear unit. That is, in the differential portion 11, distance between the vertical line Y1 and the vertical line Y2 is set to correspond to "1", and distance between the vertical lines Y2 and Y3 is set to correspond to "ρ1". Also, in the automatic transmission portion 20 for the second, third and fourth planetary gear unit 26, 28 and 30, the distance between the sun gear and the carrier is set to correspond to "1", and the distance between the carrier and the ring gear is set to correspond to "ρ".

Representing with the collinear chart of FIG. 3, the shifting mechanism 10 of this embodiment is, in the power distributing mechanism 16 (continuously variable shifting portion 11), arranged such that the first rotary element RE1 (the first carrier CA1), which is one of the three rotary elements of the first planetary gear unit 24, is fixed to the input shaft 14, and selectively connected to the second rotary element RE 2 (first sun gear S1) as another rotary element through the switching clutch C0. The second rotary element RE2 is fixed to the first electric motor M1 and selectively fixed to the casing 12 through the switching brake B0. The third rotary element RE3 (the first ring gear R1) as still another rotary element is fixed to the transmitting member 18 and the second electric motor M2. Thus, rotation of the input shaft 14 is transmitted (inputted) to the automatic transmission portion (step-variable transmission portion) 20 through the transmitting member 18. An inclined straight line L0 which passes an intersection point between the lines Y2 and X2 represents a relation between the rotating speeds of the first sun gear S1 and the first ring gear R1.

For example, the case where the shifting mechanism 10 is switched to the continuously variable shifting state (differential state) will be explained, where the first to third rotary elements RE1 to RE3 are mutually rotatable by release of the switching clutch C0 and the switching brake B0. For example, the shifting mechanism 10 is switched to the continuously variable shifting state (differential state) where at least the second rotary element RE2 and the third rotary element RE3 are rotated at different rotation speeds. In this case, rotation of the sun gear S1 represented by the intersection point between the straight line L0 and the vertical line Y1 increases or decreases by control of the rotation speed of the first electric motor M1. When the rotation speed of the ring gear R1 determined depending on the vehicle speed V is substantially constant, the rotation speed of the first carrier CA1 represented by the intersection point between the straight line L0 and the vertical line Y2 i.e., the engine rotation speed $N_E$ increases or decreases.

When the first sun gear S1 and the first carrier CA1 are connected by engagement of the switching clutch C0, the power transmitting mechanism 16 is brought into the non-differential state when the above three rotary elements RE1, RE2 and RE3 are integrally rotated. Thus, since the non-differential state where at least the second rotary element RE2 and the third rotary element RE3 are not rotated at different rotation speed, the straight line L0 coincides with the lateral line X2, so that the transmitting member 18 rotates in the same rotation speed as the engine rotation speed $N_E$. Alternatively, with connection of the first sun gear S1 to the casing 12 by engagement of the switching brake B0, the power distributing mechanism 16 is brought into the non-differential state where the second rotary element RE2 and the third rotary element RE3 are not rotated at different rotation speed, to function as the speed increasing mechanism with state of the straight line L0 shown in FIG. 3. Thus, the rotation speed of the first ring gear R1, i.e., the transmitting member 18 is represented by the intersection point between the straight line L0 with the state shown in FIG. 3 and the vertical line Y3, being inputted to the automatic transmission portion 20 in the increased rotation speed compared with the engine rotation speed $N_E$.

In the automatic transmission portion 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic transmission portion 20, upon engagement of the first clutch C1 and the third brake B3, the rotating speed of the output shaft 22 in the first-speed position is represented by an intersection point between the inclined linear line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

In the first-speed through fourth-speed positions, as result of engagement of the switching clutch C0, power from the differential portion 11 i.e., the power distributing mechanism 16 is inputted to the eighth rotary element RE8 with the same rotating speed as the engine speed $N_E$. However, when the switching clutch B0 engages instead of the switching clutch C0, since power from the differential portion 11 is inputted to the eighth rotary element RE8 with a speed higher than the engine speed $N_E$, the rotating speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22.

Figure 4:
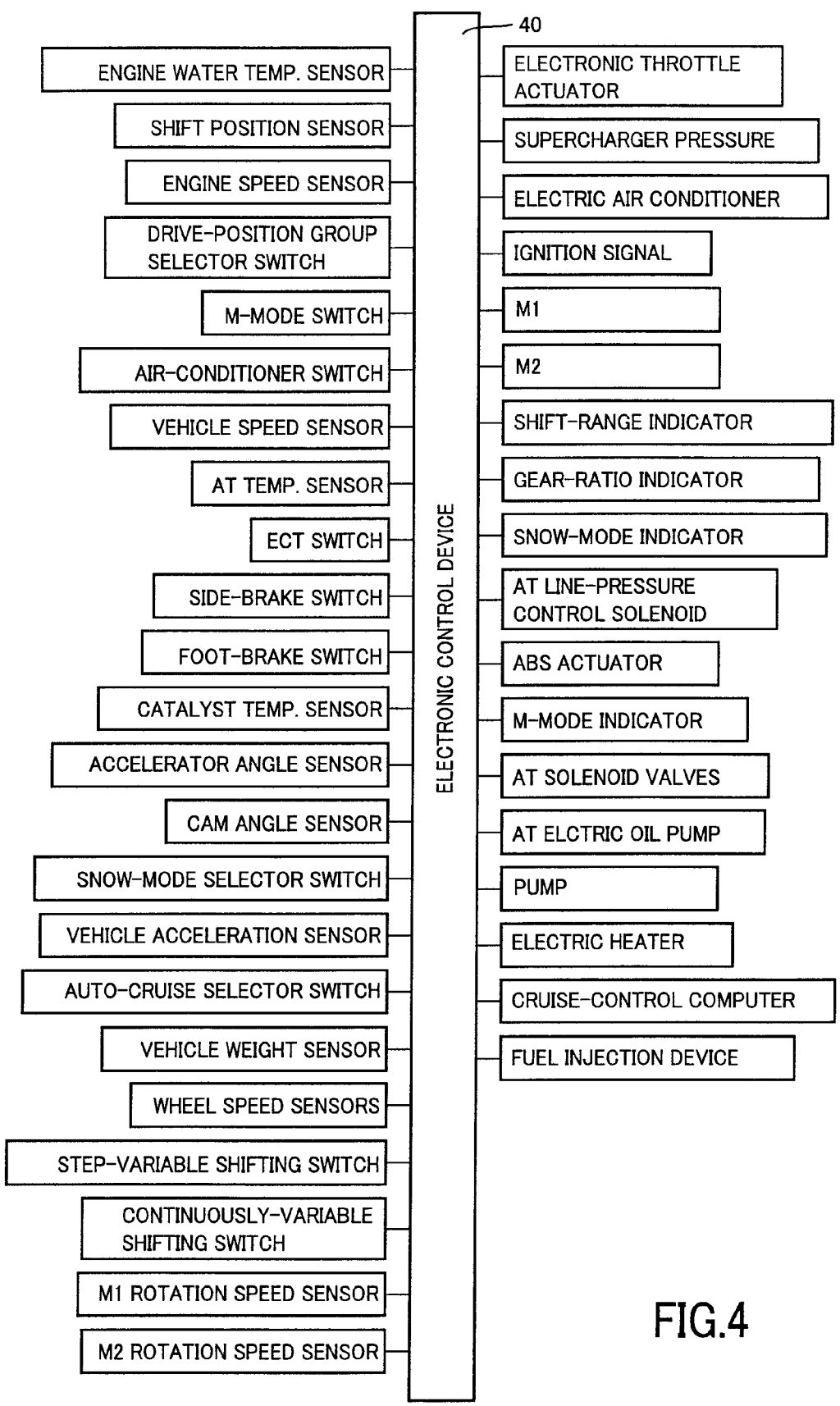
FIG. 4 is a view explaining input and output signals of an electronic control device provided in the drive apparatus of the embodiment shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, the electronic control device 40 implements hybrid drive controls of the engine 8 and electric motors M1 and M2, and drive controls such as shifting controls of the automatic transmission portion 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$ of a shift lever, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotating speed $N_{OUT}$ of the output shaft 22, a signal indicative of a working oil temperature of the automatic transmission portion 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value of the vehicle, and a signal indicative of an auto-cruising drive mode.

Also inputted are a signal indicative of a vehicle weight, a signal indicative of wheel speed of each drive wheel, a signal indicative of operation of a step-variable switch for changing the differential portion 11 (power transmitting mechanism 16) to the step-variable shifting state (locked state) so that the shifting mechanism 10 functions as the step-variable transmission, a signal indicative of operation of a continuous-variable switch for changing the differential portion 11 (power transmitting mechanism 16) to the continuously variable shifting state (differential state) so that the shifting mechanism 10 functions as the continuously variable transmission, a signal indicative of the rotating speed $N_{M1}$ of the first electric motor M1, and a signal indicative of the rotating speed $N_{M2}$ of the second electric motor M2.

From the electronic control device 40, various control signals are outputted to the engine output control device 43 (refer to FIG. 5) which controls the engine output, which includes a signal to drive a throttle actuator 97 for controlling an opening degree $\theta_{TH}$ of a throttle valve 96 disposed in a suction tube 95 of the engine 8, a signal to control fuel supply amount to each cylinder of the engine 8 by a fuel injection tube 98, a signal to command an ignition timing in the engine 8 by an ignition device 99, a signal to adjust a supercharger pressure, a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 provided to control the hydraulic actuators of the hydraulically operated frictional engaging devices of the differential portion 11 and the automatic transmission portion 20, a signal to operate an electric oil pump used as a hydraulic pressure source for the hydraulic control unit 42, a signal to drive an electric heater, and a signal to be applied to a cruise-control.

Figure 5:
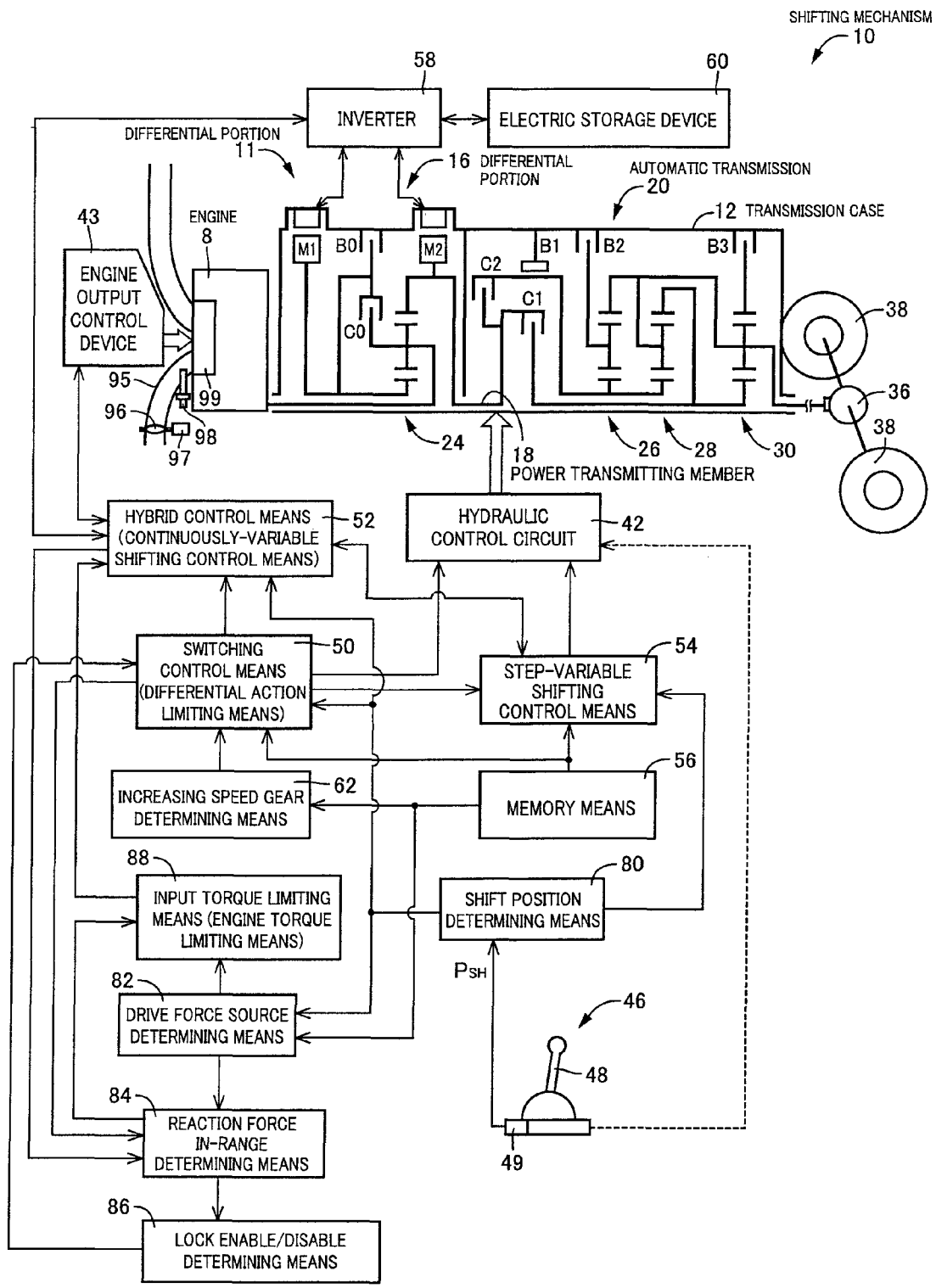
FIG. 5 is a functional block diagram explaining a main part of control operation to be executed by the electronic control device shown in FIG. 4.
Figure 6:
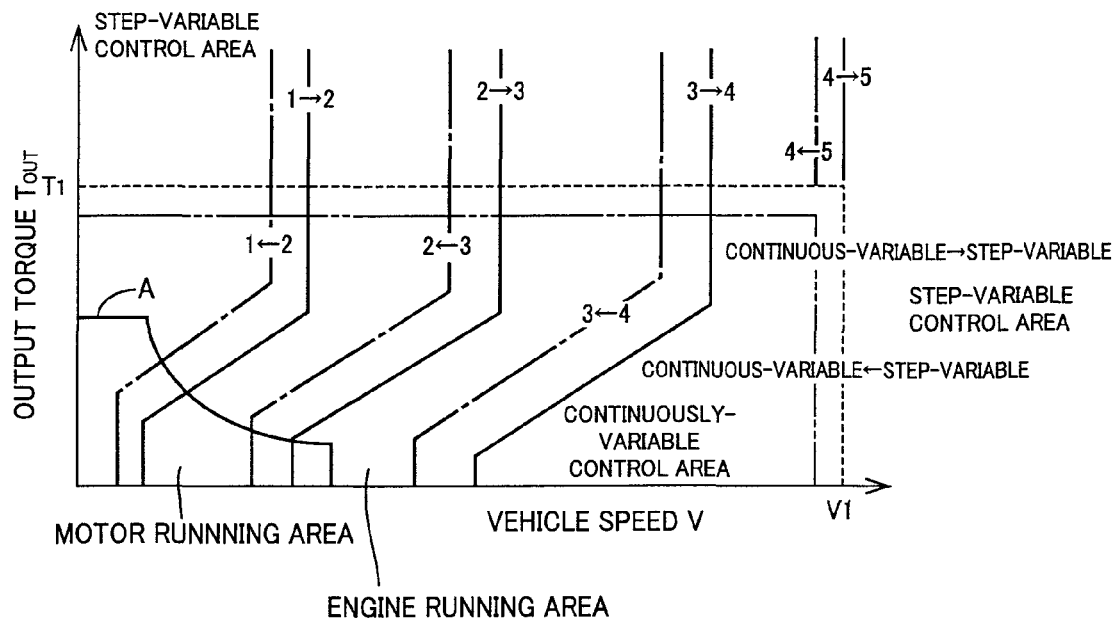
FIG. 6 is a view representing one example of a preliminarily stored shifting diagram based on which a determination on the gear shifting is executed in the automatic transmission, one example of a preliminarily stored shifting diagram based on which a determination on the switching of a shifting state is executed in a shifting mechanism, and one example of a preliminarily stored drive source switching diagram having a boundary line between an engine running area and a motor running area for an engine running mode and a motor running mode to be switched. They are plotted on a two-dimensional coordinate in terms of as the same parameters as the vehicle speed and output torque, while representing respective relations.

FIG. 5 is a functional block diagram for illustrating an essential part of a control function to be performed with the electronic control device 40. In FIG. 5, the step-variable shifting control means 54 functions as shifting control means for performing the gear shifting in the automatic transmission portion 20. For instance, the step-variable shifting control means 54 discriminates whether to perform the gear shifting in the automatic transmission portion 20 on the basis of the vehicle condition indicative of the vehicle speed V and the required output torque $T_{out}$ for the automatic transmission portion 20 by referring to a shifting diagram (relation and shifting map), preliminarily stored in the memory means 56, which are shown in FIG. 6 in solid lines and single dot lines.

That is, the step-variable shifting control means 54 discriminates a shifting position, for which the gear shifting is performed with the automatic transmission portion 20, to allow the automatic transmission portion 20 to perform the gear shifting so as to obtain the discriminated shifting position. When this takes place, the step-variable shifting control means 54 outputs a hydraulic command (shifting output command) to a hydraulic control circuit 42 for engaging and/or releasing the hydraulically operated frictional engaging device, excepting the switching clutch C0 and the switching brake B0, so as to achieve a desired shifting position in accordance with, for instance, the operation Table shown in FIG. 2.

The hydraulic control circuit 42, based on the command, actuates its solenoid operated valve to actuate the hydraulic actuator of the hydraulic friction engaging device that relates to the shifting operation. Thus, the hydraulic friction engaging device on the release side and the hydraulic friction engaging device on the engaging side both related to the shifting operation, respectively released and engaged, thereby executing the shifting operation of the automatic transmission portion 20.

Hybrid control means 52, functioning as the continuously variable control means, renders the engine 8 operative in an operating region at high efficiency under the continuously variable shifting state of the shifting mechanism 10, that is, the differential state of the differential portion 11. Meanwhile, the hybrid control means 52 allows the rates of drive force being distributed to the engine 8 and the second electric motor M2 and a reactive force of the first electric motor M1 due to the operation thereof for generating electric power to be varied to optimum values, thereby controlling a gear ratio γ0 of the differential portion 11 placed as an electrically controlled continuously variable transmission. For instance, the hybrid control means 52 calculates a target (demanded) output of the vehicle by referring to the accelerator opened magnitude $\theta_{acc}$ indicative of the amount of output required by a vehicle driver of an accelerator pedal and the vehicle speed V at the current running speed of the vehicle.

Then, the hybrid control means 52 calculates a demanded total target output based on the target output of the vehicle and a charging request value. In order to obtain the total target output, the hybrid control means 52 calculates a target engine output with taking account of the transmitting loss, loads on auxiliary units, the assisting torque of the second electric motor M2, etc. Then, the hybrid control means 52 controls the engine 8 so as to provide the engine speed $N_E$ and the engine torque $T_E$ such that the target engine output is obtained, while controlling the amount of electric power being generated by the first electric motor M1.

The hybrid control means 52 performs hybrid control with taking account of the gear position of the automatic transmission portion 20 to obtain drive power performance while improving fuel consumption. Such hybrid control allows the differential portion 11 to function as the electrically controlled continuously variable transmission so as to allow the engine speed $N_E$, determined for the engine 8 to operate at a high efficiency, to match the rotating speed of the transmitting member 18 determined based on the vehicle speed V and the selected gear position of the automatic transmission portion 20. To this end, the hybrid control means 52 preliminarily stores therein an optimum fuel economy curve (including the fuel economy map and the relations) preliminarily determined on an experimental basis. This allows a compromise to be obtained, during the vehicle running under the continuously variable shifting state, between drivability of the vehicle and fuel economy performance of the engine 8 on the two-dimensional coordinate with the parameters including, for instance, the engine speed $N_E$ and the engine torque $T_E$.

Thus, the hybrid control means 52 determines a target value of the total gear ratio γT of the shifting mechanism 10 to obtain the engine torque $T_E$, causing the engine to generate an output required for satisfying, for instance, the target output (overall target output and required drive force), and the engine speed $N_E$. This enables the engine 8 to operate on the optimum fuel economy curve. Then, the hybrid control means 52 controls the gear ratio γ0 the differential portion 11 to achieve the target value, which allows the total gear ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

The hybrid control means 52 functionally includes engine output control means. The engine output control means allows a throttle actuator 97 to perform throttle control so as to open or close an electronic throttle valve 96. In addition, the engine output control means allows a fuel injection device 98 to control a fuel injection quantity and fuel injection timing for performing fuel injection control. Further, the engine output control means outputs commands to the engine output control device 43 independently or in combination. This allows the engine 8 to perform output control so as to fundamentally provide the required engine output. For instance, the hybrid control means 52 drives the throttle actuator 60 in response to an accelerator opened magnitude $θ_{acc}$ by referring to the preliminarily stored relation, which is not shown, such that the greater the accelerator opened magnitude $θ_{acc}$, the greater will be the throttle valve opened magnitude $θ_{TH}$.

Also, this engine output control device 43, according to the command by the hybrid control means 52, controls a throttle actuator 97 to open/close an electronic throttle valve 96 for the throttle control. It further controls a fuel injection by a fuel injection device 98 for the fuel injection control, and controls an ignition timing by an ignition device 99 for the ignition timing control. All these controls are related to control of the engine torque.

The hybrid control means 52, irrespective of stopped condition or the idling condition of the engine 8, cause the vehicle to run in the motor running mode by the electric CVT function (differential function) of the differential portion 11. For example, a solid line A, shown in FIG. 6, represents a boundary line between the engine running area and the motor running area for the drive power source of the vehicle for starting up/running (hereinafter referred to as "for running") thereof to be switched to the engine 8 and the electric motor, that is, for instance, the second electric motor M2. In other words, the boundary line is used for switching the so-called engine running area, in which the engine 8 is caused to act as a running drive power source for starting up/running (hereinafter referred to as "running") the vehicle, and the so-called motor running area in which the second electric motor M2 is caused to act as a drive power source for running the vehicle.

The preliminarily stored relation, having the boundary line (in the solid line A) shown in FIG. 6 for switching the engine running area and the motor running area, represents one example of the drive source switching diagram (drive power source map), formed in a two-dimensional coordinate, which takes the vehicle speed V and the output torque $T_{OUT}$, indicative of the drive-force related value, as parameters. Memory means 56 preliminarily stores the drive source switching diagram together with, for instance, the solid line and the shifting diagram (shifting map) designated by the single dot line which are shown in FIG. 6.

The hybrid control means 52 determines based on the vehicle condition, represented by the vehicle speed V and the required torque output $T_{OUT}$ by referring to, for instance, the drive source switching diagram shown in FIG. 6 to find whether the motor running area or the engine running area is present, thereby effectuating the motor running area or the engine running area. As will be apparent from FIG. 6, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region.

Accordingly, upon the vehicle starting, the motor starting is normally executed. However, depending on the vehicle state when the accelerator pedal is so deeply depressed that, in the drive source switch diagram shown in FIG. 6, the required output torque $T_{OUT}$ exceeds the motor running area that is the required engine torque $T_E$, the engine starting is normally executed.

In order to suppress a drag of the engine 8 in a halted i.e., stopped state thereof for improving the fuel economy, the hybrid control means 52 renders the differential portion 11 operative to perform an electrical CVT function (differential function) during the motor running area. This enables the rotating speed $N_{M1}$ of the first electric motor M1 to be controlled in a negative rotating speed, for instance, an idling state. This causes the engine speed $N_E$ to be maintained at a zeroed or nearly zeroed value.

Further, even under the engine running area, the hybrid control means 52 may allow the electric path to be established. In this moment, the electric energies resulting from the first electric motor M1 and/or the electric-storage device 60 are supplied to the second electric motor M2. Thus, the second electric motor M2 is driven to make it possible to perform torque-assisting for the drive force of the engine 8. Thus, in the illustrated embodiment, the engine running area may cover a phase including the engine running area and the motor running area in combination.

Further, the hybrid control means 52 may cause the differential portion 11 to have the electrical CVT function through which the engine 8 can be maintained under the operating state regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotating speed of the first electric motor M1 increases. Thus, even if the rotating speed $N_{M2}$ of the second electric motor M2, uniquely determined with the vehicle speed V, becomes zero (nearly zero) due to the halted condition of the vehicle, the power distributing mechanism 16 performs the differential action. This causes the engine speed $N_E$ to be maintained at a level beyond a rotating speed for autonomous rotation.

Furthermore, the hybrid control means 52 allows the differential portion 11 to perform the electrical CVT function to control the rotating speed $N_{M1}$ of the first electric motor M1 and/or the rotating speed $N_{M2}$ of the second electric motor M2. This causes the engine speed $N_E$ to be maintained at an arbitrary level of the rotating speeds, regardless of the vehicle remained under the halted or in running state. In other words, the hybrid control means 52, while controlling the engine rotation speed $N_E$ in a substantially constant level or an arbitrary level, controls the rotating speed $N_{M1}$ of first electric motor M1 and/or the rotating speed $N_{M2}$ of the second electric motor M2 in the arbitrary rotation speed. For instance, as will be understood from the collinear diagram shown in FIG. 3, when increasing the engine speed $N_E$, the hybrid control means 52 raises the rotating speed $N_{M1}$ of the first electric motor M1 while maintaining the rotating speed $N_{M2}$ of the second electric motor M2, restricted with the vehicle speed V, at a substantially fixed level.

The hybrid controlling means 52 cuts off the drive current supplied from the electrical-energy storage device 60 to the first electric motor M1 via the inverter 58 to bring the first electric motor M1 into an unloaded state. When brought into the unloaded state, the first electric motor M1 is allowed to freely rotate, that is, idly rotated. Therefore, the differential portion 11 is brought into the state that cannot transmit torque, that is, in a state similar to the state that disconnects the power transmitting path in the differential portion 11, and is thus brought into the state not to generate the output therefrom. In other words, the hybrid controlling means 52 brings the first electric motor M1 into the unloaded state to bring the differential portion 11 into a disengagement state (neutral state) where the power transmitting path is electrically disconnected.

Increasing-speed gear judge means 62 makes a determination on which one of the switching clutch C0 and the switching brake B0 is to be coupled for placing the shifting mechanism 10 in the step-variable shifting state. That is, the determination is made based on the vehicle condition according to, for instance, the shifting diagram, shown in FIG. 6, which is preliminarily stored in the memory means 56, to find whether or not the gear position to be shifted in the shifting mechanism 10 lies in an increasing-speed gear position, for instance, a 5th-speed gear position.

Switching control means 50 switches the engaging state and/or releasing state of the engaging device (switching clutch C0 and switching brake B0) depending on the vehicle condition. This allows the continuously variable shifting state and the step-variable shifting state, that is, the differential state and the locked state to be selectively switched. For instance, the switching control means 50 determines whether to switch the shifting state of the shifting mechanism 10 (differential portion 11) based on the vehicle condition represented with the vehicle speed V and the required output torque $T_{OUT}$. This determination is made by referring to the switching diagram (switching map and relation), preliminarily stored in the memory means 56, which are shown in the dotted line and the double dot line in FIG. 6.

That is, the switching control means 50 determines whether the shifting mechanism 10 lies in the continuously variable shifting control region for the continuously variable shifting state, or the step-variable shifting control region for the step-variable shifting state. Thus, the determination is made on the shifting state to be switched by the shifting mechanism 10. Then, the switching control means 50 effectuates the switching of the shifting state for selectively placing the shifting mechanism 10 in any one of the continuously variable shifting state and the step-variable shifting state.

More particularly, if the determination is made that the shifting mechanism 10 lies in the step-variable shifting control region, then, the switching control means 50 outputs a command to the hybrid control means 52 disenabling or interrupting the hybrid control or continuously variable shifting control, while permitting the step-variable shifting control means 54 to perform the shifting for the predetermined step-variable shifting operation. When this takes place, the step-variable shifting control means 54 allows the automatic transmission portion 20 to perform the automatic shifting in accordance with, for instance, the shifting diagram, shown in FIG. 6, which is preliminarily stored in the memory means 56. For instance, FIG. 2 shows the operation Table, preliminarily stored in the memory means 56, which represents combinations in operation of the hydraulically operated frictional engaging devices, that is, the clutches C0, C1 and C2, and the brakes B0, B1, B2 and B3 to be selected in the shifting control. That is, the shifting mechanism 10, that is, the differential portion 11 and the automatic transmission portion 20, functions as a whole to be the so-called step-variable automatic transmission, thereby establishing the gear positions according to the operation Table shown in FIG. 2.

If the increasing-speed gear judge means 62 determines the 5th-gear position, the switching control means 50 outputs a command to the hydraulic control circuit 42 for releasing the switching clutch C0 and engaging the switching brake B0. This places the differential portion 11 in a second locked position to function as an auxiliary power transmission with a fixed gear ratio γ0, for instance, the gear ratio γ0 equal to "0.7". Thus, the shifting mechanism 10 can act as a whole to obtain an increasing-speed gear position, that is, a so-called overdrive-gear position with a gear ratio less than 1.0. In contrast, if no 5th-gear position is determined by the increasing-speed gear judge means 62, the switching control means 50 outputs a command to the hydraulic control circuit 42 for engaging the switching clutch C0 and releasing the switching brake B0. This places the differential portion 11 in a first locked position to function as the auxiliary power transmission with the fixed gear ratio γ0, for instance, the gear ratio γ0 equal to 1. Thus, the shifting mechanism 10 can act as a whole to obtain a decreasing-speed gear position with a gear ratio greater than 1.0.

Thus, the switching control means 50 switches the shifting mechanism 10 in the step-variable shifting state and selectively switches for the gear positions of two kinds in either one gear position under the step-variable shifting state. This causes the differential portion 11 to function as the auxiliary power transmission and the automatic transmission portion 20, connected to the differential portion 11 in series, is caused to function as the step-variable transmission. Thus, the shifting mechanism 10 is caused to function as the so-called step-variable automatic transmission as a whole.

On the contrary, if the determination is made that the shifting mechanism 10 lies in the step-variable shifting control region, the switching control means 50 outputs a command to the hydraulic control circuit 42 for releasing both the switching clutch C0 and the switching brake B0. Concurrently, the switching control means 50 outputs a command to the hybrid control means 52 for permitting the hybrid control. In addition, the switching control means 50 outputs a predetermined signal to the step-variable shifting control means 54. The predetermined signal is for fixing the shifting mechanism 10 in the gear position upon the predetermined continuously variable shifting state, or for permitting the automatic transmission portion 20 to perform automatic shifting according to, for instance, the shifting diagram, shown in FIG. 6, which are preliminarily stored in the memory means 56.

In such a case, the step-variable shifting control means 54 executes the operations as shown in the operation Table of FIG. 2 excepting the engaging operations of the switching clutch C0 and brake B0, thereby performing the automatic shifting. Thus, the switching control means 50 switches the differential portion 11 to be placed in the continuously variable shifting state to function as the continuously variable transmission. In addition, the automatic transmission portion 20, connected to the differential portion 11 in series, is caused to function as the step-variable transmission. This results in the occurrence of a drive force with a suitable magnitude.

Simultaneously, a continuously variable or stepless change occurs in the rotating speed inputted to the automatic transmission portion 20, that is, the rotating speed of the transmitting member 18 applied to the automatic transmission portion 20 for each gear position of the 1st-gear, 2nd-gear, 3rd-gear and 4th-gear positions. Thus, the respective gear positions are established in gear ratios over a continuously variable shifting range. Accordingly, since the gear ratio is continuously variable across the adjacent gear positions, the shifting mechanism 10 can achieve the overall gear ratio γT in the continuously variable shifting state.

To explain about FIG. 6 in detail, FIG. 6 represents the shifting diagram (relation and shifting map) preliminarily stored in the memory means 56 for a determination to be made to perform the gear shifting in the automatic transmission portion 20. FIG. 6 shows one example of the shifting diagram plotted in a two-dimensional coordinate with parameters in terms of the vehicle speed V and the required output torque $T_{OUT}$ indicative of a drive-force related value. In FIG. 6, a solid line represents an up-shift line and a single dot line represents a downshift line.

Further, in FIG. 6, a broken line represents a determination vehicle speed V1 and a determination output torque T1 for the switching control means 50 to make a determination on the continuously variable control area and the step-variable control area. That is, the broken line in FIG. 6 represents two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line which forms a series of the determination output torque T1 representing a predetermined high-output running determination line for determining the drive-force related value relevant to the hybrid vehicle, that is, for instance, the high output running region for the output torque $T_{OUT}$ of the automatic transmission portion 20 to mark the high output.

Further, as sown in a double dot line in FIG. 6 in contrast to the broken line indicated therein, a hysteresis is provided for making a determination on the step-variable shifting control region and the continuously variable shifting control region. That is, FIG. 6 represents a preliminarily stored switching diagram (switching map and relation) for the switching control means 50 to make a regional determination on either the continuously variable control area or the step-variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1, and it may include a preliminarily stored shifting diagram with a parameter taking any of the vehicle speed V and the output torque $T_{OUT}$.

The above shifting diagram, the switching diagram or the drive source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the shifting mechanism 10 in the step-variable shifting state when the vehicle condition such as, for instance, the current vehicle speed exceeds the determination vehicle speed V1. In addition, the switching control means 50 places the shifting mechanism 10 in the step-variable shifting state when the vehicle condition such as, for instance, the output torque $T_{OUT}$ of the automatic transmission portion 20 exceeds the determination output torque T1.

There occurs failure or functionality degradation of control equipment for an electrical system such as an electric motor that allows the differential portion 11 to operate as an electrically operated continuously variable transmission. Even in the continuously variable control range, in order to maintain vehicle running, the switching controlling means 50 can preferentially bring the shifting mechanism 10 into the step variable shifting state. Such failure or functionality degradation can be caused by failure or functionality degradation of equipment that relates to the electric path from the electrical energy generation in the first electric motor M1 to conversion from the electrical energy into mechanical energy, for example. In this case, failure (fail) of the first electric motor M1, the second electric motor M2, the inverter 58, the electric-energy storage device 60, a transmitting path that connects them or the like, or functionality degradation caused by failure or low temperature occurs in the vehicle.

Accordingly, the switching controlling means 50 determines whether failure or functionality degradation occurs in the control equipment for an electrical system that allows the differential portion 11 to operate as the electrically operated continuously variable transmission, and brings the shifting mechanism 10 into the step variable shifting state if occurrence of failure or functionality degradation is determined.

The above drive-force related value is a parameter corresponding to the drive force of the vehicle in one-to-one relation, which may be the drive torque or the drive force at the drive wheel 38. In addition, it may be an output torque $T_{OUT}$, an engine output torque $T_E$, a vehicle acceleration value G of the automatic transmission portion 20; an actual value such as the engine output torque $T_E$ calculated based on the accelerator opened magnitude $\theta_{acc}$ or the throttle valve opened magnitude $\theta_{TH}$ (or intake air quantity, air/fuel ratio or fuel injection amount) and the engine speed $N_E$; or an estimated value such as the required (target) engine torque $T_E$ calculated based on the accelerator opened magnitude $\theta_{acc}$ or the throttle valve opened magnitude $\theta_{TH}$, the required (target) output torque or the required drive torque. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

The above determination vehicle speed V1 is so set that the shifting mechanism 10 is placed in the step variable shifting state at the high speed running, to suppress deterioration of the mileage occurred if the shifting mechanism 10 is placed in the continuously variable shifting state at this high speed running. Also, the determination vehicle speed V1 is set corresponding to the characteristic of the first electric motor M1 in which the maximum output of the electric energy therefrom is made small. This is because for example in the high speed running of the vehicle, the first electric motor M1 is made small by not corresponding the reaction force thereof to the high output area of the engine 8.

Figure 7:
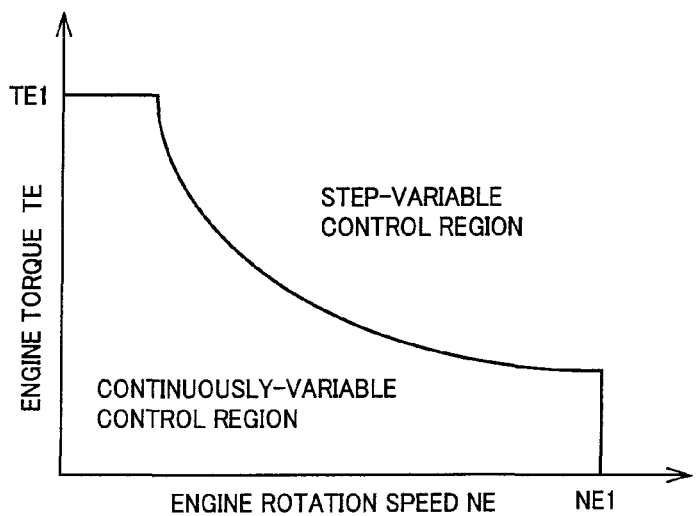
FIG. 7 is a conceptual view showing a preliminarily stored relation having a boundary line between a continuously variable control area and a step variable control area for mapping the boundary line between the continuously variable control area and the step-variable control area shown in broken lines in FIG. 6.

FIG. 7 represents a switching diagram (switching map and relation), preliminarily stored in the memory means 56. It has an engine output line in the form of a boundary line to allow the switching control means 50 to execute the regional determination on which of the step-variable control area and the continuously variable control area is to be selected in terms of the parameters including the engine speed $N_E$ and the engine torque $T_E$. The switching control means 50 may execute the operation based on the engine rotation speed $N_E$ and the engine torque $T_E$ by referring to the switching diagram shown in FIG. 7 in place of referring to the switching diagram shown in FIG. 6. That is, the switching control means 50 may determine whether the vehicle condition, represented with the engine speed $N_E$ and the engine torque $T_E$, is placed in the step-variable control area or the continuously variable control area. Here, FIG. 7 is a conceptual view for the broken line to be plotted as shown in FIG. 6. In other words, the broken line in FIG. 6 also represents switching lines rewritten on the two-dimensional coordinate in terms of the parameters including the vehicle speed V and the output torque $T_{OUT}$ based on the relational diagram (map) shown in FIG. 7.

As indicated on the relation shown in FIG. 6, the step-variable control area is set to lie in the high torque region where the output torque $T_{OUT}$ is greater than the predetermined determination output torque T1, or the high vehicle speed region where the vehicle speed V is greater than the predetermined determination vehicle speed V1. Therefore, a step-variable shift running is effectuated in a high drive torque region, where the engine 8 operates at a relatively high torque, or a relatively high vehicle speed region of the vehicle speed. Further, a continuously variable shift running is effectuated in a low drive torque region where the engine 8 operates at a relatively low torque, or a relatively low vehicle speed region of the vehicle speed, that is, during a normal output region of the engine 8.

In the relation shown in FIG. 7, similarly, the step-variable shifting control region is set to lie in a high-torque region where the engine torque $T_E$ is greater than a predetermined given value TE1, a high-speed rotating region where the engine speed $N_E$ is greater than a predetermined given value NE1, or a high-output region where the engine output, calculated based on the engine torque $T_E$ and the engine speed $N_E$, is greater than a given value. Therefore, the step-variable shift running area is effectuated at a relatively high torque, a relatively high rotating-speed or a relatively high-output of the engine 8.

The continuously variable shift running area is effectuated at a relatively low torque, a relatively low rotating-speed or a relatively low-output of the engine 8, that is, in the normal output region of the engine 8. The boundary line in FIG. 7 between the step-variable control area and the continuously variable control area corresponds to a high vehicle-speed determination line which forms a series of high vehicle-speed determination values and a high-output running determination line which forms a series of high-output running determination values.

With such a boundary line, the shifting mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the shifting mechanism 10 is placed in the step-variable shifting state operative to act as a step-variable transmission. Here, the output of the engine 8 is transferred to the drive wheels 38 mainly through a mechanical power transmitting path. This suppresses a loss in conversion between drive power and electric energy, generated when the shifting mechanism 10 is caused to act as an electrically controlled continuously variable transmission, providing improved fuel consumption.

Further, during the running of the vehicle at the high output of the engine where the drive-force related value such as the output torque $T_{OUT}$ or the like exceeds the determination torque T1, the shifting mechanism 10 is placed in the step-variable shifting state acting as the step-variable transmission. Here, the output of the engine 8 is transferred to the drive wheels 38 mainly through the mechanical power transmitting path. Therefore, the electrically controlled continuously variable transmission is caused to operate in the low/medium speed running region and the low/medium output running region of the vehicle. This results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component.

In short, when the predetermined value TE1 is preset as the switching determination value for the engine torque $T_E$ where the first electric motor M1 can bear the reaction force, in the high output running where the engine torque TE exceeds the predetermined value TE1, the differential portion 11 is placed in the step-variable shifting state. The first electric motor M1 is not required to bear the reaction force against the engine torque $T_E$, unlike the case the differential portion 11 being placed in the continuously variable shifting state. Thus, the first electric motor M1 is suppressed in deterioration of durability thereof, while being prevented from large-sized.

In other words, in the first electric motor M1 of the first embodiment, the maximum output thereof is selected smaller than the reaction force capacity required for the maximum value of the engine torque $T_E$, that is the maximum output does not correspond to the reaction force capacity against the engine torque $T_E$ exceeding the predetermined value TE1. Thus, miniaturization of the first electric motor M1 is realized.

The maximum output of the first electric motor M1 is a rated value thereof which is experimentally calculated in advance to be permitted as the using environment thereof and is set. The switching determination value of the engine torque $T_E$ corresponds to the maximum value of the engine torque which can be born by the first electric motor M1 or than value smaller than it by the predetermined amount. It is experimentally calculated in advance so that deterioration of durability of the first electric motor M1 is suppressed.

Figure 8:
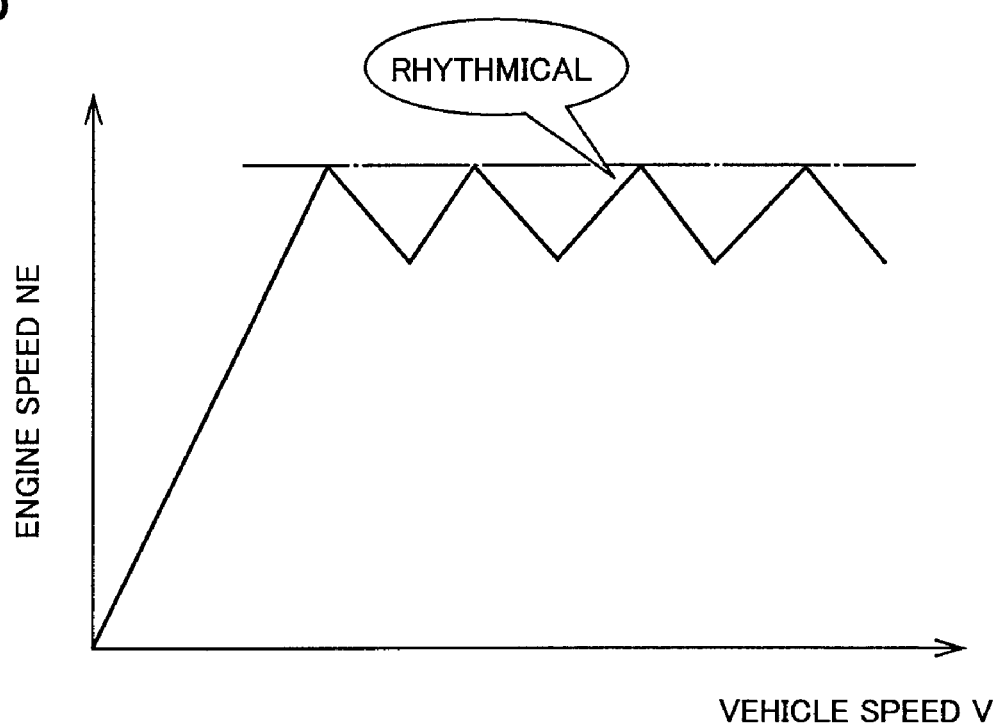
FIG. 8 shows fluctuation in an engine speed caused in up-shift in a step-variable transmission.

There may be another viewpoint to take account of the requirement of the driving force by the driver than the requirement about the mileage. From such viewpoint, the shifting mechanism 10 is switched to the step-variable shifting state (fixed shifting state) rather than the continuously variable shifting state. This allows a driver to enjoy a change in the engine speed $N_E$ resulting from the up-shifting in the step-variable automatic shift running region as shown in, for instance FIG. 8, that is, a rhythmical change in the rotating speed $N_E$ of the engine.

Figure 9:
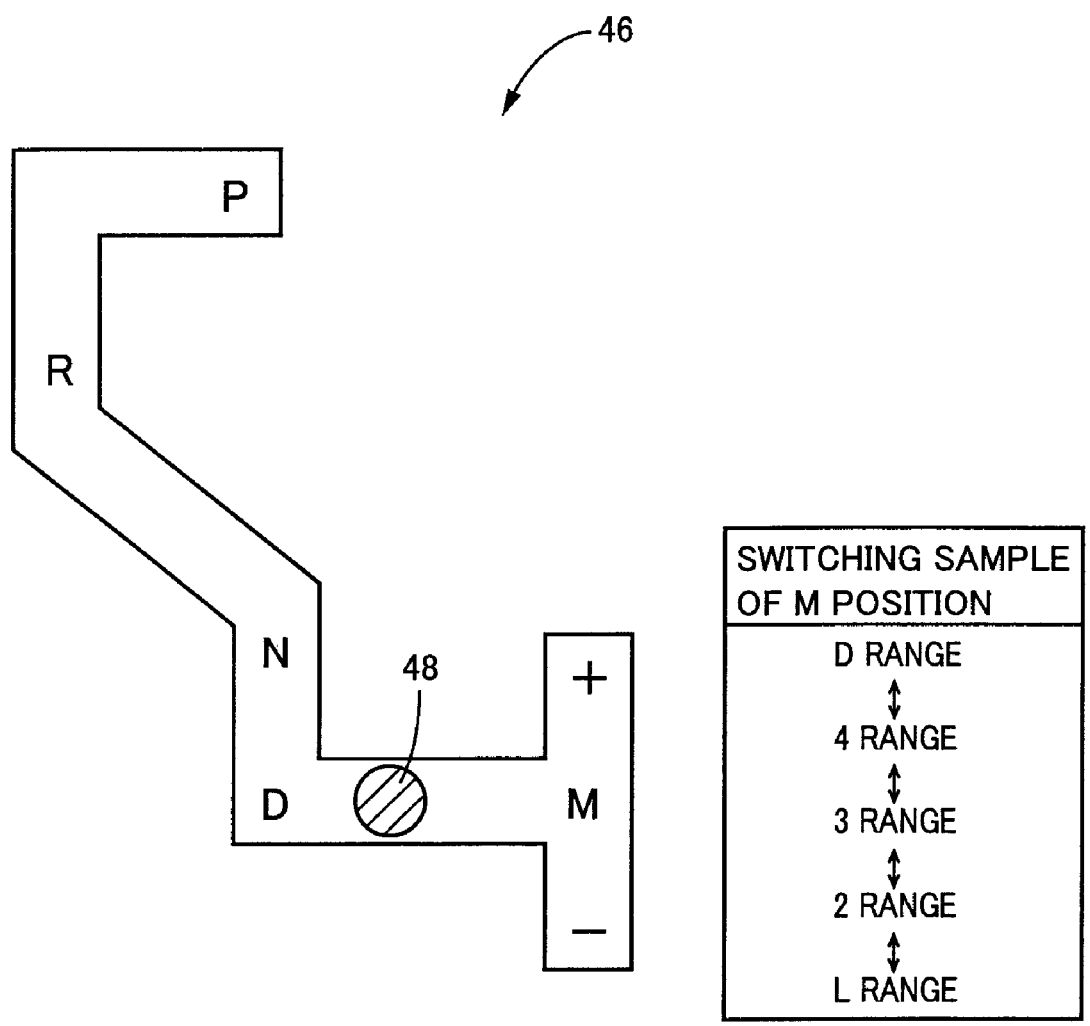
FIG. 9 shows one example of a shift operation device having a shift lever and being operated for selecting plural kinds of shift positions.

FIG. 9 shows on example of a switch device 46 to be switched by manual operation to one of plural kinds of shift positions. This switch device 46 includes a shift lever 48 disposed for example at lateral side of the driver's seat and manually operated to select one of plural kinds of shifting positions. This switch device 46 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)". In the "P (parking)", none of the engaging device such as the first clutch C1 and the second clutch C2 are not engaged to set the interrupt state of the power transmitting path in the shifting mechanism 10 i.e., the automatic transmission portion 20, and to lock rotation of the output shaft 22. In the "N (neutral)", the power transmitting path in the shifting mechanism 10 is interrupted.

For example, in conjunction with manual operations of the shift lever 48 to the respective shift positions, manual valves in the hydraulically operated control circuit 42 mechanically connected thereto are switched. The hydraulically operated control circuit 42 is thereby mechanically switched so that the reverse-gear position "R," the neutral position "N," or the forward-gear position "D," etc., shown in the engagement operation Table of FIG. 2, is established. The respective gear positions from the first to fifth gear positions in the "D" or "M" position, shown in the engagement operation table of FIG. 2, are established by electrical switching of the solenoid-operated valves in the hydraulically operated control circuit 42.

Among the respective shifting positions "P" to "M," at each of the non-running positions such as "P" and "N," for example, both the first clutch C1 and the second clutch C2 are released as shown in the engagement operation Table of FIG. 2. These are non-drive positions for selecting a state in which the power transmitting path in the automatic transmission portion 20 is cut off to disable the vehicle drive. That is, this is a non-drive state in which the path of power transmission is cut off or interrupted by the first clutch C1 and the second clutch C2.

Also, at each of the running positions "R", "D" and "M" for example, at least one of the first clutch C1 and the second clutch C2 is engaged as shown in the engagement operation table of FIG. 2. These are drive positions for selecting a state in which the power transmitting path in the automatic transmission portion 20 is connected to enable the vehicle drive. That is, these are the drive position for selecting a transmitting state of the power transmitting path by both or one of the first clutch C1 and the second clutch C2.

Specifically, the second clutch C2 is engaged by manual operation of the shift lever 48 from the "P" position or the "N" position to the "R" position, so that the power transmitting path in the automatic transmission portion 20 is switched from a power transmission cutoff state to a power transmissible state. At least the first clutch C1 is engaged by manual operation of the switch lever 48 from the "N" position to the "D" position, so that the power transmitting path in the automatic transmission portion 20 is switched from a power transmission cutoff state to a power transmissible state. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The shift lever 48 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the shift lever 48 to the shift-up position "+" or the shift-down position "−", any one of "D" to "L" positions is selected.

For example, the five shifting ranges including the "D" range to the "L" range to be selected in the "M" position are plural kinds of shifting ranges of which total gear ratio at the high speed side are different from each other, in the changeable range of the total gear ratio γT enabling the automatic shifting control of the shifting mechanism 10. Also, they limit the changeable range of the shifting positions (gear positions) so that the maximum shifting positions where the automatic shifting portion 20 is shifted are different.

The shift lever 48 is urged by urging means such as a spring and the like to be automatically returned from its up-shift position "+" and the down-shift position "−" to its "M" position. Also, the switch device 46 is provided with a shift position sensor 49 for detecting each of the shift positions of the shift lever 48, to output a signal representing a shift position $P_{SH}$ and the number of operations at the "M" position to the electronic control device 40.

For example, in the case where the "D" position is selected by operation of the shift lever 48, the switching controlling means 50 executes an automatic switching control for the shift state of the shifting mechanism 10 based on the shifting map or the switching map, as shown in FIG. 6, that is previously stored. In addition to this, the hybrid controlling means 52 executes the continuously variable shifting control of the power distributing mechanism 16, and the step variable shifting controlling means 54 executes the automatic shifting control of the automatic transmission portion 20. For example, in the step variable shifting running in which the shifting mechanism 10 is switched into the step variable shifting state, the shifting mechanism 10 is subjected to the automatic shifting control in the range from the first to fifth speed gear stages, as shown in FIG. 2.

Alternatively, in the continuously variable shifting operation in which the shifting mechanism 10 is switched into the continuously variable shifting state, the shifting mechanism 10 is subjected to the automatic shifting control in the changeable range of the total shifting ratio γT. The total shifting ratio γT can be changed and obtained by the continuously variable gear ratio width of the power distributing mechanism 16, and the gear positions under the automatic shifting control in the ranges of the first to fourth speed gear positions of the automatic transmission portion 20. This "D" position also corresponds to a shift position that selects an automatic shifting running mode (automatic mode) that is a control mode to execute the automatic shifting control of the shifting mechanism 10.

When the "M" position is selected by operation of the shift lever 48, the automatic shifting control is executed in the range of the total shifting ratio γT that can be varied by the shifting ranges of the shifting mechanism 10 so as not to exceed the maximum high speed gear ratio or gear ratio of the shifting range, by the switching controlling means 50, the hybrid controlling means 52, and the step variable shifting controlling means 54. For example, in the step variable shifting operation in which the shifting mechanism 10 is switched into the step variable shifting state, the automatic shifting control of the shifting mechanism 10 is executed in the range of the total shifting ratio γT that can be varied by the shifting ranges.

In the continuously variable shifting running in which the shifting mechanism 10 is switched into the continuously variable shifting state, the shifting mechanism 10 is subjected to the automatic shifting control in the variation range of the total shifting ratio γT that can be varied in the shifting ranges and obtained by the continuously variable gear ratio width of the power distributing mechanism 16, and the gear stages under automatic shifting control in the ranges of the automatic transmission 20 that can be varied depending on the shifting ranges. This "M" position also corresponds to a shift position that selects a manual shifting running mode (manual mode) that is a control mode in which the shifting mechanism 10 is subjected to the manual shifting control.

As stated above, the shifting mechanism 10 (the differential portion 11, the power distributing mechanism 16) according to this embodiment can be selectively switched between the continuously variable shifting state (differential action state) and the non-continuously variable shifting state, e.g., the step variable shifting state (locked state). The switching controlling means 50 determines a shifting state of the differential portion 11 to be switched based on a vehicle state. The differential portion 11 is selectively switched into either the continuously variable shifting state or the step variable shifting state. When the differential portion 11 is switched into the locked state, the first electric motor M1 does not necessarily bear the reaction force against the engine torque $T_E$ that exceeds the predetermined value TE1, for example. Thus, the size of the first electric motor M1 can be reduced.

However, if the differential portion 11 cannot be switched into the non-continuously variable shifting state, the reduced-size first electric motor M1 may not bear the reaction force against the large engine torque $T_E$ that exceeds the predetermined value TE1. In this instance, the first electric motor M1, used to bear a reaction force that exceeds its rated capacity, may generate large heat, and therefore the durability of the first electric motor M1 may decrease. In this regard, in preparation for the case where the differential portion 11 cannot be switched into the non-continuously variable shifting state, if the rated capacity of the first electric motor M1 is increased to support the reaction force against the engine torque $T_E$ that exceeds the predetermined value $T_{E1}$, the entire driving apparatus increases in size.

That is, the increased-size of the first electric motor to support the engine torque $T_E$ that exceeds the predetermined value TE1 in preparation for the aforementioned case, is contradictory to the object (gist) of the present invention that intends to reduce the size of the first electric motor. Alternatively, the first electric motor M1 would have to operate beyond its rating to bear the reaction force, resulting in the decreased durability of the first electric motor M1.

The following cases provide examples of the instances where the differential portion 11 cannot be switched into the non-continuously variable shifting state. The examples includes failure (fail) of the friction material of the switching clutch C0 or the switching brake B0 that is brought into engagement to switch the differential portion 11 into the non-continuously variable shifting state, a failure of the solenoid operated valve in the hydraulic control circuit 42, an operation response delay caused by functionality degradation of such, and the like. In addition to this, despite the switching clutch C0 or the switching brake B0 is normal and can be brought into engagement, other factors such as the engine stalling or possibly knocking may cause the differential portion 11 to not be able to be switched into the non-continuously variable shifting state.

In the continuously variable shifting state of the differential portion 11, the engine rotation speed $N_E$ can be controlled based on the electric continuously variable shifting operating without being restricted with the vehicle speed V. For example, even in a vehicle stop state or a low vehicle speed state, the hybrid controlling means 52 maintains the engine 8 in the operating state by means of the electrical CVT function of the differential portion 11. Accordingly, for example, even when a mechanism (device) with input side and output side are rotatable relative to each other is not arranged on the power transmitting path, in the continuously variable shifting state of the differential portion 11, the hybrid controlling means 52 can maintain the engine operating state and provide excellent vehicle engine startup. Examples of the aforementioned mechanism with input and output sides that are relatively rotatable are provided by hydraulic power transmitting devices such as a clutch and a torque converter.

Conversely, in the non-continuously variable shifting state of the differential portion 11, the power transmitting path is mechanically connected between the engine 8 and the drive wheels 38, so that the engine rotation speed $N_E$ is restrained by the vehicle speed V. Accordingly, in the vehicle stop state or a very low vehicle speed state, the hybrid controlling means 52 cannot maintain the engine operating state, and may not provide vehicle engine startup. For example, during vehicle engine startup, if the vehicle is brought into the state where a required power torque $T_{OUT}$ falls within a high torque range that is not less than a determination output torque T1, in other words, if the accelerator pedal is depressed to a large enough extent that the required engine torque $T_E$ falls within a high torque range that is not less than the predetermined value TE1, the switching controlling means 50 switches the differential portion 11 into the step variable shifting state. Accordingly, during that vehicle startup corresponding to the vehicle stop state or the very low vehicle speed state, the hybrid controlling means 52 cannot maintain the engine operating state, and may not provide vehicle engine startup.

From another point of view, in the case of vehicle engine startup where the accelerator pedal is depressed to a large extent, necessary is maintaining the differential portion 11 in the continuously variable shifting state without consideration of the reduction in durability of the first electric motor M1, or increasing the size of the first electric motor M1 only for vehicle startup in order to generate the reaction torque against the engine torque $T_E$ that is not less than the predetermined value TE1.

In view of the above situation, in this embodiment, during vehicle engine startup/engine running, if the differential portion 11 cannot be switched into the non-continuously variable shifting state, the switching clutch C0 or the switching brake B0 is brought into the half-transmitting capacity state, i.e., the half-engaged (slip) state. This is to prevent an increase in the size of the first electric motor M1, and to suppress any reduction in the durability of the first electric motor M1. The reason for this is that the operation of the differential portion 11 as the electrically operated continuously variable transmission is maintained (allowed) so that the first electric motor M1 bears a part of the reaction torque against the engine torque $T_E$, and additionally, the switching clutch C0 or the switching brake B0 bears the rest of the reaction torque. That is, during vehicle engine startup/engine running, if the differential portion 11 cannot be switched into the non-continuously variable shifting state, for causing the differential portion 11 to operate as the electrically operated continuously variable transmission, the switching clutch C0 or the switching brake B0 is brought into the half-engaged state. Thus, the reaction torque against the engine torque $T_E$ can be borne by the first electric motor M1 and switching clutch C0 or the switching brake B0.

As a result, the first electric motor M1, not necessarily bearing the reaction force against the engine torque $T_E$ that exceeds the predetermined value TE1, is prevented from increase in the size, and is suppressed any reduction in the durability. In addition to this effect, for example, the engine torque $T_E$ that is not less than the engine torque $T_E$ that can be borne by the torque capacity of the first electric motor M1 can be inputted into the differential portion 11. Consequently, an effect increasing the output from the differential portion 11 can be rendered without increasing the torque capacity of the first electric motor M1, in other words, without increasing the size of the first electric motor M1. In the following, a control operation when the differential portion 11 cannot be switched into the non-continuously variable shifting state during vehicle engine startup/engine running will be described.

Again, with reference to FIG. 5, the shift position determining means 80 determines which position the shift lever 48 is presently placed in or to which position the shift lever 48 is moved to, based on the signal from the shift position sensor 49 representing the shift position $P_{SH}$ of the shift lever 48. For example, the shift position determining means 80 determines whether the shift position $P_{SH}$ of the shift lever 48 is the "D" or "R" driving position, or is not, based on the signal that represents the shift position $P_{SH}$.

When the shift position $P_{SH}$ of the shift lever 48 is the "P" or "N" position being the non-driving positions, the power transmitting path between the differential portion 11 and the automatic transmission portion 20 is disconnected or the interrupted state. In other words, both the first and second clutches C1 and C2 are disengaged. In this case, since the first electric motor M1 does not necessarily generate the reaction torque against the engine torque $T_E$, there is no necessity of bringing the switching clutch C0 or the switching brake B0 into the half-engaged (slip) state, so-called a slip control operation.

In addition to this, in the case where the shift position $P_{SH}$ of the shift lever 48 is the "N" position, by bringing the differential portion 11 into the neutral state by the hybrid controlling means 52, the first electric motor M1 is brought into the unloaded state. That is, since the first electric motor M1 does not generate the reaction torque against the engine torque $T_E$, there is no necessity of control to bring the switching clutch C0 or the switching brake B0 into the half-engaged (slip) state. For this reason, it is determined whether the shift position $P_{SH}$ of the shift lever 48 is the "D" or "R" driving position, or not.

If the shift position determining means 80 determines that the shift position $P_{SH}$ is the "D" or "R" position, the driving force source determining means 82 determines which of the engine 8 and the second electric motor M2 is mainly used by the hybrid controlling means 52 as the driving force source i.e., drive source for vehicle operation. For example, the driving force source determining means 82 determines whether the engine 8 is mainly used by the hybrid controlling means 52 as the driving force source for operation. For example, as shown by the driving force source switching diagram shown in FIG. 6, this determination is made by ascertaining whether the actual vehicle state is in the vehicle engine running range or not, based on the actual vehicle state represented by the vehicle speed V and the output torque $T_{OUT}$.

The reaction force in-range determining means 84 determines whether the actual torque inputted into the differential portion 11 falls within the range of the reaction torque against the engine torque $T_E$ that can be borne by the first electric motor M1. That is, when the driving force source determining means 82 determines that the engine 8 is used as the driving force source for vehicle operation, for example, whether the actual engine torque $T_E$ falls within the electric capacity (i.e., torque capacity) of the first electric motor M1, or not is determined.

If the reaction force in-range determining means 84 determines that the engine torque $T_E$ does not fall within the range of a reaction torque that is can be borne i.e., bearable reaction torque by the first electric motor M1, the lock enable/disable determining means 86 determines whether the differential portion 11 can be switched from the continuously variable shifting state (differential action state) into the non-continuously variable shifting state (locked state) by the switching controlling means 50. For example, the determination is made based on whether the hydraulic control circuit 42 can bring the switching clutch C0 or the switching brake B0 into engagement in accordance with the command of the switching controlling means 50. Specifically, the lock enable/disable determining means 86 determines whether engagement of the switching clutch C0 or the switching brake B0 is enabled or disabled based on the fail of the friction material forming the switching clutch C0 or the switching brake B0 and the hydraulic actuator, the fail of the solenoid-operated valve included in the hydraulic control circuit 42 controlling the hydraulic actuator, the response delay caused by functionality degradation of these hydraulic actuator and solenoid operated valve or a low oil temperature, or the like.

Similarly, the lock enable/disable determining means 86 determines whether the differential portion 11 can be switched from the continuously variable shifting state (differential action state) into the non-continuously variable shifting state (locked state) by the switching controlling means 50. The determination is made based on whether the vehicle is in the stop state or a very low vehicle speed state, or in neither the stop state nor the very low vehicle speed state, for example. Specifically, when the actual vehicle speed V is determined not more than a predetermined vehicle speed V2, even if the aforementioned failure and functionality degradation do not occur, to allow engagement of the switching clutch C0 or the switching brake B0, the lock enable/disable determining means 86 determines that the differential portion 11 cannot be switched from the continuously variable shifting state (differential action state) into the non-continuously variable shifting state (locked state), that is impossibility of switching of the differential portion 11.

This predetermined vehicle speed V2 is a vehicle speed V that corresponds to a rotation speed that allows the engine 8 to autonomously rotate, e.g., an idling rotation speed $N_{IDL}$, and is previously calculated and stored. That is, the predetermined vehicle speed V2 is a vehicle speed for determining the magnitude of an engine rotation speed $N_E$ that is restricted in accordance with the vehicle speed V when the differential portion 11 is brought into the non-continuously variable shifting state.

In addition to the aforementioned function, the switching controlling means 50 limits the operation of the differential portion 11 as the electric differential device, when the lock enable/disable determining means 86 determines that the differential portion 11 cannot be switched from the continuously variable shifting state (differential action state) into the non-continuously variable shifting state (locked state). That is, the switching clutch C0 or the switching brake B0 is not brought into complete engagement to bring the differential portion 11 into the non-continuously variable shifting state, but it is brought into the half-engaged state.

Specifically, when the differential portion 11 cannot be switched into the non-continuously variable shifting state (locked state) during vehicle engine startup/engine running, the switching controlling means 50 outputs the hydraulic control circuit 42 with a command for changing the half-transmitting capacity state (half-engaged state) of the switching clutch C0 or the switching brake B0. The reason for this is that the operation of the differential portion 11 as the electrically operated continuously variable transmission is maintained (allowed) so that the first electric motor M1 bears a part of the reaction torque against the engine torque $T_E$, and the switching clutch C0 or the switching brake B0 bears the rest of the reaction torque against the engine torque $T_E$.

Operation of the switching controlling means 50, during vehicle engine startup or engine running, when the differential portion 11 cannot be switched into the non-continuously variable shifting state (locked state), can be expressed as follow. The switching controlling means 50 maintains (allows) the operation of the differential portion 11 as the electrically operated continuously variable transmission so that the reaction torque against the engine torque $T_E$ is generated with sum of the reaction torque generated by the first electric motor M1, and the reaction torque generated by the half-engaged the switching clutch C0 or the switching brake B0. To achieve this, with the switching clutch C0 or the switching brake B0 half-engaged, the hydraulic control circuit 42 is provided with the command that changes the torque capacity into the half-engaged state of the switching clutch C0 or the switching brake B0.

Thus, when the differential portion 11, receiving the engine torque $T_E$ not less than the reaction torque that can be generated by the first electric motor M1 alone, e.g., the engine torque $T_E$ not less than the predetermined value TE1, cannot be switched into the non-continuously variable shifting state (locked state), the switching controlling means 50 limits the operation of the differential portion 11 as the electric differential device. For this reason, if failure, functionality degradation or the like occurs in the switching clutch C0 or the switching brake B0, or during vehicle engine startup, the switching clutch C0 or the switching brake B0 is brought into the half-engaged state.

In the half-engaged state of the switching clutch C0 or the switching brake B0, in the differential portion 11, output B mechanically transmitted to the transmitting member 18 by the half-engaged switching clutch C0 or the switching brake B0 is added to output A electrically transmitted from the first electric motor M1 to the second electric motor M2 by the electrical path, and sum of them is outputted. That is, the switching controlling means 50 brings the switching clutch C0 or the switching brake B0 into the half-engaged state so that engine output that is required to satisfy the target output can be outputted by the output A electrically transmitted and the output B mechanically transmitted. The half-engaged state of the switching clutch C0 or the switching brake B0 is changed, that is, the torque capacity in the half-engaged state is changed, so that the ratio between the output A electrically transmitted, and the output B mechanically transmitted, is changed.

Figure 10:
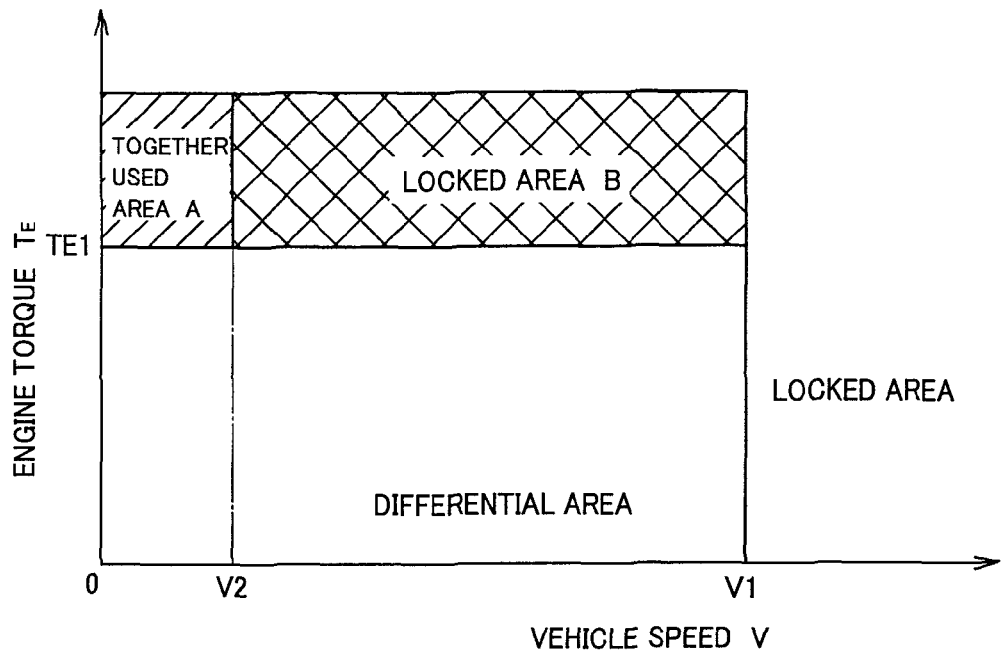
FIG. 10 shows one example in which the continuously variable control area (differential area) and the step variable control area (locked area) shown in FIG. 6 and FIG. 7 are rewritten on the second dimensional coordinate with the vehicle speed and the engine torque as the parameter.

FIG. 10 is a view showing one example in which the continuously variable control area (differential area) and the step variable control area (locked area) shown in FIG. 6 and FIG. 7 are rewritten on the second dimensional coordinate with the vehicle speed and the engine torque as the parameter. A high torque is shown by slash area in FIG. 10 where the vehicle speed V is not more than the predetermined vehicle V2 and the required engine torque $T_E$ exceeds the predetermined value TE1, corresponds to an area A where the differential portion 11 can not be switched to the non-continuously variable shifting state (locked state). This results from the differential portion 11 is maintained in the continuously variable shifting state and the engine stall is prevented.

In this area A, even if the engine torque $T_E$ not less than the predetermined value TE1 is inputted into the differential portion 11, owing to the proper engine startup, the differential portion 11 can not be switched to the non-continuously variable shifting state (locked state) originally. Accordingly, with the switching clutch C0 or the switching brake B0 brought into the half-engaged state by the switching controlling means 50, the reaction torque obtained by the first electric motor M1 and the reaction torque obtained by the switching clutch C0 or the switching brake B0 both half-engaged are used together. Thus, the reaction torque against the engine torque $T_E$ is generated (both used area A).

A high torque is shown by net area in FIG. 10 where the vehicle speed V exceeds the predetermined vehicle V2 and the required engine torque $T_E$ exceeds the predetermined value TE1 corresponds to a area B where the differential portion 11 can not be switched to the non-continuously variable shifting state (locked state). This results from occurrence of failure, functionality degradation or the like in the switching clutch C0 or the switching brake B0.

That is, in this area B, the differential portion 11 is essentially switched to the non-continuously variable shifting state (locked state) with input of the engine torque $T_E$ not less than the predetermined value TE1. However, the differential portion 11 can not be switched to the non-continuously variable shifting state (locked state) due to failure, functionality degradation or the like in the switching clutch C0 or the switching brake B0. In view of this, the switching controlling means 50 brings the switching clutch C0 or the switching brake B0 into the half-engaged state, so that the reaction torque obtained by the first electric motor M1 and the reaction torque obtained by the switching clutch C0 or the switching brake B0 both half-engaged are used together. Thus, the reaction torque against the engine torque $T_E$ is generated (locked area B)

The switching controlling means 50 generates reaction torque against the engine torque $T_E$ by using the reaction torque generated by the first electric motor M1, and the reaction torque generated by the half-engaged switching clutch C0 or the switching brake B0. However, if the reaction force borne by the first electric motor M1 reaches the torque limit, or if the reaction force generated by the half-engaged switching clutch C0 or the switching brake B0 reaches the slip limit due to hydraulic oil temperature and the like, the reaction torque cannot be generated beyond certain limits. The torque limit of the first electric motor M1 is the limited reaction torque previously defined based on its rating, for example. The slip limit of the switching clutch C0 or the switching brake B0 is the limited reaction torque where the switching clutch C0 or the switching brake B0 can be maintained in the half-engaged state (slip state) in consideration of oil temperature and the like, and is previously experimentally obtained.

In addition to the aforementioned function, the reaction force in-range determining means 84 determines whether the actual torque inputted into the differential portion 11 falls within the range that can be borne by the total reaction torque $T_{TC}$, when the switching controlling means 50 brings the switching clutch C0 or the switching brake B0 into the half-engaged state. In this instance, the actual torque is the actual engine torque $T_E$, for example. The total reaction torque $T_{TC}$ is the total reaction torque of the limited reaction torque of the first electric motor M1, and the limited reaction torque generated by the half-engaged switching clutch C0 or the switching brake B0.

If the reaction force in-range determining means 84 determines that the actual engine torque $T_E$ does not fall within the range of the reaction torque that can be borne by the total reaction torque $T_{TC}$, an input torque limiting means 88 limits the input torque $T_{INS}$ inputted into the differential portion 11. The limitation is made based on the reaction torque generated by the first electric motor M1 upon half-engagement of the switching clutch C0 or the switching brake B0, and the reaction torque generated by the half-engaged switching clutch C0 or the switching brake B0.

For example, the input torque limiting means 88 serves as an engine torque limiting means that limits the engine torque $T_E$ inputted into the differential portion 11 as the input torque $T_{INS}$. That is, the engine torque $T_E$ is limited so as not to exceed the total reaction torque $T_{TC}$ of the reaction torque generated by the first electric motor M1 upon half-engagement of the switching clutch C0 or the switching brake B0, and the reaction torque generated by the half-engaged switching clutch C0 or the switching brake B0. Then, the input torque limiting means 88 outputs the hybrid controlling means 52 a command for limiting the engine torque $T_E$ to not more than the total reaction torque $T_{TC}$. That is, the input torque limiting means 88 outputs the hybrid controlling means 52 the command for suppressing increase of the engine torque $T_E$ to not less than the limit that can be supported by the total reaction torque $T_{TC}$.

In addition to the aforementioned function, the hybrid controlling means 52 outputs the engine output control apparatus 43 a following command, in accordance with the command generated by the input torque limiting means 88, irrespective of accelerator pedal pressing operation. This command restricts the opening of the electronic throttle valve 96, reduces the fuel supply amount by the fuel injection device 98, or delays the angle of ignition timing of the engine 8 by the ignition device 99. This command is outputted alone or in combination with other commands, and limits the engine torque $T_E$ so as not to exceed the total reaction torque $T_{TC}$.

Figure 11:
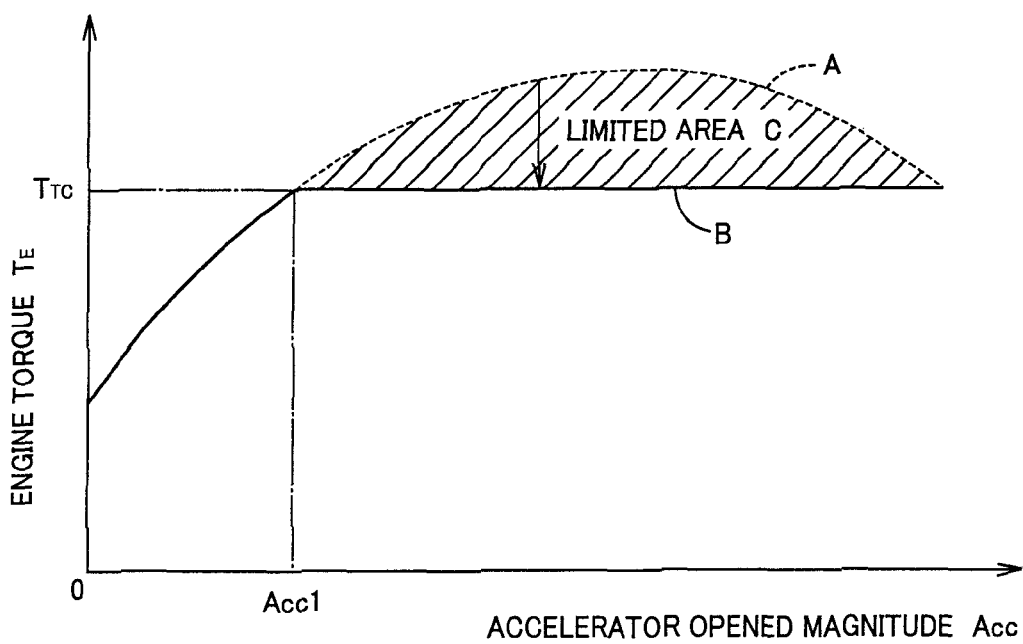
FIG. 11 shows one example of the output characteristic view of the engine torque relative tot the accelerator opened magnitude.

FIG. 11 is a view showing an example of the output characteristics of engine torque $T_E$ against an accelerator pedal operation amount (accelerator opened magnitude) $\theta_{acc}$ (degree). The slash area shown in FIG. 11 is a high torque area in which the required engine torque $T_E$ that exceeds the total reaction torque $T_{TC}$, when the accelerator pedal is depressed to not less than the accelerator opening $\theta_{acc1}$ previously specified. In this case, the reaction torque against the engine torque $T_E$ is generated by the first electric motor M1, and the switching clutch C0 or the switching brake B0, and the engine torque $T_E$ is limited so as not to exceed the total reaction torque $T_{TC}$ (limited area C).

When the hybrid controlling means 52 limits the engine torque $T_E$ so as not to exceed the total reaction torque $T_{TC}$, increase of the engine torque $T_E$ is suppressed to not less than the torque limit that can be supported by the total reaction torque $T_{TC}$, so that the output torque $T_{OUT}$ does not increase. In addition to the aforementioned function, even when the engine torque $T_E$ is limited, the hybrid controlling means 52 may drive the second electric motor M2 to execute torque assist, if the charging capacity SOC of the electric-energy storage device 60 is sufficient.

Figure 12:
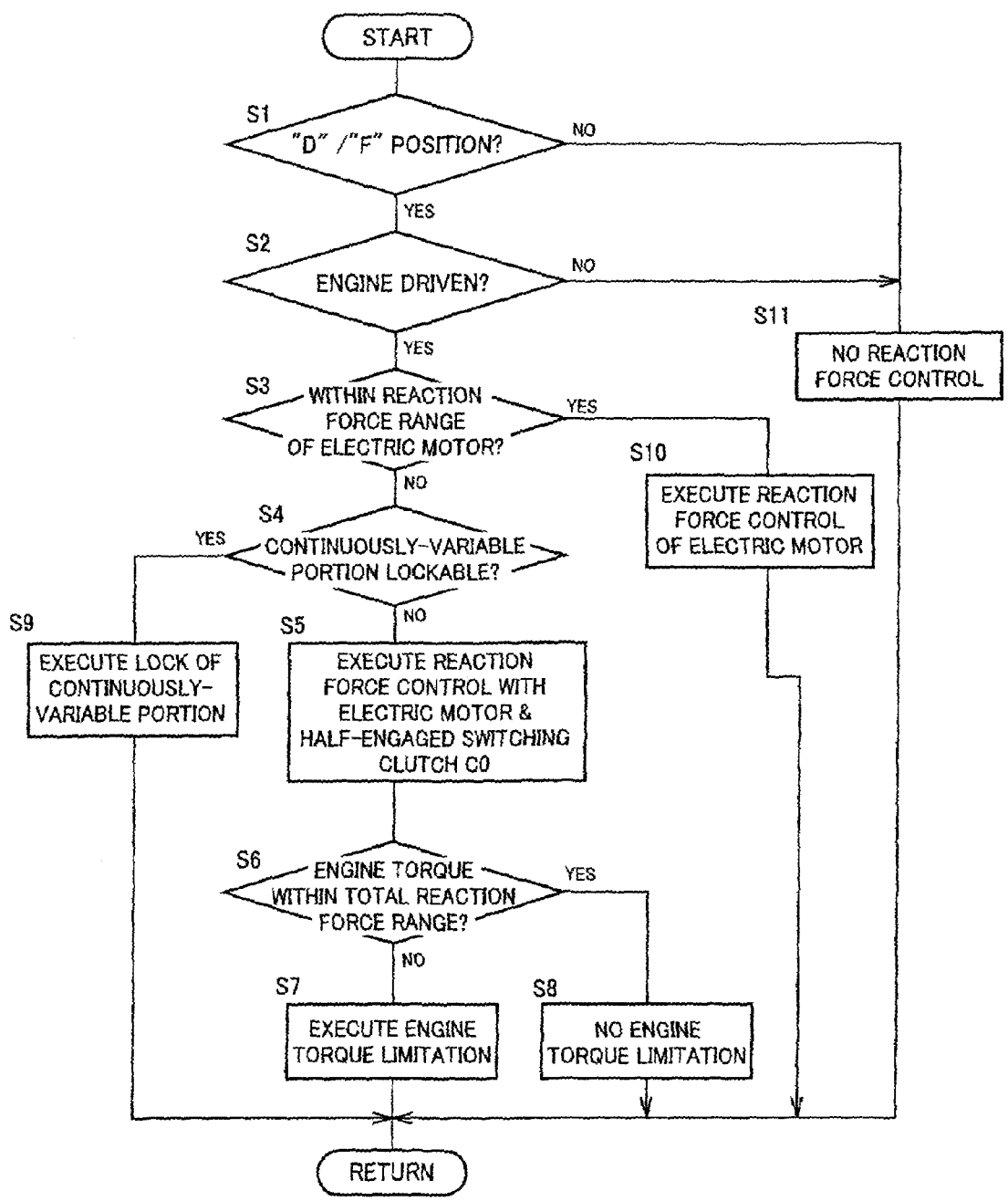
FIG. 12 is a flowchart explaining the control operation of the electronic control device shown in FIG. 4, that is a skip control operation of the switch clutch or the switch brake executed when the differential portion is not switched from the continuously variable shifting state (differential state) to the non-continuously variable shifting state (locked state).

FIG. 12 is a flow chart illustrating the main part of the control operation of the electronic control device 40. FIG. 12 illustrates a slip control operation of the switching clutch C0 or the switching brake B0, that is executed when the differential portion 11 cannot be switched from the continuously variable shifting state (differential action state) to the non-continuously variable shifting state (locked state). For example, this sequence is repeatedly executed in a very short cycle time period of approximately several milliseconds to several tens of milliseconds.

Figure 13:
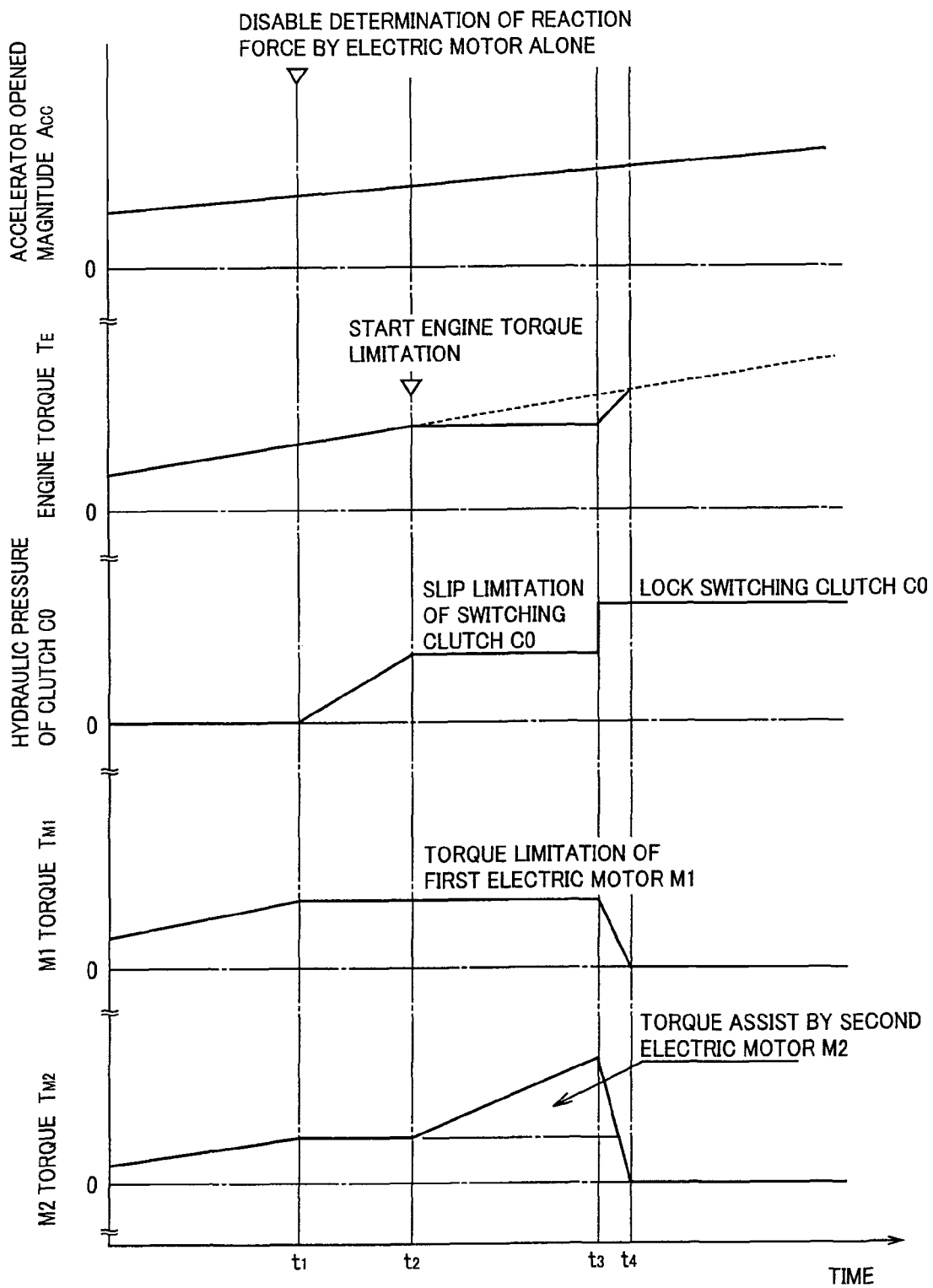
FIG. 13 is a time chart explaining the control operation shown in the flowchart of FIG. 12, showing the control operation at the engine startup wherein the accelerator pedal is depressed at the zero vehicle speed in the continuously variable shifting state.

FIG. 13 is a time chart illustrating the control operation shown in the flow chart of FIG. 12, and illustrates the control operation during vehicle engine startup when the accelerator pedal is depressed in the continuously variable shifting state of the differential portion 11 from a vehicle speed V of zero.

First, in Step S1 corresponding to the shift position determining means 80, it is determined whether the shift position of the shift lever 48 is located at the driving position of the "D" or "R" position, or is not. This determination is made based on the signal representing the shift position $P_{SH}$ of the shift lever 48 from the shift position sensor 49.

If YES is the determination of Step S1, in Step S2 corresponding to the driving force source determining means 82, it is determined whether the engine 8 is mainly used by the hybrid controlling means 52 as the driving force source for vehicle operation. For example, as shown by the driving force source switching diagram shown in FIG. 6, this is made by determination of whether the vehicle state is presently in the vehicle engine operating range or not, based on the actual vehicle state represented by the vehicle speed V and the output torque $T_{OUT}$.

If YES is the determination of Step S2, in Step S3 corresponding to the reaction force in-range determining means 84, it is determined whether the actual engine torque $T_E$ inputted into the differential portion 11 falls within the predetermined range. The predetermined range is the range of the reaction torque against the engine torque $T_E$ that can be borne by the torque capacity of the first electric motor M1.

At time $t_1$ in FIG. 13, it is determined, during vehicle engine startup in the continuously variable shifting state of the differential portion 11, the engine torque $T_E$ increases to the extent that the reaction torque against the engine torque $T_E$ cannot be borne by the first electric motor M1 alone. That is, the engine torque $T_E$ exceeds the limit reaction torque (torque limit) of the first electric motor M1, or not.

If NO is the determination of Step S3, in Step S4 corresponding to the lock enable/disable determining means 86, it is determined whether the differential portion 11 can be switched from the continuously variable shifting state (differential action state) into the non-continuously variable shifting state (locked state) by the switching controlling means 50. For example, whether engagement is enabled or disabled is determined based on the fail of the friction material of the switching clutch C0 or the switching brake B0 and the hydraulic actuator, the fail of the solenoid operated valve included in the hydraulic control circuit 42 controlling the hydraulic actuator, a response delay due to functionality degradation of the hydraulic actuator and solenoid-operated valve or a low oil temperature, or the like. Alternatively, determination is made based on whether there is a possibility that the operation of the engine 8 is not maintained, that is whether the actual vehicle speed V is not more than the predetermined vehicle speed V2 which may cause the engine stall.

In addition to this, at time $t_1$ in FIG. 13, it is also determined, due to the actual vehicle speed V not more than the predetermined vehicle speed V2, the complete engagement of the switching clutch C0 (or switching brake B0) cannot switch the differential portion 11 into the non-continuously variable shifting state.

If NO is the determination of Step S4, in Step S5 corresponding to the switching controlling means 50, the operation of the differential portion 11 as the electrically operated continuously variable transmission is maintained (allowed), and a command for bringing the switching clutch C0 or the switching brake B0 into half-engaged state is inputted into the hydraulic control circuit 42. This is to generate reaction torque against the engine torque $T_E$ with sum of the reaction torque generated by the first electric motor M1, and the reaction torque generated by the half-engaged switching clutch C0 or the switching brake B0. Basically, in terms of rotation and torque, bringing the switching clutch C0 into half-engaged state is more advantageous than bringing the switching brake B0 into half-engaged state.

In the time period from time $t_1$ to time $t_2$ in FIG. 13, it is illustrated that the slip control of the switching clutch C0 is started and executed so that the reaction torque is borne by the half-engaged torque of the switching clutch C0, and therefore, the engine torque $T_E$ increases to exceed the limited reaction torque of the first electric motor M1.

Subsequently, in Step S6 corresponding to the reaction force in-range determining means 84, it is determined whether the actual engine torque $T_E$ inputted into the differential portion 11 falls within the range of the reaction torque that can be borne by the total reaction torque $T_{TC}$ of the first electric motor M1, and the switching clutch C0 or the switching brake B0.

At time $t_2$ in FIG. 13 illustrates determination is made that the engine torque $T_E$ increases beyond the total reaction torque $T_{TC}$ of the reaction torque limit set by the first electric motor M1 and the reaction torque limit set by the half-engagement of the switching clutch C0. The limit set by the half-engagement arises when, in the slip control of the switching clutch C0, the half-engaged state (slip state) of the switching clutch C0 reaches the limit for maintaining the half-engaged state in consideration of oil temperature and the like.

If NO is the determination of Step S6, in Step S7 corresponding to the input torque limiting means 88, the hybrid controlling means 52 outputs a command that limits the engine torque $T_E$ so as not to exceed the total reaction torque $T_{TC}$ of the reaction torque set by the first electric motor M1, and the reaction torque set by the half-engaged switching clutch C0 or the switching brake B0. The hybrid controlling means 52 outputs, in accordance with the command, the engine output control apparatus 43 a command that, irrespective of any accelerator pedal pressing operation, restricts the opening of the electronic throttle valve 96, reduces the fuel supply amount by the fuel injection device 98, or delays the angle of ignition timing of the engine 8 by the ignition device 99. This command is outputted alone or in combination with other commands, and limits the engine torque $T_E$ so as not to exceed the total reaction torque $T_{TC}$.

In time period from time $t_2$ to time $t_3$ in FIG. 13, it is illustrated that the engine torque $T_E$ limitation started and executes to suppress an increase in the engine torque $T_E$ so as not to exceed the total reaction torque $T_{TC}$. During the time period from time $t_2$ to time $t_3$, increase of the engine torque $T_E$ not less than the limit that can be supported by the total reaction torque $T_{TC}$ is suppressed, so that the output torque $T_{OUT}$ does not increase. Accordingly, for example, the hybrid controlling means 52 drives the second electric motor M2 and thus executes a torque assist, to increase the output torque $T_{OUT}$ in accordance with the required output (target output) based on the accelerator pedal depressing operation. This torque assist is executed when the charged capacity SOC of the electric power storage device 60 is sufficient.

In addition to this, as shown in time period from time $t_3$ to time $t_4$, for example, by increase of the vehicle speed V beyond the predetermined vehicle speed V2, when the differential portion 11 is brought into the non-continuously variable shifting state by the completely engaged clutch C0, the clutch C0 is brought from the half-engaged state into complete engagement to bring the differential portion 11 into the non-continuously variable shifting state (locked state). During this period, while the engine torque $T_E$ limitation is gradually being released, the torque assist by the second electric motor M2 is also gradually stopped. Complete engagement of the clutch C0 makes unnecessary to execute the reaction force control that generates reaction torque using the first electric motor M1.

If YES is the determination of Step S6, due to no requirement to limit the engine torque $T_E$, in Step S8 corresponding to the input torque limiting means 88, the limiting command is not outputted to the hybrid controlling means 52. In addition to this, for example, also when the vehicle speed V exceeds the predetermined vehicle speed V2, since the clutch C0 or the switching brake B0 are sufficiently completely engaged, there is no need to limit the engine torque $T_E$.

If YES is the determination of Step S4, in Step S9 corresponding to the switching controlling means 50, the clutch C0 or the switching brake B0 is completely engaged, so that the differential portion 11 is switched from the continuously variable shifting state (differential action state) to the non-continuously variable shifting state (locked state).

If YES is the determination of in Step S3, in Step S10 corresponding to the hybrid controlling means 52, while the differential portion 11 is maintained in the continuously variable shifting state (differential action state), the reaction force control by the first electric motor M1 is executed.

If NO is the determination of Step S1, or if NO is the determination of Step S2, in Step S11 corresponding to the hybrid controlling means 52, the reaction force control by the first electric motor M1 is not executed. That is, in the non-driving position of the "P" or "N" position corresponding to a power disconnected state, the engine 8 and the output shaft 22 are not connected to each other. In other words, the clutches C1 and C2 are released not to transmit the engine output to the output shaft 22 (drive wheels 38). For this reason, the first electric motor M1 is not required to bear a reaction torque against the engine torque. Moreover, in order to correspond to the "P" position or the "N" position, for establishing the neutral state in which the power transmitting path is electrically disconnected or interrupted in the differential portion 11, the first electric motor M1 does not bear the reaction torque against the engine torque.

As stated above, according to this embodiment, the switching clutch C0 or the switching brake B0 as the differential action limiting device that limits the operation of the differential portion 11 as the electric differential device can, for example, switch the differential portion 11 between the continuously variable shifting state and the non-continuously variable shifting state. Accordingly, the driving apparatus is realized, that has both the advantages of an improvement in fuel efficiency effected by the transmission electrically changing the gear ratio, and high transmitting efficiency effected by the gear type transmission device mechanically transmitting power. For example, when the differential portion 11 is brought into the continuously variable shifting state during a normal engine power range such as low/medium speed running and the low/medium output running, the fuel consumption performance of a vehicle is secured.

In addition to this, when the differential portion 11 is brought into the non-continuously variable shifting state during high speed operation, the output of the engine 8 is exclusively transmitted to the drive wheels 38 via a mechanical power transmitting path. In this case, since the conversion loss between power and electrical energy generated when the differential portion 11 operates as the transmission electrically changing the gear ratio is suppressed, the fuel efficiency is improved. For example, when the differential portion 11 is brought into the non-continuously variable shifting state in the high output running, the range in which the differential portion 11 operates as the transmission electrically changing the gear ratio corresponds to the vehicle low/medium speed running and low/medium output running. As a result, the maximum value of the electrical energy that should be generated by the first electric motor M1, or in other words, of the electrical energy transmitted by the first electric motor M1, can be reduced. Thus, the first electric motor M1 is further reduced in its size, the second electric motor M2 receiving the electric energy transmitted from the first electric motor M1 is reduced in its size, and the shifting mechanism 10 including it is reduced in its size.

During vehicle engine startup/engine running, when limiting the operation of the differential portion 11 as the electric differential device, the switching controlling means 50 that serves as the differential action limiting means changes the half-engaged state of the switching clutch C0 or the switching brake B0. Specifically, the switching clutch C0 or the switching brake B0 is brought into the half-engaged state by the switching controlling means 50, and the reaction torque is generated against the engine torque $T_E$ inputted into the differential portion 11 by the torque generated by the first electric motor M1, and the half-engaged torque of the switching clutch C0 or the switching brake B0. In other words, the switching controlling means 50 changes the torque capacity of the switching clutch C0 or the switching brake B0 brought into the half-engaged state.

Accordingly, the ratio can be changed between the output electrically transmitted from the first electric motor M1 to the second electric motor M2 in the differential portion 11, and the output mechanically transmitted to the transmitting member 18 in the differential portion 11. Therefore, while the operation of the differential portion 11 as the electrically operated continuously variable transmission (differential device) is allowed, the reaction torque against the engine torque $T_E$ is generated by the switching clutch C0 or the switching brake B0.

That is, in order to allow the differential portion 11 to operate as the electrically operated continuously variable transmission, the reaction torque against the engine torque $T_E$ can be borne by both the first electric motor M1, and the switching clutch C0 or the switching brake B0. Accordingly, for example, the engine torque $T_E$ exceeding the predetermined value TE1 that can be borne by the torque capacity of the first electric motor M1 can be inputted into the differential portion 11. Therefore, the output from the differential portion 11 can be increased without increasing the maximum torque capacity, i.e., the size, of the first electric motor M1.

In addition to this, in contrast to the case where the switching clutch C0 or the switching brake B0 is released, the first electric motor M1 does not necessarily bear the reaction torque against the entire engine torque inputted into the differential portion 11. Accordingly, for the same magnitude engine torque $T_E$ inputted into the differential portion 11, the ratio of the engine torque $T_E$ that should be borne by the first electric motor M1 can be reduced, so that the first electric motor M1 can be reduced in size, or improved in its durability. Additionally, owing to the reduced electrical energy transmitted from the first electric motor M1 to the second electric motor M2, the durability of the second electric motor M2 is also improved. Moreover, the operation of the differential portion 11 as the electrically operated continuously variable transmission can be easily limited by the switching clutch C0 or the switching brake B0.

According to the present embodiment, the switching controlling means 50 limits the operation of the differential portion 11 as the electrically operated continuously variable transmission when the engine output torque $T_E$, that is not less than the reaction torque that can be generated by the first electric motor M1 alone, is inputted into the differential portion 11. Accordingly, the differential portion 11 can operate as the electrically operated continuously variable transmission, so that the reaction force against the engine torque $T_E$ is preferentially generated as much as possible by the first electric motor M1. Thus, the regeneration energy when the first electric motor M1 generates the reaction force is increased as much as possible. From another point of view, the energy loss down is minimized to an unavoidable level.

According to the present embodiment, the switching controlling means 50 limits the operation of the differential portion 11 as the electrically operated continuously variable transmission during the vehicle engine startup. Accordingly, the differential portion 11 can also operate as the electrically operated continuously variable transmission even during vehicle startup that requires the large engine torque $T_E$. In addition to this, the reaction force against the engine torque $T_E$ is preferentially generated as much as possible by the first electric motor M1, so that the regeneration energy when generating the reaction force by the first electric motor M1 is increased as much as possible. From another point of view, the energy loss is minimized down to an unavoidable level.

According to the present embodiment, the input torque limiting means 88 suppresses entry of the engine torque $T_E$, that exceeds the total reaction torque $T_{TC}$ comprised of the maximum torque capacity of the first electric motor M1, and the half-engaged torque of the switching clutch C0 or the switching brake B0, into the differential portion 11. The suppression is based on the reaction torque generated by the first electric motor M1 upon half-engaged state of the switching clutch C0 or the switching brake B0, and the reaction torque generated by the switching clutch C0 or the switching brake B0. As a result, the durability of the first electric motor M1 is improved.

Embodiment 2

Figures 14, 15:
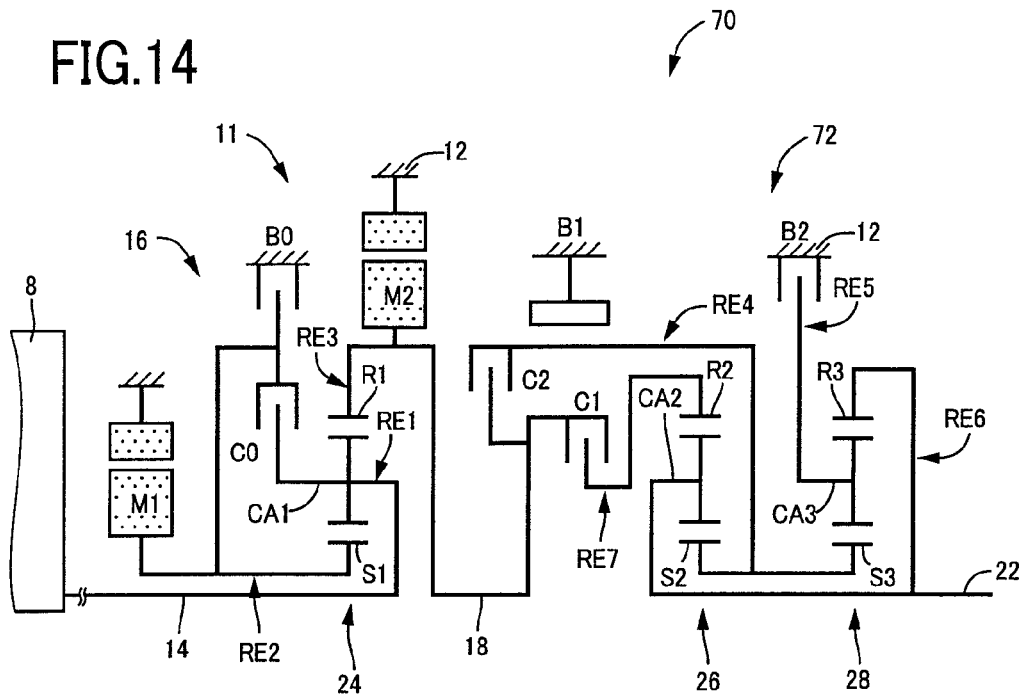
FIG. 14 is a skeleton view explaining a drive apparatus of a hybrid vehicle according to other embodiment of the present invention, corresponding to FIG. 1.
FIG. 15 is an operation Table explaining a relation between a shifting operation of the drive apparatus of the hybrid vehicle of the embodiment shown in FIG. 14 operable in a continuously variable shifting state or a step-variable shifting state, and operation combinations of hydraulic-type frictionally engaging devices used therefore, corresponding to FIG. 2.
Figure 16:
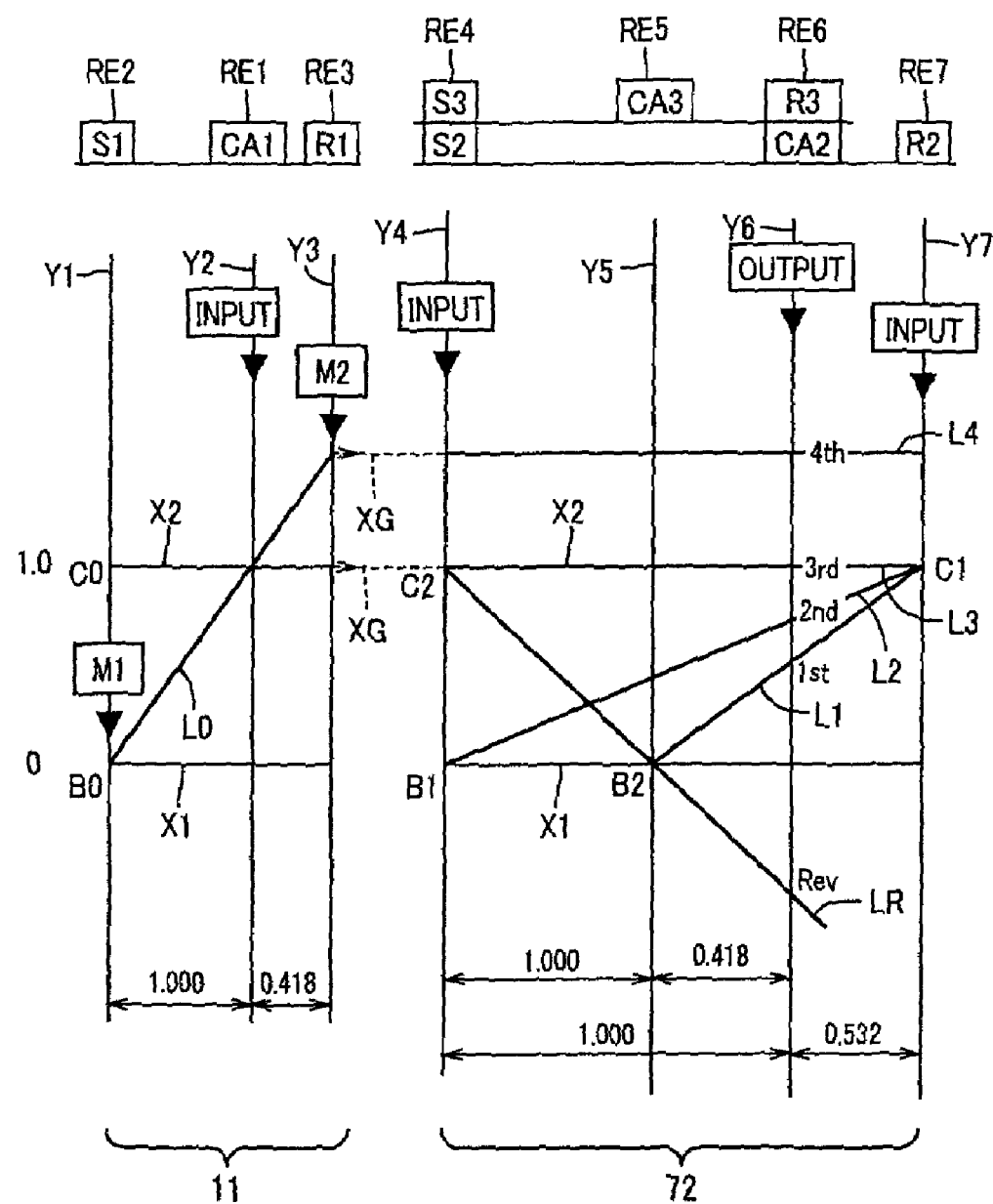
FIG. 16 is a collinear chart explaining relative rotating speeds of rotary elements in each of gear positions when the drive apparatus of the hybrid vehicle of the embodiment shown in FIG. 1 is operated in the step variable shifting mode, corresponding to FIG. 3.

FIG. 14 is a skeleton view explaining structure of a shifting mechanism 70 according to other embodiment of the present invention. FIG. 15 is an operation Table indicating a relation between a shifting position of the shifting mechanism 10, and operation combinations of hydraulic-type frictionally engaging devices used therefor. FIG. 16 is a collinear chart explaining a shifting running 1 of the shifting mechanism 70.

Like the illustrated embodiment described above, the shifting mechanism 70 comprises the differential portion 11 including the first electric motor M1, the power distributing mechanism 16 and the second electric motor M2, and an automatic transmission portion 72 with three forward-gear positions connected to the differential portion 11 and the output shaft 22 in series via the transmitting member 18. The power distributing mechanism 16 includes the first planetary gear unit 24 of the single pinion type having a given gear ratio $\rho 1$ of, for instance, about 0.418, the switching clutch C0 and the switching brake B0.

The automatic transmission portion 72 includes the second planetary gear unit 26 of the single pinion type having a given gear ratio $\rho 2$ of, for instance, about 0.532, and the third planetary gear unit 28 of the single pinion type having a given gear ratio $\rho 3$ of, for instance, about 0.418. The sun gear S2 of the second planetary gear unit 26 and the sun gear S3 of the third planetary gear unit 28 are integrally connected to each other. These sun gears S2 and S3 are selectively coupled to the transmitting member 18 via the second clutch C2 and also selectively coupled to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1 and the third carrier CA3 is selectively coupled to the case 12 via the second brake B2.

With the shifting mechanism 70 thus constructed, the switching clutch C0, the first clutch C1, the second clutch C2, the switching brake B0, the first brake B1 and the second brake B2 are selectively coupled as shown by, for instance, the operation Table shown in FIG. 15. One of a 1st-gear position (1st-speed position) to a 4th-gear position (4th-speed position), a reverse-gear position (rear-drive position) or a neutral position is selectively established. In this moment, each gear position has a gear ratio $\gamma$ (=input shaft speed $N_{IN}$/output shaft speed $N_{OUT}$) that substantially varies in equal ratio.

In particular, with the present embodiment, the power distributing mechanism 16 incorporates the switching clutch C0 and the switching brake B0. With either the switching clutch C0 or switching brake B0 being coupled, the differential portion 11 can be structured to assume the continuously variable shifting state operative as the continuously variable transmission and, in addition thereto, the fixed shifting state operative as a transmission with a fixed gear ratio. Accordingly, with either the switching clutch C0 or switching brake B0 brought into coupling engagement, the shifting mechanism 70 can take a structure for the step-variable shifting state operative as the step-variable transmission with the differential portion 11 placed in the fixed shifting state, and the automatic transmission portion 72.

With both the switching clutch C0 and switching brake B0 brought into releasing states, the shifting mechanism 70 can take the continuously variable shifting state operative as the electrically controlled continuously variable transmission with the differential portion 11 placed in the continuously variable shifting state, and the automatic transmission portion 72. In other words, the shifting mechanism 70 is switched to the step-variable shifting state upon engaging either the switching clutch C0 or the switching brake B0, and switched to the continuously variable shifting state upon releasing both the switching clutch C0 and switching brake B0.

For the shifting mechanism 70 to function as the step-variable transmission, as shown for instance in FIG. 15, the switching clutch C0, the first clutch C1 and the third brake B3 are coupled, which establishes the 1st-gear position having the highest gear ratio $\gamma 1$ of, for instance, about 2.804. With the switching clutch C0, the first clutch C1 and the first brake B being coupled, a 2nd-gear position is established with a gear ratio $\gamma 2$ of, for instance, about 1.531 that is lower than that of the 1st-gear position. With the switching clutch C0, the first clutch C1 and the second clutch C2 being coupled, a 3rd-gear position is established with a gear ratio $\gamma 3$ of, for instance, about 1.000 that is lower than that of the 2nd-gear position.

With the first clutch C1, the second clutch C2 and the switching brake B0 being coupled, a 4th-gear position is established with a gear ratio $\gamma 4$ of, for instance, about 0.705 that is lower than that of the 3rd-gear position. Further, with the second clutch C2 and the second brake B2 being coupled, a reverse-gear position is established with a gear ratio $\gamma R$ of, for instance, about 2.393 that is intermediate between those of the 1st-gear and 2nd-gear positions. In addition, for the neutral "N" state to be established, for instance, only the switching clutch C0 is coupled.

In contrast, for the shifting mechanism 10 to function as the continuously variable transmission, both the switching clutch C0 and the switching brake B0 are uncoupled as indicated in the operation Table shown in FIG. 15. This allows the differential portion 11 to function as the continuously variable transmission, and the automatic transmission 20 connected to the differential portion 11 in series to function as the step-variable transmission. When this takes place, the rotating speed input to the automatic transmission portion 72 for the gear positions placed in the 1st-gear, 2nd-gear and 3rd-gear positions, respectively, that is, the rotating speed of the transmitting member 18, is caused to continuously vary. This allows the respective gear positions to have gear ratio s in continuously variable ranges. Accordingly, the automatic transmission portion 72 has a gear ratio that is continuously variable across the adjacent gear positions, causing the shifting mechanism 70 to have the overall gear ratio $\gamma T$ variable in a continuous fashion as a whole.

FIG. 16 shows a collinear chart representing relative relations on the rotating speeds of the rotary elements coupled in differing states for the intended gear positions in the shifting mechanism 70, respectively. The shifting mechanism 70 is structured with the differential portion 11 functioning as the continuously variable shifting portion or first shifting portion, and the automatic transmission portion 72 functioning as the shifting portion (step-variable shifting portion) or a second shifting portion. For the switching clutch C0 and the switching brake B0 to be uncoupled i.e., disengaged, and for the switching clutch C0 or the switching brake B0 to be coupled i.e., engaged, the rotary element s of the power distributing mechanism 16 rotate at the same speeds as those stated above.

In FIG. 16, the automatic transmission portion 72 operates on four vertical lines Y4, Y5, Y6 and Y7 corresponding to fourth to seventh rotary element s RE4 to RE7 in order from the left, respectively. The fourth rotary element (fourth element) RE4 represents that the second and third sun gears S2 and S3 are connected to each other. The fifth rotary element (fifth element) RE5 corresponds to the third carrier CA3. The sixth rotary element (sixth element) RE6 represents that the second carrier CA2 and the third ring gear R3 are connected to each other. The seventh rotary element (seventh element) RE7 corresponds to the second ring gear R2. Further, in the automatic transmission portion 72, the fourth rotary element RE4 is selectively connected to the transmitting member 18 via the second clutch C2 and selectively connected to the case 12 via the first brake B1. The fifth rotary element RE5 is selectively connected to the case 12 via the second brake B2. The sixth rotary element RE6 is connected to the output shaft 22 of the automatic transmission portion 72. The seventh rotary element RE7 is selectively connected to the transmitting member 18 via the first clutch C1.

The automatic transmission portion 72 operates in a manner as shown in FIG. 16. That is, with both the first clutch C1 and the second brake B2 being coupled, an intersection point between an inclined linear line L1 and the vertical line Y6 represents the rotating speed of the output shaft 22 in the 1st-speed position. The inclined linear line L1 passes across an intersection point between the vertical line Y7 indicative of the rotating speed of the seventh rotary element (seventh element) RE7 (R2), and an intersection point between the vertical line Y5 indicative of the rotating speed of the fifth rotary element RE5 (CA3), and a horizontal line X1. The vertical line Y6 represents the rotating speed of the sixth rotary element (sixth element) RE6 (CA2, R3) connected to the output shaft 22.

Likewise, an intersection point between an inclined linear line L2 determined with both the first clutch C1 and the first brake B1 being coupled, and the vertical line Y6 indicative of the rotating speed of the sixth rotary element RE6 connected to the output shaft 22, represents the rotating speed of the output shaft 22 in the 2nd-speed position. An intersection point between a horizontal linear line L3 determined with both the first clutch C1 and the second clutch C2 being coupled, and the vertical line Y6 indicative of the rotating speed of the sixth rotary element RE6 connected to the output shaft 22, represents the rotating speed of the output shaft 22 in the 3rd-speed position.

For the 1st-speed to the 3rd-speed positions, as a result of the switching clutch C0 being coupled, the differential portion 11 inputs drive power to the seventh rotary element RE7 at the same rotating speed as the engine speed $N_E$. However, as the switching brake B0 is coupled in place of the switching clutch C0, the differential portion 11 inputs drive power to the seventh rotary element RE7 at a rotating speed higher than the engine speed $N_E$. Thus, an intersection point between a horizontal linear line L4 determined with the first clutch C1, the second clutch C2 and the switching brake B0 being coupled, and the vertical line Y6 indicative of the rotating speed of the sixth rotary element RE6 connected to the output shaft 22, represents the rotating speed of the output shaft 22 in the 4th-speed position.

Even with the present embodiment, the shifting mechanism 70 includes the differential portion 11 functioning as the continuously variable transmission or the first shifting portion, and the automatic transmission portion 72 functioning as the shifting portion (step-variable transmission portion) or the second shifting portion. This allows the shifting mechanism 70 to have the same advantageous effects as those of the embodiment described above.

Embodiment 3

Figure 17:
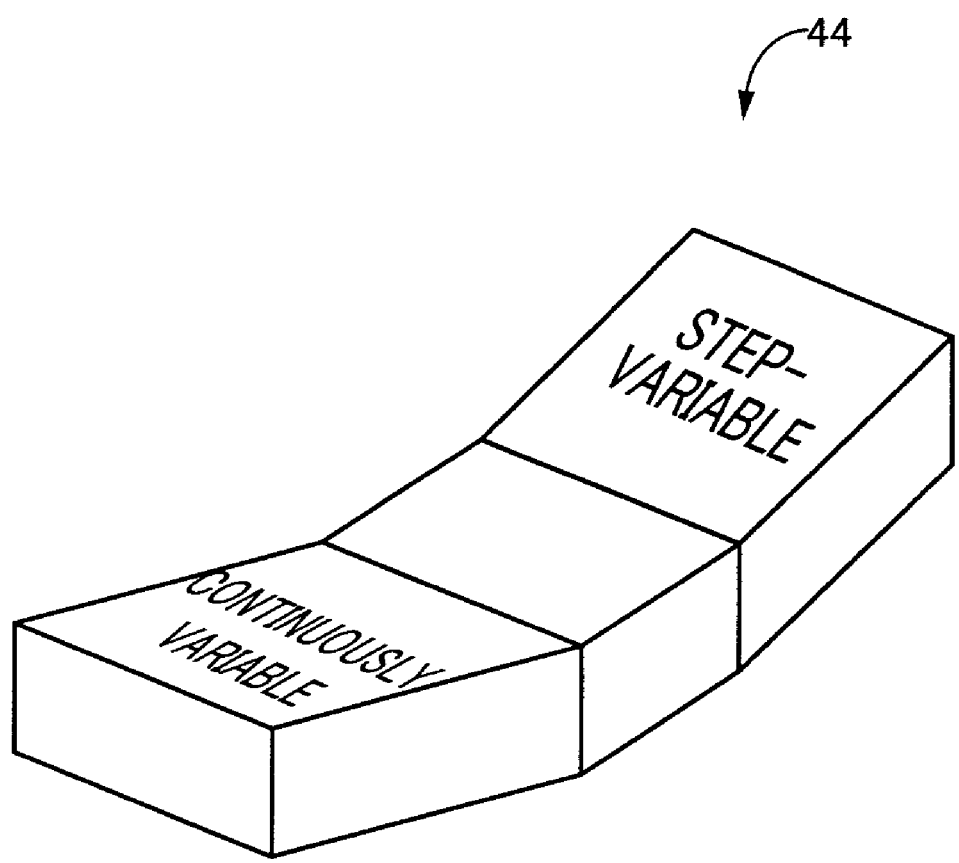
FIG. 17 shows one example of a manual shifting state selection device including a seesaw type switch serving as a switching device to be manipulated by a vehicle driver for selecting a shifting state.

FIG. 17 shows an example a seesaw type switch 44 (hereinafter referred to as a "switch 44"), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step-variable shifting state. The switch 44 allows the vehicle to run in a shifting state desired by the vehicle driver. The switch 44 has a continuously variable shift running command button with a display "CONTINUOUSLY VARIABLE", representing a continuously variable shift running mode, and a step-variable shift running command button with a display "STEP-VARIABLE" representing a step-variable shift running mode. Upon depression of the vehicle driver on one of these buttons, the shifting mechanism 10 can be selectively placed in the continuously variable shifting state, operative as the electrically controlled continuously variable transmission, or the step-variable shifting state operative as the step-variable transmission.

The embodiments set forth above have been described with reference to the case wherein the shifting mechanism 10 performs the automatic switching control operation to be placed in the shifting state based on variations in the vehicle condition by referring to, for instance, the relational chart shown in FIG. 6. On the contrary, in place of the automatic switching control operation or in addition thereto, the switch 44 may be manipulated for thereby executing manual switching control for the shifting state of the shifting mechanism 10. That is, the switching control means 50 may take priority to switch the shifting mechanism 10 to the continuously variable shifting state and the step-variable shifting state depending on the switch 44 selectively operated for the continuously variable shifting state and the step-variable shifting state.

For instance, if the vehicle driver, desiring a running mode with a touch of feeling in the continuously variable transmission and improved fuel economy, then manually selects the continuously variable shifting to be placed by the shifting mechanism 10. Further, if another running mode is desired with the step-variable transmission performing the gear shifting accompanied by a rhythmical change in the rotating speed $N_E$ of the engine, the vehicle driver manually selects the step-variable shifting state to be placed by the shifting mechanism 10.

Further, there exists a probability for the switch 44 not to be provided with a neutral position under which neither the continuously variable running mode nor the step-variable running mode is selected. Under such a probability, if the switch 44 remains in a status with the neutral position, if no desired shifting state is selected by the vehicle driver or if the desired shifting state is under automatic switching mode, then, the automatic switching control may be executed for the shifting state of the transmission mechanism 10.

Embodiment 4

Figure 18:
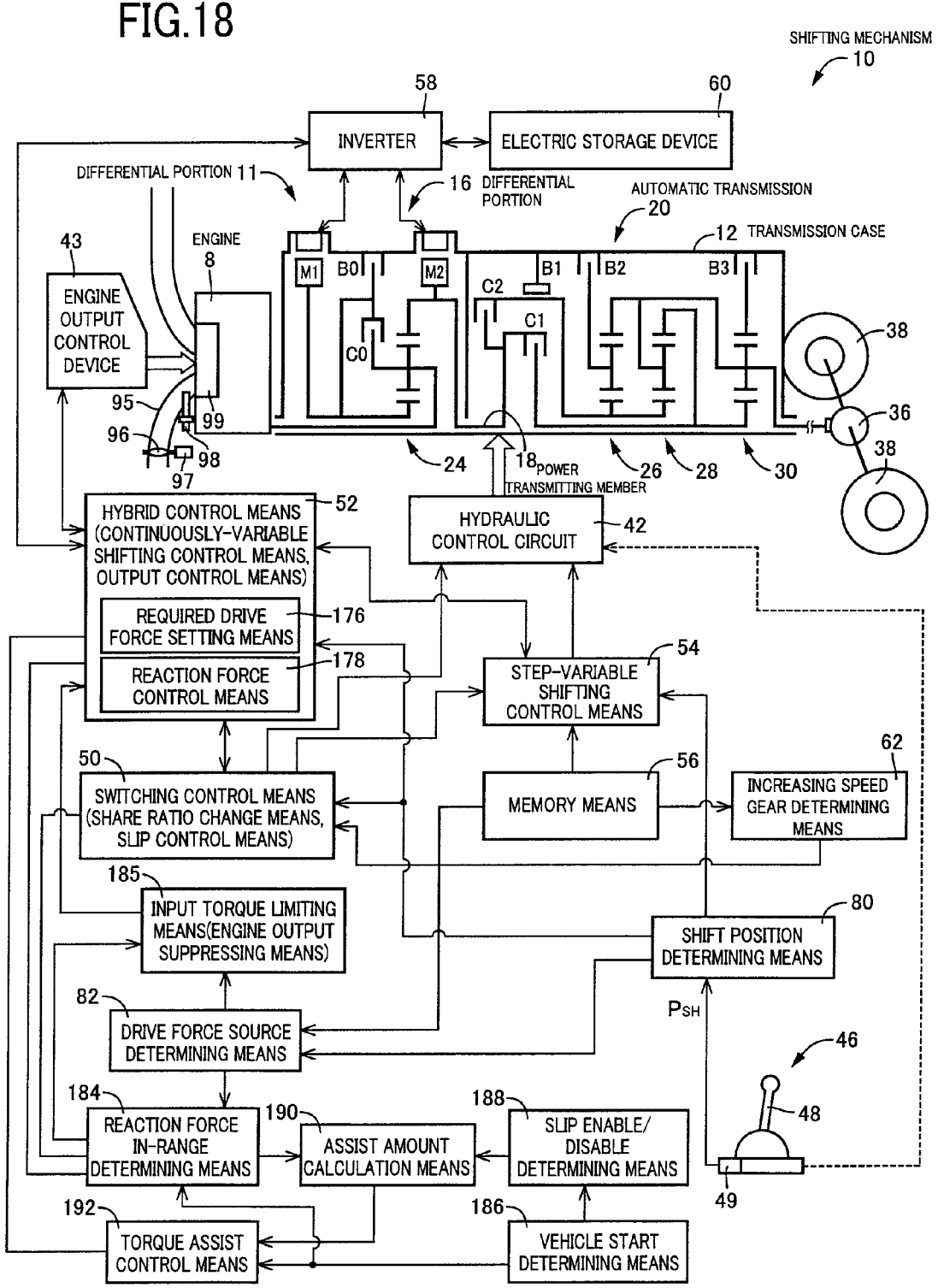
FIG. 18 is a functional block diagram explaining a main part of the control operation of the electronic control device of the drive apparatus of hybrid vehicle which is the fourth embodiment of the present invention.

FIG. 18 is a functional block diagram illustrating the main part of the control function in the aforementioned electronic control device 40 according to another embodiment of the present invention.

In this embodiment, if the differential portion 11 cannot be switched to the non-continuously variable shifting state during vehicle engine startup/engine running, the following configuration is adopted, such that any reduction in durability may be suppressed without increasing the first electric motor M1 in size. That is, the operation of the differential portion 11 as an electrically operated continuously variable transmission can be maintained (allowed), and the first electric motor M1 can bear a part of the reaction torque against the engine torque $T_E$. In addition to this, such that the switching clutch C0 or the switching brake B0 can bear the rest of the reaction torque against the engine torque $T_E$, the switching clutch C0 or the switching brake B0 is brought into the half-transmitting capacity state, i.e., the half-engaged (slip) state.

That is, if the differential portion 11 cannot be switched into the non-continuously variable shifting state during vehicle engine startup/engine running, the differential portion 11 operates as an electrically operated continuously variable transmission. For this purpose, the switching clutch C0 or the switching brake B0 is brought into the half-engaged state, and the reaction torque against the engine torque $T_E$ is born by the first electric motor M1, and the switching clutch C0 or the switching brake B0 mechanically.

Accordingly, the first electric motor M1 does not necessarily bear a reaction torque against the engine torque $T_E$ that exceeds the predetermined value $T_{E1}$. Therefore, the first electric motor M1 is prevented an increase of the size thereof, and is suppressed any reduction in durability thereof. In addition to this effect, for example, an engine torque $T_E$ that is not less than the engine torque $T_E$ bearable by the torque capacity of the first electric motor M1 can be inputted into the differential portion 11. Consequently, an effect is obtained, which increases the output from the differential portion 11 without increasing the torque capacity of the first electric motor M1, in other words, the size of the first electric motor M1.

The hybrid controlling means 52 according to the present embodiment includes a target required driving force related value setting means 176 that calculates a target required driving force related value, and a reaction force controlling means 178 that causes the transmitting member 18 to generate more output. The target required driving force related value setting means 176 calculates the target required driving force related value such as the required (target) output torque $T_{OUT}$ of the automatic transmission 20 or the target required driving force of the vehicle, based on an actual accelerator opening $\theta_{ACC}$ or a throttle valve opening $\theta_{TH}$, vehicle speed, and the like, from the previously stored relationship.

During the vehicle engine running in the differential action state of the power distributing mechanism 16, the reaction force controlling means 178 executes the reaction force control against the output torque of the engine 8 by an output control controlling the output of the first electric motor M1, and a slip control bringing the switching clutch C0 or the switching brake B0 into the slip state. The purpose is to obtain the target required driving force related value that is set by the target required driving force related value setting means 176.

The reaction force in-range determining means 184 determines whether the reaction torque bearable by the electrical capacity (i.e., torque capacity) of the first electric motor M1 falls within the range of the reaction torque against the engine torque $T_E$. This determination is made based on whether the actual torque inputted into the differential portion 11, for example, the actual engine torque $T_E$, is not more than the previously-set determination value $T_{E1}$, or more than the previously-set determination value $T_{E1}$, in the case where the driving force source determining means 82 determines that the engine 8 is used as a driving force source for vehicle running during vehicle startup in the operating state of the differential portion 11. Although this determination value $T_{E1}$ is generally determined based on the rated electrical capacity of the first electric motor M1, it may be determined based on the mechanical configuration of the differential portion 11.

In addition to the aforementioned function, the switching controlling means 50 generates reaction torque against the engine torque $T_E$ by using the reaction torque that is generated by the first electric motor M1, and the reaction torque that is generated by the half-engagement of the switching clutch C0 or the switching brake B0. The reason for this is that, if the reaction force in-range determining means 184 determines that the actual torque provided to the differential portion 11, for example, the actual engine torque $T_E$, exceeds the previously-set determination value $T_{E1}$, the first electric motor M1 cannot bear the reaction torque against the engine torque $T_E$. For this reason, the hydraulic control circuit 42 is provided with a command that brings the switching clutch C0 or the switching brake B0 into the half-engaged state, i.e., the slip state. That is, the switching controlling means 50 increases the reaction force that is mechanically received by the switching clutch C0 or the switching brake B0, or by the ring gear R1 via the switching clutch C0 or the switching brake B0, and thus reduces the reaction torque received by the first electric motor M1 to not more than the maximum torque capacity.

In other words, the switching controlling means 50 serves as the differential action limiting means, the share ratio control means, or the slip control means that brings the switching clutch C0 or the switching brake B0 into the half-engaged state during vehicle startup. That is, when the differential portion 11 cannot be switched to the non-continuously variable shifting state (locked state) during the startup running by the engine, the switching controlling means 11 generates reaction torque against the engine torque $T_E$ by using both the reaction torque generated by the first electric motor M1, and the reaction torque generated by the half-engagement of the switching clutch C0 or the switching brake B0. For this reason, the switching clutch C0 or the switching brake B0 is brought into slip engaged state. In this regard, the case where the differential portion 11 cannot be switched to the non-continuously variable shifting state (locked state) corresponds to the case where the actual torque inputted into the differential portion 11, for example, the actual engine torque $T_E$, exceeds the previously-set determination value $T_{E1}$, as shown in the combination use range A of FIG. 10.

Figure 19:
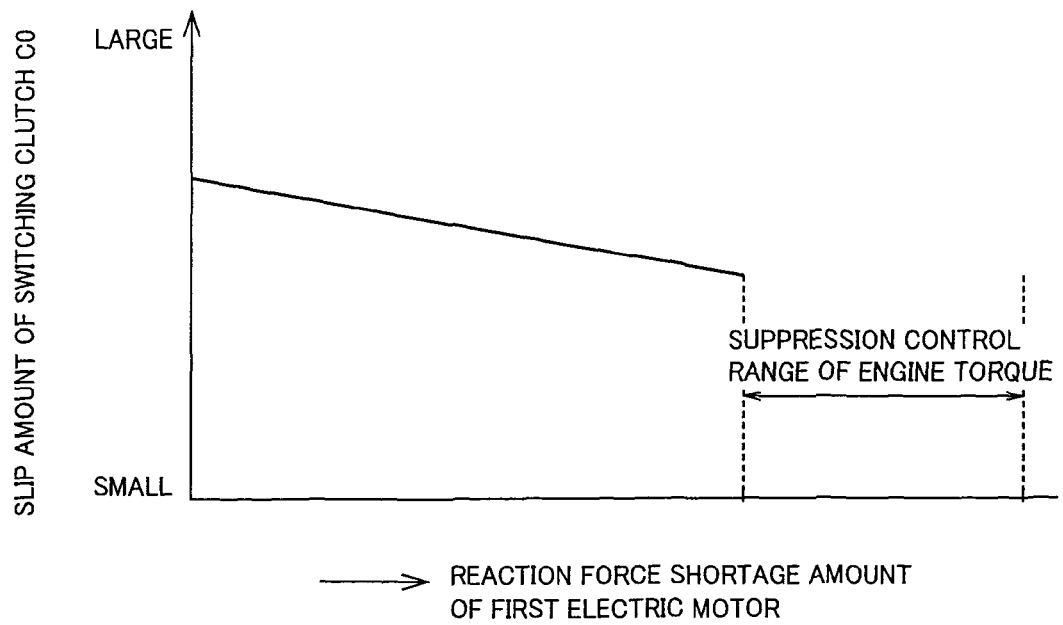
FIG. 19 is a view showing, in FIG. 18, a relation between a slip amount of the switch clutch C0 or the switch brake B0 for reducing the reaction force born by the first electric motor M1 and a reaction shortage amount (reaction force by determined actually applied reaction force—rate capacity).
Figure 20:
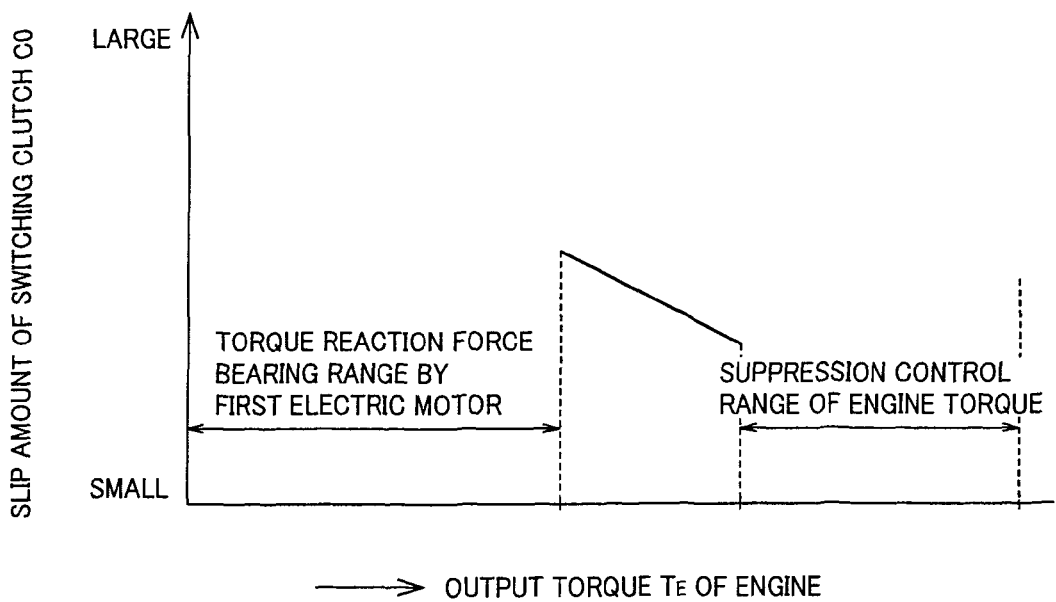
FIG. 20 is a view showing, in FIG. 18, a relation between the slip amount of the switch clutch C0 or the switch brake B0 for reducing the reaction force born by the first electric motor M1 and the output of the engine torque $T_E$.

In this slip control, when the differential portion 11 receives an engine output torque $T_E$ not less than the reaction torque that can be generated by the first electric motor M1 alone, e.g., an engine torque $T_E$ not less than the predetermined value $T_{E1}$, as shown in FIG. 19 or 20, the slip amount of is reduced as follows. That is, as the reaction force shortage amount of the first electric motor M1 or the output torque $T_E$ of the engine 8 increases, the slip amount is reduced, so that the reaction force mechanically received by the switching clutch C0 or the switching brake B0 increases. Reduction of the slip amount is executed until the engine output torque is limited.

As stated above, bringing the switching clutch C0 or the switching brake B0 into the half-engaged state continuously changes the share ratio between the share part of the reaction torque produced by the output of the first electric motor M1, and the share part of the reaction torque produced by the slip control of the switching clutch C0 or the switching brake B0. Although this share ratio change control may be executed when the reaction force shortage of the first electric motor M1 occurs during vehicle startup, it may be also executed in a prior stage before occurrence of the reaction force shortage of the first electric motor M1, for example, from beginning of an accelerating operation. In this case, any influence caused by the discontinuity due to reaction torque in the beginning of half-engagement is eliminated.

If the switching clutch C0 or the switching brake B0 is brought into the half-engaged state, in the differential portion 11, output B is mechanically transmitted to the transmitting member 18 by the half-engaged switching clutch C0 or the switching brake B0 is then added to output A electrically transmitted from the first electric motor M1 to the second electric motor M2 by the electrical path, and is outputted. The switching controlling means 50 brings the switching clutch C0 or the switching brake B0 into the half-engaged state so that engine output required to satisfy the target output can be provided by the output PA electrically transmitted and the output PB mechanically transmitted. By changing the half-engaged state of the switching clutch C0 or the switching brake B0, that is by changing the torque capacity in the half-engaged state, the transmitting power rate (ratio) between the output PA electrically transmitted, and the output PB mechanically transmitted, is changed.

FIG. 10 is a view showing one example in which the continuously variable control area (differential area) and the step variable control area (locked area) shown in FIG. 6 and FIG. 7 are rewritten on the second dimensional coordinate with the vehicle speed and the engine torque as the parameter. A high torque is shown by slash area in FIG. 10 where the vehicle speed V is not more than the predetermined vehicle V2 and the required engine torque $T_E$ exceeds the predetermined value TE1, corresponds to an area A where the differential portion 11 can not be switched to the non-continuously variable shifting state (locked state). This results from the differential portion 11 is maintained in the continuously variable shifting state and the engine stall is prevented.

In this area A, even if the engine torque $T_E$ not less than the predetermined value TE1 is inputted into the differential portion 11, owing to the proper engine startup, the differential portion 11 can not be switched to the non-continuously variable shifting state (locked state) originally. Accordingly, with the switching clutch C0 or the switching brake B0 brought into the half-engaged state by the switching controlling means 50, the reaction torque obtained by the first electric motor M1 and the reaction torque obtained by the switching clutch C0 or the switching brake B0 both half-engaged are used together. Thus, the reaction torque against the engine torque $T_E$ is generated (both used area A).

A high torque is shown by net area in FIG. 10 where the vehicle speed V exceeds the predetermined vehicle V2 and the required engine torque $T_E$ exceeds the predetermined value TE1 corresponds to a area B where the differential portion 11 can be switched to the non-continuously variable shifting state (locked state).

FIGS. 19 and 20 show the relationship between the slip amount of the switching clutch C0 or the switching brake B0 that reduces the reaction force borne by the first electric motor M1, and the reaction force shortage amount of the first electric motor M1 (reaction force that is defined by (actually-applied reaction force)−(reaction force determined by rated capacity)) and the engine output torque $T_E$. The output torque $T_E$ of the engine 8, corresponding to the reaction force applied to the first electric motor M1, corresponds to the reaction force shortage amount of the first electric motor M1. The torque limit of the first electric motor M1, being the reaction torque limit previously defined based on its rating, for example in actuality, is previously experimentally obtained.

The switching controlling means 50 generates reaction torque against the engine torque $T_E$ by using the reaction torque generated by the first electric motor M1, and the reaction torque generated by the half-engaged switching clutch C0 or the switching brake B0. However, the large output torque $T_E$ of the engine 8 causes shortage for the reaction torque. A problem such as an engine stall may arise when the switching clutch C0 or the switching brake B0 is brought into engagement in this condition. In view of this situation, while the output torque of the engine 8 is limited, the shortage for the required driving force is assisted by the output from the second electric motor M2.

In addition to the aforementioned function, the reaction force in-range determining means 184 executes the following determination, when the switching clutch C0 or the switching brake B0 is brought into the half-engaged state by the switching controlling means 50. That is, it is determined whether or not the actual torque inputted into the differential portion 11, e.g., the actual engine torque $T_E$ exceeds the total reaction torque $T_{TC}$ comprised of the reaction torque limit of the first electric motor M1, and the reaction torque limit by the half-engaged switching clutch C0 or the switching brake B0. This is because the total reaction torque $T_{TC}$ defines the range where the reaction torque against the engine torque $T_E$ can be borne.

If the reaction force in-range determining means 184 determines that the actual reaction torque $T_E$ exceeds the range bearable by the total reaction torque $T_{TC}$, the reaction force controlling means 178 or the switching controlling means (slip control means) 50 receiving a command therefrom operates to brings the switching clutch C0 or the switching brake B0 into the completely engaged state. Based on the above determination by the reaction force in-range determining means 184, the input torque limiting means 185 limits the engine torque $T_E$, i.e., input torque $T_{INS}$ inputted into the differential portion 11 to avoid such excess.

The input torque limiting means 185 serves as an engine torque limitation means that limits the engine torque $T_E$ inputted into the differential portion 11 as the input torque $T_{INS}$. That is, the engine torque $T_E$ is controlled so as not to exceed the total reaction torque $T_{TC}$ of the reaction torque provided by both the first electric motor M1, and the reaction torque provided by the half-engaged switching clutch C0 or the switching brake B0. The input torque limiting means 185 outputs to the hybrid controlling means 52 a command that limits the engine torque $T_E$ to not more than the total reaction torque $T_{TC}$.

That is, the input torque limiting means 185 outputs to the hybrid controlling means 52 the command that suppresses increase of the engine torque $T_E$ to not less than the limit that can be supported by the total reaction torque $T_{TC}$. In addition to the aforementioned function, the hybrid controlling means 52 provides, irrespective of any accelerator pedal depressing operation, the engine output control apparatus 43 a command that, restricts the opening of the electronic throttle valve 96, reduces a fuel supply amount by the fuel injection device 98, or delays the angle of ignition timing of the engine 8 by the ignition device 99, in accordance with the command by the input torque limiting means 185. The command is outputted alone or in combination with other commands to limit the engine torque $T_E$ so as not to exceed the total reaction torque $T_{TC}$.

Figure 21:
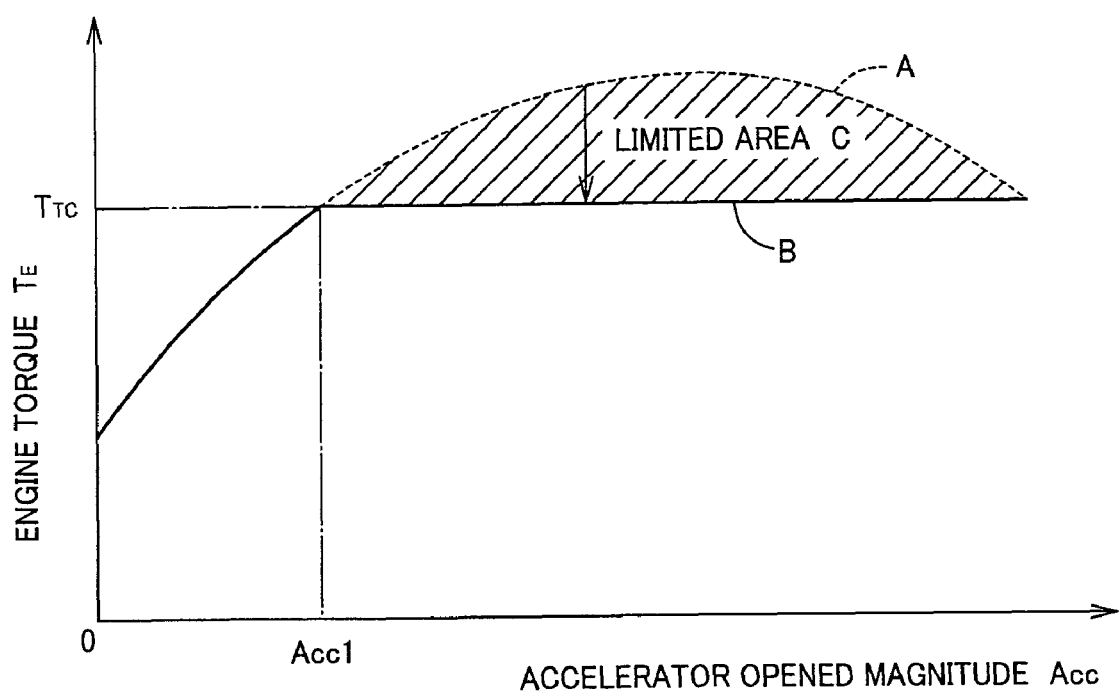
FIG. 21 shows, in the embodiment shown in FIG. 18, one example of the output characteristic of the engine torque relative to the accelerator opened magnitude.

FIG. 21 shows an example of the output characteristic of the engine torque $T_E$ for an accelerator pedal operation amount (accelerator opening) $\theta_{ACC}$. The high torque area as shown by the diagonally shaded area in FIG. 21 in which the required engine torque $T_E$ exceeds the aforementioned total reaction torque $T_{TC}$ when the accelerator pedal is depressed to not less than the accelerator opening $\theta_{ACC}1$. The high torque area corresponds to the limited area C in which the engine torque $T_E$ is limited so as not to exceed the total reaction torque $T_{TC}$ by taking the reaction torque against the engine torque $T_E$ is generated by both the first electric motor M1 and the switching clutch C0 or the switching brake B0 into consideration.

The vehicle start determining means 186 determines whether the vehicle is in a startup or running state. The determination is made based on that an actual accelerator opening $\theta_{ACC}$ (%) is not less than a previously-set start determination opening $\theta1$, and that an actual vehicle speed V (km/h) is not more than a previously-set start determination vehicle speed value V1. Slip enable/disable determining means 188 determines whether the half-engaged (slip engaged) switching clutch C0 or the switching brake B0 is enabled or disabled based on the reasons in the control such as stepped operating range, or reasons of temperature such as low temperature and high temperature, and the like. The start determination opening θ1 and the start determination vehicle speed value V1 are values that are previously experimentally obtained in order to determine the vehicle startup or running.

The reaction force in-range determining means 184 may determine that a reaction torque against the engine torque $T_E$ corresponding to the actual required drive torque exceeds the range that can be borne even by the total reaction torque $T_{TC}$ comprised of the reaction torque limit set by the electric capacity (i.e., torque capacity) of the first electric motor M1, and the reaction torque limit set by the half-engagement of the switching clutch C0 or the switching brake B0. In this case, the assist amount calculation means 190 calculates a reduction in the engine torque $T_E$ that is limited by the input torque limiting means 185 as an assist amount. The assist amount can be calculated by subtracting the actual output torque of the engine 8 limited by the input torque limiting means 185 from the required power torque of the engine 8 corresponding to the required driving force calculated based on an accelerator opening $\theta_{ACC}$ in the required drive force setting means 176, for example.

In order to increase the assist torque amount that is calculated by the assist amount calculation means 190, the torque assist control means 192 executes a torque assist by the second electric motor M2. For the torque assist, the second electric motor M2 is driven using the charging capacity SOC of the electric-energy storage device 60, or the power generation amount of the first electric motor M1.

Figure 22:
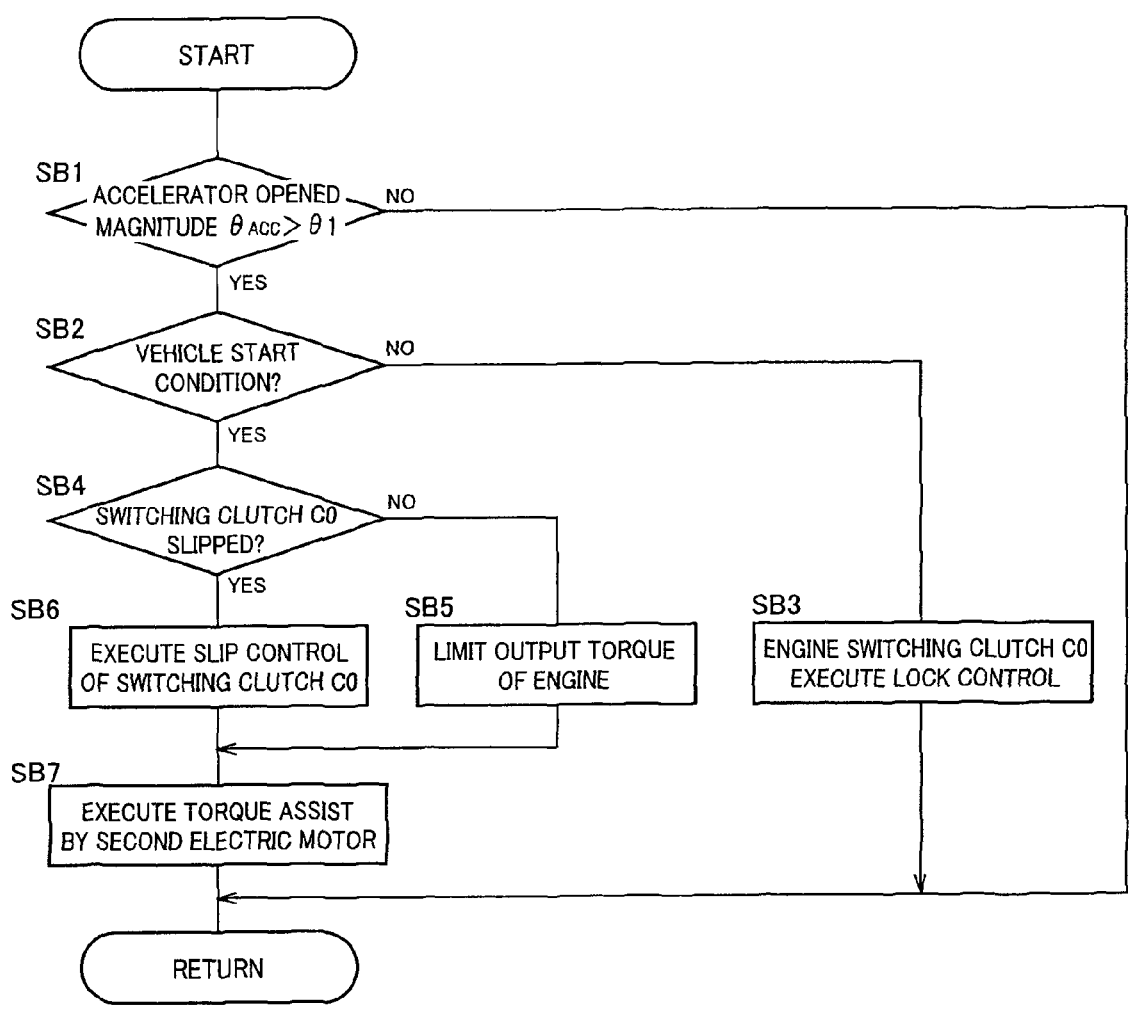
FIG. 22 is the flowchart explaining the main part of the control operation of the electronic control device, in the vehicle drive apparatus in the embodiment shown in FIG. 18. That is, it explains the slip control operation of the switch clutch or the switch brake executed when the differential portion is not switched from the continuously variable shifting state (differential state) to the non-continuously variable shifting state (locked state).

FIG. 22 is a flow chart illustrating the main part of the control operation of the electronic control device 40, or the slip control operation for the switching clutch C0 or the switching brake B0. In a heavy load and low vehicle speed condition where the differential portion 11 is not switched from the continuously variable shifting state (differential action state) to the non-continuously variable shifting state (locked state) during vehicle startup, this sequence is repeatedly executed, for example, in a very short cycle time in the range of approximately several milliseconds to several tens of milliseconds.

First, in Step SB1, it is determined whether an actual accelerator opening $\theta_{ACC}$ (%) is not more or less than the previously-set start determination opening θ1, for example. If NO is the determination of this Step SB1, this routine ends. If YES is the determination, whether the actual vehicle speed V (km/h) is more or not more than the previously-set start determination vehicle speed value V1 is determined in Step SB2. These Steps SB1 and SB2 correspond to the vehicle start determining means 186.

If NO is the determination of Step SB2, the vehicle is not in the startup condition, then the switching clutch C0 is controlled to be brought into the completely engaged state (locked state) in Step SB3 corresponding to the switching controlling means 50. Conversely, if YES is the determination of Step SB2, whether the slip control of the switching clutch C0 is enabled or disabled is determined in Step SB4 corresponding to the slip enable/disable determining means 188, based on control conditions or oil temperature. If NO is the determination of this Step SB4, the output torque $T_E$ of the engine 8 is limited to not more than the reaction torque $T_{E1}$ that is generated corresponding to the output torque $T_E$ of the engine 8 in Step SB5 corresponding to the input torque limiting means 185.

Conversely, if YES is the determination of Step SB4, when the differential portion 11 cannot be switched to the non-continuously variable shifting state (locked state) during vehicle engine startup or running, the slip control for the switching clutch C0 is executed in Step SB6 corresponding to the switching controlling means (slip control means) 50. The state where the differential portion 11 cannot be switched to the locked state corresponds to a case where the actual torque inputted into the differential portion 11, for example the actual engine torque $T_E$, exceeds the previously-set determination value $T_{E1}$, as shown in the combination use range A of FIG. 10. The slip control for the switching clutch C0 is executed to generate reaction torque against the engine torque $T_E$ by using the reaction torque generated by the first electric motor M1, and the reaction torque produced by the half-engaged switching clutch C0 or the switching brake B0.

Subsequently, when the engine torque $T_E$ is limited by the input torque limiting means 185, the torque assist by the second electric motor M2 is executed so that torque increases by the assist torque amount corresponding to a reduction in the limited engine torque $T_E$, in Step SB7 corresponding to the torque assist control means 192. That is, the torque assist is executed, when the reaction torque against the engine torque $T_E$ corresponding to the actual required drive torque exceeds the range bearable by the total reaction torque $T_{TC}$ comprised of the reaction torque limits respectively set by the electric capacity (i.e., torque capacity) of the first electric motor M1, and set by the half-engaged switching clutch C0 or the switching brake B0. For this purpose, the second electric motor M2 is driven using the charging capacity SOC of the electric-energy storage device 60, or the power generation amount of the first electric motor M1.

Figure 23:
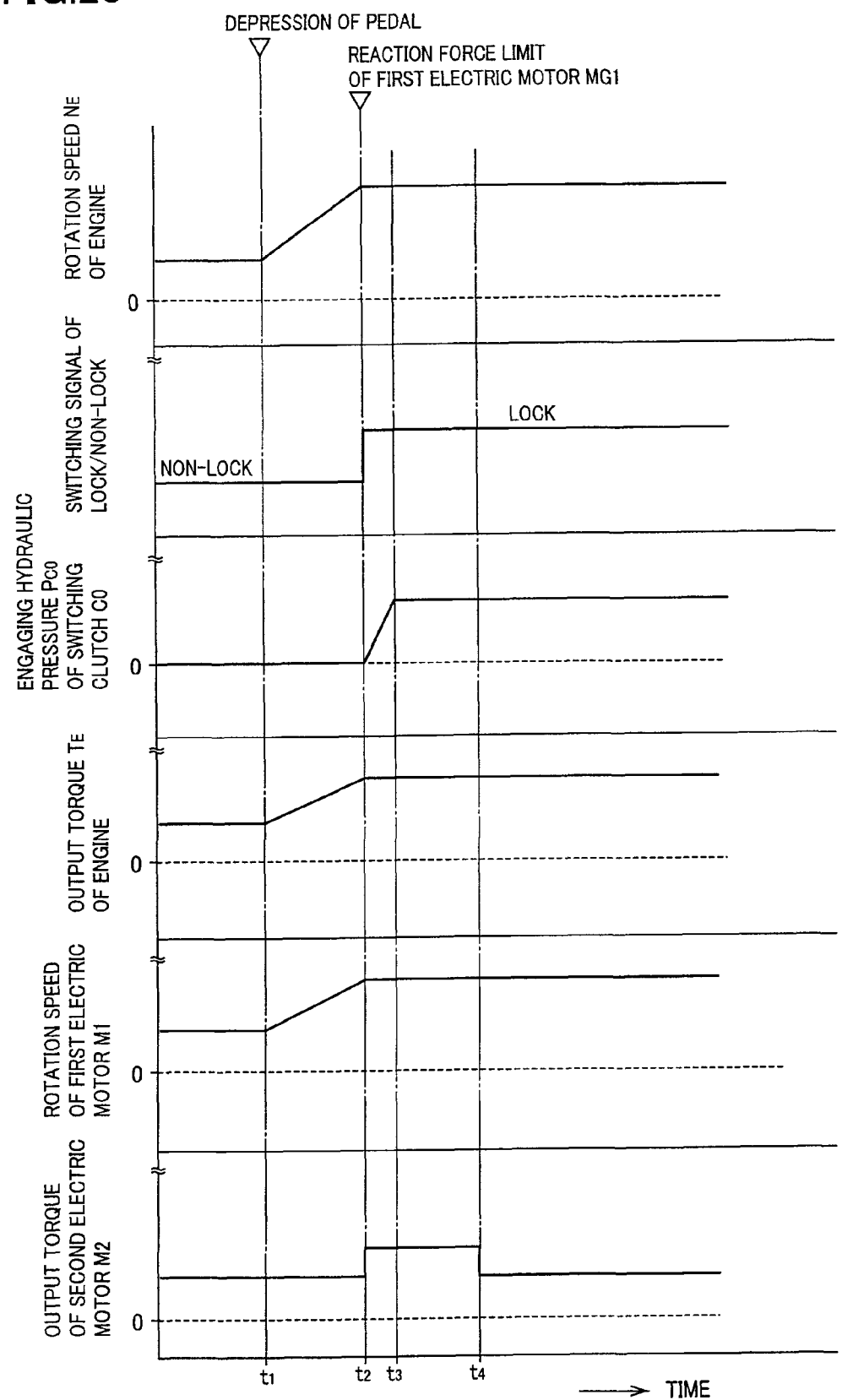
FIG. 23 a time chart explaining the control operation shown in the flowchart of FIG. 22, showing the control operation at the engine startup wherein the accelerator pedal is depressed at the zero vehicle speed in the continuously variable shifting state.

In a time period from time $t_1$ to time $t_2$ shown in FIG. 23, after vehicle starting by depression of the accelerator pedal, the rotational speed $N_E$ of the engine 8, the output torque $T_E$ of the engine 8, and the rotational speed of the first electric motor M1 rise. The time $t_2$ shows the state where the output torque $T_E$ reaches the reaction force limit, i.e., the determination value $T_{E1}$, of the first electric motor M1, where the differential portion 11 is switched from the non-locked state to the locked state (including the slip state). Thereafter, by starting and executing the slip control of the switching clutch C0, the reaction torque is borne by the half-engaged torque of the switching clutch C0, so that the engine torque $T_E$ increases to exceed the reaction torque limit of the first electric motor M1. Due to excess of the engine torque $T_E$ over the total reaction torque $T_{TC}$, the torque assist by the second electric motor M2 is executed from the time $t_2$ to time $t_4$.

As stated above, in this embodiment, when the differential portion 11 is in the differential state, the reaction force controlling means 178 executes the reaction force control against the output torque of the engine 8 by the output control controlling the output of the first electric motor M1, and by the slip control bringing the switching clutch C0 or the switching brake B0 (engaging device) into the slip engaged state. In addition to this, if the output generated in the transmitting member 18 by the reaction force controlling means 178 is short of the drive force required for the vehicle, the torque assist control means 192 controls the output of the second electric motor M2 to compensate for the shortage. Accordingly, vehicle acceleration performance is sufficiently maintained during vehicle startup and the like.

In the present embodiment, if the reaction force by the reaction control of the reaction force controlling means 178 is short of output of the engine 8, the input torque limiting means (engine output suppressing means) 185 suppresses output of the engine 8. Accordingly, the first electric motor M1 and the switching clutch C0 (engaging device) are prevented from being used beyond their torque capacities. Therefore, the first electric motor M1, and the switching clutch C0 or the switching brake B0 (engaging device) are suitably protected, thereby improving their durability.

In the present embodiment, since the reaction force controlling means 178 executes the reaction force control during vehicle startup, an advantage that acceleration operation performance is sufficiently maintained during vehicle startup operating is rendered.

According to the present embodiment, the control device includes (a) the switching clutch C0 or the switching brake B0 (engaging device), (b) the required drive force setting means 176, (c) the reaction force controlling means 178, and (d) the hybrid control means (output control means) 52. In detail, the switching clutch C0 or the switching brake B0 is disposed in the differential portion (differential mechanism) 11 to selectively switch it to the differential state or the non-differential state. The required drive force setting means 176 sets the drive force required for the vehicle depending on the accelerator opening magnitude $\theta_{ACC}$.

The reaction force controlling means 178 executes, in the differential state of the differential portion 11, the reaction force control against the output of the engine 8, using the output control for controlling the output of the first electric motor M1, and the slip control for bring the switching clutch C0 or the switching brake B0 into the engaged state, thereby generating the output in the transmitting member 18. The hybrid control means 52 controls the output generated in the transmitting member and the output of the second electric motor M2 by the reaction force control means such that the required drive force set by the required drive force setting means 176 is generated.

Thus, the reaction force against the engine 8 can be borne by both the output control of the first electric motor M1, and the slip control of the switching clutch C0 or the switching brake B0 in order to generate the output for the drive wheels 38. In addition to this, the second electric motor M2 generates the output in the drive wheels 38. Control of both these types of output can generate the drive force required by a driver based on accelerator operation, thereby maintaining vehicle acceleration performance.

In the present embodiment, since the hybrid controlling means (output controlling means) 52 executes output control during vehicle startup, the acceleration operation performance is sufficiently maintained during vehicle startup and running.

Although the embodiments according to the present invention are described above with reference to the drawings, the present invention can also be applied to other modes.

For example, in the foregoing embodiments, the input torque limiting means 88 and 188 (Step S7 in FIG. 12, and Step SB4 in FIG. 22) limits the engine torque $T_E$ so as not to exceed the total reaction torque $T_{TC}$ for thereby limiting the input torque $T_{INS}$ to the differential portion 11. However, in substitution for or in addition to the limitation on the engine torque $T_E$, the input torque $T_{INS}$ to the differential portion 11 may be limited by increasing the torque required to drive auxiliaries driven by the output of the engine 8, and the like. Also in this case, effects similar to the foregoing embodiment can be rendered.

In the foregoing embodiments, when the differential portion 11 receives the engine torque $T_E$ that is not less than the reaction torque that can be generated by the first electric motor M1 alone, e.g., an engine torque $T_E$ not less than the predetermined value TE1, the switching controlling means 50 operates, if the differential portion 11 cannot be switched into the non-continuously variable shifting state (locked state). That is, the switching clutch C0 or the switching brake B0 is brought into the half-engaged state, so that the operation of the differential portion 11 as the electric differential device is limited. However, also when the differential portion 11 does not receive the engine torque $T_E$ that is not less than the predetermined value TE1, the switching clutch C0 or the switching brake B0 may be brought into the half-engaged state to limit the operation of the differential portion 11 as the electric differential device.

That is, also in the continuously variable control range of the differential portion 11, the switching controlling means 50 may bring the switching clutch C0 or the switching brake B0 into the half-engaged state. This is for generating the reaction torque against the engine torque $T_E$ by using the reaction torque generated by the first electric motor M1, and the reaction torque generated by the half-engaged switching clutch C0 or the switching brake B0. For example, the switching controlling means 50 may bring the switching clutch C0 or the switching brake B0 into the half-engaged state. This is for generating the reaction torque against the engine torque $T_E$ by using only the reaction torque provided by the half-engaged switching clutch C0 or the switching brake B0.

For instance, in the illustrated embodiment, the shifting mechanism 10, 70 is structured, to enable the differential portion 11 (power distributing mechanism 16) to be switched in the differential state and the non-differential state, for the continuously variable shifting state functioning as the electrically continuously variable transmission and the step-variable shifting state functioning as the step-variable shifting transmission. However, the switching between the continuously variable shifting state and the step-variable shifting state is performed as one mode of placing the differential portion 11 in the differential state and the non-differential state. Even if, for instance, when placed in the differential state, the differential portion 11 may be arranged to function as a step-variable transmission with the shifting gear ratio thereof made variable, not in a continuous mode but in a stepwise mode. In other words, the differential state/non-differential state and the continuously variable shifting state/step-variable shifting state of the shifting mechanism 10, 70 (the power distributing mechanism 16) do not necessarily fall in a one-on-one correspondence, and the shifting mechanism 10, 70 needs not necessarily formed in a structure to enable the switching between the step-variable shifting state and the continuously variable shifting state.

In the above embodiment, as the coupling device for selectively switching the power transmitting path into the power transmissive state and the power interrupted state, the first clutch C1 and the second clutch C2 are employed, which constructs the part of the automatic transmission portion 20, 72 and are disposed between the automatic transmission portion 20, 72 and the differential portion 11. However, the coupling device is not necessarily the first clutch C1 and the second clutch C2, and at least one coupling device, enabling the power transmitting path into the power transmissive state and the power interrupted state, can be sufficiently employed. Such coupling device can be connected to for example the output shaft 22, or connected to the rotating member in the automatic transmission portion 20, 72. The coupling device does not necessarily construct the part of the automatic transmission portion 20, 72, and can be provided independent therefrom.

In the power distribution mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear set 24.

Although in the illustrated embodiments, the engine 8 is directly connected to the input shaft 14, it may be operatively connected via gears, belts or the like. The engine 8 and the input shaft 14 are not necessarily disposed coaxially.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18. In addition, the present invention can be applied to the differential portion 11 not having the second electric motor M2 but has the function of the electric torque converter.

Although the power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear set 24.

The switching clutch C0 in the embodiment is engaged to establish the neutral position "N" in the shifting mechanism 10, 70, but the neutral position need not be established by engagement thereof.

The hydraulic-type frictional engaging devices such as the switching clutch C0 and switching brake B0 may be an engaging device of a magnetic-powder type, an electromagnetic type or a mechanical type, such as a powder (magnetic powder) clutch, an electromagnetic clutch and a meshing type dog clutch. The second electric motor M2 connected to the input transmitting member 18 in the illustrated embodiment can be connected to the output shaft 22, or to rotating member disposed in the automatic transmission portion 20.

In the illustrated embodiment, further, the automatic transmission portion 20, 72 is disposed in the power transmitting path between the transmitting member 18 serving as the output member of the differential portion 11, that is the power distributing mechanism 16 and the drive wheels 38. However, a power transmitting device of the other type such as, for instance, a continuously variable transmission (CVT) which is one kind of the automatic transmission, a first type manual transmission or a second type manual transmission can be employed. The first manual transmission of a well-known constantly meshed type includes two parallel shafts, and is automatically switched the gear positions thereof by the select ring and the shift cylinder. The second manual transmission of a synchronously meshed type is so constructed that the gear positions thereof is manually switched. Other type of the power transmitting device (transmission) can be employed. The continuously variable transmission (CVT) is set in a step-variable shifting state as a whole, by placing the power distributing mechanism 16 in a fixed speed shifting state. The term "step-variable shifting state" used herein refers to a state wherein power transmission is achieved mainly in a mechanical transmitting path without using the electrical path.

In an alternative, noted is that the present invention can be applied to the drive apparatus not including the automatic transmission portion 20, 72. When the automatic transmission portion 20, 72 is constructed by the continuously variable transmission (CVT) as in the illustrated embodiment, or when no automatic transmission portion 20, 72 is provided, the coupling device is provided in the power transmitting path between the transmitting member 18 and the drive wheel 38 for sole use. The coupling device is controlled to have the coupled state or the uncoupled state, so that the power transmitting path is switched to the power transmissive state or the power interrupted state.

In the illustrated embodiment, furthermore, while the automatic transmission portion 20, 72 is connected to the differential portion 11 in series via the transmitting member 18, a countershaft may be provided in parallel to the input shaft 14 to allow the automatic transmission portion 20, 72 to be coaxially disposed on an axis of the countershaft. In this case, the differential portion 11 and the automatic transmission portion 20, 72 are connected to each other in power transmitting capability via a set of transmitting members structured of, for instance, a counter-gear pair acting as the transmitting member, a sprocket and a chain.

The power distributing mechanism 16 in the illustrated embodiment can be comprised of for example a pinion driven and rotated by the engine, and a differential gear set having a pair of bevel gears meshed with the pinion being operatively connected to the first electric motor M1 and the second electric motor M2.

The power distributing mechanism 16 in the illustrated embodiment comprised of one paired planetary gear units, may be comprised of two or more pairs planetary gear units to function in the non-differential state (fixed speed state) as the transmission having three or more speed positions. The planetary gear unit is not limited to the single-pinion type, but can be the double-pinion type.

The switch device 46 in the illustrated embodiment has the shift lever 48 to be manipulated for selecting one of a plurality of shift positions. However, instead of such shift lever 48, following switch or device can be employed. That is, a switch being comprised of a pressing type switch and a sliding type switch and being selected to one of a plurality of shift positions; a device being selected to one of a plurality of shift positions in response not to the manipulation by the hand but to the driver's voice; and a device being selected to one of a plurality of shift positions in response to the manipulation by the foot, can be employed.

In the illustrated embodiment, the shifting range is established by manipulation of the shift lever 48 to the "M" position, but the shifting position i.e., speed position can be established by setting of the shifting step that is the maximum speed step for each shifting range. In this case, in the automatic transmission portion 20, 72, the shifting position is switched for executing the shifting action. For example, when the manual manipulation of the shift lever 48 to a shift-up position "+" and a shift-down position "−" at the "M" position is executed, any of the first gear position to the fourth gear position is set by the manipulation of the shift lever 48 in the automatic transmission portion 20.

The switch 44 in the illustrated embodiment is of the see-saw type. However, switches capable of being selectively switched to one of the continuously variable shifting running (differential state) and the step-variable shifting running (non-differential state) can be employed. That is, a pressing type switch; two pressing type switches which can hold the state selectively pressed; a lever type switch; and a sliding type switch, can be provided. In addition to the switch 44 having single neutral position, a switch having two shifting positions for making the selected state thereof valid and invalid can be provided, independent from the switch 44, can be employed. Instead of, or in addition to the switch 44, following devices can be employed. That is, the devices capable of being selectively switched to one of the continuously variable shifting running (differential state) and the step-variable shifting running (non-differential state), in response not to the manual manipulation but to the driver's voice, and the device switched by the manipulation by foot, can be employed.

Needless to say, above mentioned are mere illustration of the embodiments, and accordingly the present invention can be carried out in the various altered or improved modes based on knowledge of the skilled person in this technical field.

The invention claimed is:

1. A control device for controlling a vehicle driving apparatus, the vehicle driving apparatus including a continuously variable transmission portion that has a differential mechanism for distributing engine output to a first electric motor and a transmitting member, and a second electric motor arranged on a power transmitting path from the transmitting member to drive wheels, being operable as an electrically operated continuously variable transmission, the control device comprising:
   a differential action limiting device that is disposed in the differential mechanism and limits the differential action of the differential mechanism in order to limit the operation of the continuously variable transmission portion as the electrically operated continuously variable transmission, and
   differential action limiting means that, during engine running using an engine as a drive source, changes a half-transmitting capacity state of the differential action limiting device when limiting the operation of the continuously variable transmission portion as the electrically operated continuously variable transmission,
   wherein the differential action limiting device is an engaging device, and
   the differential action limiting means controls a half-engaged state of the differential action limiting device for reducing a reaction force to be born by the first electric motor in order to change the ratio between the output electrically transmitted from the first electric motor to the second electric motor in the continuously variable transmission portion, and the output mechanically transmitted to the transmitting member in the continuously variable transmission portion.

2. A control device for controlling a vehicle driving apparatus according to claim 1, further comprising a step variable transmission portion disposed downstream of the continuously variable transmission portion in the power transmitting path.

3. A control device for controlling a vehicle driving apparatus according to claim 2, wherein the differential action limiting means also serves as switching control means that switches the continuously variable transmission portion to a step variable shifting state or a continuously variable shifting state.

4. A control device for controlling a vehicle driving apparatus according to claim 3, wherein the differential action limiting means brings, when the continuously variable transmission portion can not be switched to the continuously variable shifting state or the step variable shifting state, the engaging device into the half-engaged state.

5. A control device for controlling a vehicle driving apparatus according to claim 1 or 4, further comprising drive force source determining means that determines whether torque is inputted into the continuously variable transmission portion from the engine, reaction force in-range determining means that determines whether the input torque into the continuously variable transmission portion is within a reaction torque that can be generated at the first electric motor, and input torque limiting means that upon determination that the input torque into the continuously variable transmission portion is out of the reaction force born by the first electric motor, limits input torque into the continuously variable transmission portion.

6. A control device for controlling a vehicle driving apparatus according to claim 5, further comprising shifting control means that operates the second electric motor to compensate shortage of the drive force caused by limitation of the input torque into the continuously variable transmission portion.

7. A control device for controlling a vehicle driving apparatus, the vehicle driving apparatus including a differential portion that includes a differential mechanism for distributing engine output to a first electric motor and a transmitting member, and a second electric motor arranged on a power transmitting path from the transmitting member to drive wheels, being operable as an electrically operated differential device, the control device comprising:
   a differential action limiting device that is disposed in the differential mechanism and limits the differential action of the differential mechanism in order to limit the operation of the differential portion as the electrically operated differential device; and
   differential action limiting means that, during vehicle engine running using the engine as a drive source, changes a half-transmitting capacity state of the differential action limiting device when limiting the operation of the differential portion as the electrically operated differential device,
   wherein the differential action limiting device is an engaging device, and
   the differential action limiting means controls a half-engaged state of the differential action limiting device for reducing a reaction force to be born by the first electric motor in order to change the ratio between the output electrically transmitted from the first electric motor to the second electric motor in the differential portion, and the output mechanically transmitted to the transmitting member in the differential portion.

8. A control device for controlling a vehicle driving apparatus according to claim 7, further comprising a step variable transmission portion disposed downstream of the differential portion in the power transmitting path.

9. A control device for controlling a vehicle driving apparatus according to claim 8, wherein the differential action limiting means also serves as switching control means that switches the differential portion to a differential state or a non-differential state.

10. A control device for controlling a vehicle driving apparatus according to claim 9, wherein the differential action limiting means brings, when the differential portion can not be switched to the differential state or the non-differential state, the engaging device into the half-engaged state.

11. A control device for controlling a vehicle driving apparatus according to claim 7 or 10, further comprising drive force source determining means that determines whether torque is inputted into the differential portion from the engine, reaction force in-range determining means that determines whether the input torque into the differential portion is within a reaction torque that can be generated at the first electric motor, and input torque limiting means that upon determination that the input torque into the differential portion is out of the reaction force born by the first electric motor, limits input torque into the differential portion.

12. A control device for controlling a vehicle driving apparatus according to claim 11, further comprising shifting control means that operates the second electric motor to compensate shortage of the drive force caused by limitation of the input torque into the differential portion.

13. A control device for controlling a vehicle driving apparatus, the vehicle driving apparatus including a differential portion that includes a first electric motor and a differential mechanism, and the electric motor generates reaction torque corresponding to engine output torque that is inputted into the differential mechanism to operate as an electrically operated differential device, the control device comprising:
    an engaging device that is disposed in the differential mechanism and limits the differential action of the differential mechanism in order to limit the operation of the differential portion as the electrically operated differential device; and
    differential action limiting means that, when limiting operation of the differential portion as the electrically operated differential device during vehicle engine running using an engine as a drive source, controls a half-engaged state of the engaging device for reducing a reaction force of the first electric motor, and generates reaction torque corresponding to engine output torque with the total torque generated by using both the electric motor and the half-engaged torque of the engaging device.

14. A control device for controlling a vehicle driving apparatus according to claim 13, wherein the differential action limiting means limits the operation of the differential portion as the electrically operated differential device, when the differential mechanism receives engine output torque that is not less than the reaction torque that can be generated by the electric motor alone.

15. A control device for controlling a vehicle driving apparatus according to claim 13 or 14, wherein the differential action limiting means limits the operation of the differential portion as the electrically operated differential device during vehicle engine startup using the engine of the vehicle as a drive source.

16. A control device for controlling a vehicle driving apparatus according to claim 13, further comprising engine torque restriction means which limits engine output torque based on the reaction torque generated by the electric motor and the engaging device set in the half-engaged state thereof.

17. A control device for controlling a vehicle driving apparatus according to claim 13, further comprising a step variable transmission portion disposed downstream of the differential portion in a power transmitting path from a transmitting member to drive wheels.

18. A control device for controlling a vehicle driving apparatus according to claim 17, wherein the differential action limiting means also serves as switching control means that switches the differential portion to a differential state or a non-differential state.

19. A control device for controlling a vehicle driving apparatus according to claim 18, wherein the differential action limiting means brings, when the differential portion can not be switched to the differential state or the non-differential state, the engaging device into the half-engaged state.

20. A control device for controlling a vehicle driving apparatus according to claim 13 or 19, further comprising drive force source determining means that determines whether the torque is inputted into the differential portion from the engine, reaction force in-range determining means that determines whether the input torque into the differential portion is within a reaction torque that can be generated at the first electric motor, and input torque limiting means that upon determination that the input torque into the differential portion is out of the reaction force born by the first electric motor, limits input torque into the differential portion.

21. A control device for controlling a vehicle driving apparatus according to claim 20, further comprising shifting control means that operates a second electric motor to compensate shortage of the drive force caused by limitation of the input torque into the differential portion.

22. A control device for controlling a vehicle driving apparatus, the vehicle driving apparatus including a differential mechanism for distributing engine output to a first electric motor and a transmitting member, and a second electric motor operatively connected to drive wheels, the control device comprising:
    an engaging device that is disposed in the differential mechanism, and selectively switches the differential mechanism between a differential state and a non-differential state;
    reaction force controlling means that, in the differential state of the differential mechanism, executes a reaction force control against the engine output by an output control that controls the output of the first electric motor, and a slip control that brings the engaging device into a slip engaged state for reducing a reaction torque to be born by the first electric motor, for causing the transmitting member to generate output; and
    share ratio changing means that changes a share ratio between a share part of the reaction torque controlled by the output control of the first electric motor, and a share part of the reaction torque controlled by the slip control of the engaging device.

23. A control device for controlling a vehicle driving apparatus according to claim 22, wherein the share ratio changing means changes the share ratio by controlling the slip amount of the engaging device.

24. A control device for controlling a vehicle driving apparatus according to claim 22 or 23, further comprising torque assist control means which, when the output generated in the transmitting member by the reaction torque caused by the output of the first electric motor and the reaction torque caused by the slip control of the engaging device are short of the drive force required for the vehicle, controls the output of the second electric motor to compensate for the shortage.

25. A control device for controlling a vehicle driving apparatus according to claim 22, further comprising engine output suppressing means which, when the reaction force capacity that can be generated by the reaction force control of the reaction force controlling means is short of engine output, suppresses the engine output.

26. A control device for controlling a vehicle driving apparatus according to claim 22, wherein the reaction force controlling means executes reaction force control during startup of the vehicle.

27. A control device for controlling a vehicle driving apparatus, the vehicle driving apparatus including a differential mechanism for distributing engine output to a first electric motor and a transmitting member, and a second electric motor operatively connected to drive wheels, the control device comprising:
    an engaging device that is disposed in the differential mechanism, and selectively switches the differential mechanism between a differential state and a non-differential state;
    required drive force setting means that sets a required drive force required for a vehicle in accordance with an accelerator opened magnitude;

reaction force controlling means that, in the differential state of the differential mechanism, executes a reaction force control against the engine output by an output control controlling the output of the first electric motor, and a slip control bringing the engaging device into a slip engaged state, for causing the transmitting member to generate output; and output controlling means that controls the output generated in the transmitting member by the reaction force controlling means and the output of the second electric motor to generate the required drive force set by the required drive force setting means.

28. A control device for controlling a vehicle driving apparatus according to claim 27, wherein the output controlling means executes output control during startup of the vehicle.

29. A control device for controlling a vehicle driving apparatus according to claim 27, further comprising drive force source determining means that determines whether the torque is inputted into the differential mechanism from the engine, reaction force in-range determining means that determines whether the input torque into the differential mechanism is within a reaction torque that can be generated at the first electric motor, and input torque limiting means that upon determination that the input torque into the differential mechanism is out of the reaction force by the first electric motor, limits input torque into the differential mechanism.

30. A control device for controlling a device driving apparatus according to claim 29, further comprising shifting control means that operates the second electric motor to compensate shortage of the drive force resulted from limitation of the input torque into the continuously variable transmission portion.

31. A control device for controlling a vehicle driving apparatus according to claim 22 or 27, wherein the reaction force controlling means starts the slip control that brings the engaging device into the slip engaged state, when engine output torque exceeds a switching determination value of the reaction torque that can be borne by the first electric motor.

32. A control device for controlling a vehicle driving apparatus according to claim 31, wherein the reaction force controlling means reduces a slip amount of the engaging device as a reaction force shortage amount of the first electric motor increases.

33. A control device for controlling a vehicle driving apparatus according to claim 31, wherein the reaction force controlling means reduces a slip amount of the engaging device as the engine output torque increases.

34. A control device for controlling a vehicle driving apparatus according to claim 22 or 27, wherein the reaction force controlling means brings the engaging device into a completely engaged state, when engine output torque exceeds the total reaction torque which is the sum of the reaction force borne by the first electric motor and the reaction force borne by the engaging device.

* * * * *